US012792597B2

(12) United States Patent
Gylfason et al.

(10) Patent No.: US 12,792,597 B2
(45) **Date of Patent: *Nov. 10, 2026**

(54) SYSTEMS AND METHODS FOR ACCESSING DATA ENTITIES MANAGED BY A DATA PROCESSING SYSTEM

(71) Applicant: Ab Initio Technology LLC, Lexington, MA (US)

(72) Inventors: Halldor Isak Gylfason, Cambridge, MA (US); Robert Parks, Weston, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/043,795

(22) Filed: Feb. 3, 2025

(65) Prior Publication Data

US 2025/0252094 A1 Aug. 7, 2025

Related U.S. Application Data

(63) Continuation of application No. 18/415,067, filed on Jan. 17, 2024, now Pat. No. 12,254,002, which is a (Continued)

(51) Int. Cl.
*G06F 16/242* (2019.01)
*G06F 9/54* (2006.01)
*G06F 16/248* (2019.01)

(52) U.S. Cl.
CPC ............ *G06F 16/2425* (2019.01); *G06F 9/54* (2013.01); *G06F 16/248* (2019.01)

(58) Field of Classification Search
None
See application file for complete search history.

(56) References Cited

U.S. PATENT DOCUMENTS 5,604,899 A 2/1997 Doktor
5,966,072 A 10/1999 Stanfill et al.
(Continued)

FOREIGN PATENT DOCUMENTS

CN 104516920 A 4/2015
CN 109918453 A 6/2019
(Continued)

OTHER PUBLICATIONS

Visual Query Answering by Entity-Attribute Graph Matching and Reasoning (Year: 2019).*
(Continued)

*Primary Examiner* — Kim T Nguyen
(74) *Attorney, Agent, or Firm* — Wolf, Greenfield & Sacks, P.C.

(57) ABSTRACT

Techniques for obtaining information about data entity instances managed by a data processing system using at least one data store. The techniques include obtaining a query comprising a first portion comprising information for identifying instances of a first data entity stored in at least one data store; and a second portion indicating at least one attribute of the first data entity; generating, from the query, a plurality of executable queries including a first set of one or more executable queries and a second set of one or more executable queries, the generating comprising: generating, using the first portion, the first set of executable queries for identifying instances of the first data entity, and generating, using the second portion, the second set of executable queries for obtaining attribute values for instances of the first data entity; and executing the plurality of executable queries to obtain results for the query.

20 Claims, 54 Drawing Sheets

Related U.S. Application Data continuation of application No. 17/587,181, filed on Jan. 28, 2022, now Pat. No. 11,921,710.

(60) Provisional application No. 63/143,895, filed on Jan. 31, 2021.

(56) References Cited

U.S. PATENT DOCUMENTS

| | | | | |
|---|---|---|---|---|
| 6,704,743 | B1 | 3/2004 | Martin | |
| 6,925,646 | B1 * | 8/2005 | Korenshtein | G06F 9/4492 707/999.103 |
| 9,569,509 | B2 * | 2/2017 | White | G06F 16/248 |
| 10,489,384 | B2 | 11/2019 | Gould et al. | |
| 10,496,737 | B1 | 12/2019 | Sayre et al. | |
| 10,956,415 | B2 | 3/2021 | Pal et al. | |
| 11,163,759 | B2 | 11/2021 | Kempf | |
| 11,341,131 | B2 | 5/2022 | Pal et al. | |
| 11,507,444 | B1 | 11/2022 | Hamlin et al. | |
| 11,544,285 | B1 | 1/2023 | Govil et al. | |
| 11,550,799 | B2 | 1/2023 | Williams et al. | |
| 11,580,113 | B2 | 2/2023 | Schaller et al. | |
| 11,599,541 | B2 | 3/2023 | Pal et al. | |
| 11,620,278 | B2 | 4/2023 | Korpman et al. | |
| 11,636,105 | B2 | 4/2023 | Pal et al. | |
| 11,921,710 | B2 * | 3/2024 | Gylfason | G06F 16/2425 |
| 12,254,002 | B2 * | 3/2025 | Gylfason | G06F 16/2425 |
| 12,278,740 | B2 * | 4/2025 | Joshi | G06Q 30/0601 |
| 12,647,434 | B2 * | 6/2026 | Woodlee | H04L 63/1416 |
| 2004/0015487 | A1 | 1/2004 | Lin et al. | |
| 2007/0011668 | A1 | 1/2007 | Wholey et al. | |
| 2008/0092109 | A1 | 4/2008 | Kinnucan et al. | |
| 2008/0092111 | A1 | 4/2008 | Kinnucan et al. | |
| 2008/0222129 | A1 | 9/2008 | Komatsu et al. | |
| 2012/0158757 | A1 | 6/2012 | Bhattacharjee et al. | |
| 2017/0034023 | A1 * | 2/2017 | Nickolov | H04L 43/0817 |
| 2018/0129699 | A1 | 5/2018 | Gould et al. | |
| 2018/0232403 | A1 | 8/2018 | Bhatti et al. | |
| 2018/0232404 | A1 * | 8/2018 | Bhatti | G06F 16/9024 |
| 2019/0097907 | A1 * | 3/2019 | Nickolov | H04L 41/0869 |
| 2019/0179723 | A1 | 6/2019 | Allin et al. | |
| 2019/0205470 | A1 | 7/2019 | Ronen et al. | |
| 2019/0303473 | A1 | 10/2019 | Sen et al. | |
| 2020/0204468 | A1 * | 6/2020 | Nickolov | H04L 43/0817 |
| 2020/0234242 | A1 | 7/2020 | Parks et al. | |
| 2021/0232485 | A1 | 7/2021 | Agarwal et al. | |
| 2022/0245140 | A1 * | 8/2022 | Gylfason | G06F 16/2425 |
| 2022/0245154 | A1 | 8/2022 | Gylfason et al. | |
| 2024/0086409 | A1 | 3/2024 | Clemens et al. | |
| 2024/0346019 | A1 * | 10/2024 | Gylfason | G06F 16/2425 |
| 2025/0252094 | A1 * | 8/2025 | Gylfason | G06F 16/2425 |
| 2025/0322177 | A1 * | 10/2025 | Radivojevic | G06F 16/243 |
| 2026/0081934 | A1 * | 3/2026 | Woodlee | H04L 63/1416 |
| 2026/0111746 | A1 * | 4/2026 | Perera | G06F 9/547 |

FOREIGN PATENT DOCUMENTS

| | | | |
|---|---|---|---|
| CN | 111492344 | A | 8/2020 |
| JP | 2017-520047 | A | 7/2017 |
| JP | 2019-040598 | A | 3/2019 |

OTHER PUBLICATIONS

Graph Frames: An Integrated API for Mixing Graph and Relational Queries (Year: 2016).*

U.S. Appl. No. 17/587,130, filed Jan. 28, 2022, Gylfason et al.

U.S. Appl. No. 18/415,067, filed Jan. 17, 2024, Gylfason et al.

PCT/US2022/014270, May 12, 2022, International Search Report and Written Opinion.

PCT/US2022/014232, May 12, 2022, International Search Report and Written Opinion.

PCT/US2022/014232, Aug. 10, 2023, International Preliminary Report on Patentability.

PCT/US2022/014270, Aug. 10, 2023, International Preliminary Report on Patentability.

International Search Report and Written Opinion mailed May 12, 2022 for International Application No. PCT/US2022/014270.

International Search Report and Written Opinion mailed May 12, 2022 for International Application No. PCT/US2022/014232.

International Preliminary Report on Patentability for International Application No. PCT/US2022/014232 mailed Aug. 10, 2023.

International Preliminary Report on Patentability for International Application No. PCT/US2022/014270 mailed Aug. 10, 2023.

Baltz, Object-oriented data modeling. UNLV Retrospective Theses & Dissertations. 1989:64. 114 pages. https://digitalscholarship.unlv.edu/cgi/viewcontent.cgi?article=1063&context=rtds [Last accessed May 26, 2022].

Rahayu et al., A methodology for transforming inheritance relationships in an object-oriented conceptual model to relational tables. Information and Software Technology. May 15, 2000;42(8):571-92.

Extended European Search Report dated Sep. 24, 2025 in connection with European Application No. 25185143.2.

* cited by examiner

230

| Attribute Name | Value Type | Storage Type |
|---|---|---|
| Name | String | Static |
| Description | String | Static |
| LegacyURL | String | Dynamic |
| LegacyChgDate | Date | Dynamic |

265

430

```
{
  "entityInstances": [
    {
      "entityInstanceID": {
        "entityClass": "TechGroup",
        "identifyingName": "CUST_DWH",
        "displayName": "cust_dwh",
        "entityType": "Schema",
        "compositeID": "484.1001"
      },
      "attributes": {
        "Name": {
          "stringValue": "cust_dwh"
        },
        "DataSets": {
          "entityInstanceValues": [
            {
              "entityInstanceID": {
                "entityClass": "DataSet",
                "identifyingName": "CUSTOMER_INFO",
                "displayName": "CUSTOMER_INFO",
                "entityType": "Table",
                "compositeID": "200.1001"
              },
              "attributes": {
                "Name": {
                  "stringValue": "CUSTOMER_INFO"
                }
              }
            },
            {
              "entityInstanceID": {
                "entityClass": "DataSet",
                "identifyingName": "DEPOSIT_ACCOUNT",
                "displayName": "DEPOSIT_ACCOUNT",
                "entityType": "Table",
                "compositeID": "200.1002"
              },
              "attributes": {
                "Name": {
                  "stringValue": "DEPOSIT_ACCOUNT"
                }
              }
            }
          }
        }
      }
    }
  }
}
```

Identifying Information 431

432

Nested Results 434

Nested Results 436

FIG. 4E

440

442

```
[
  {
    "operation": "ENTITY_QUERY",
    "entitySQL": "Select Name from TechGroup WHERE Name = 'cust_dwh'",
    "select": {
      "attributes": {
        "DataSets": {
          "filterExpression": "Application.Name = 'Feed'",
          "select" : {
            "attributes": {
              "Name": {}
            }
          }
        }
      }
    }
  }
]
```

FIG. 4F

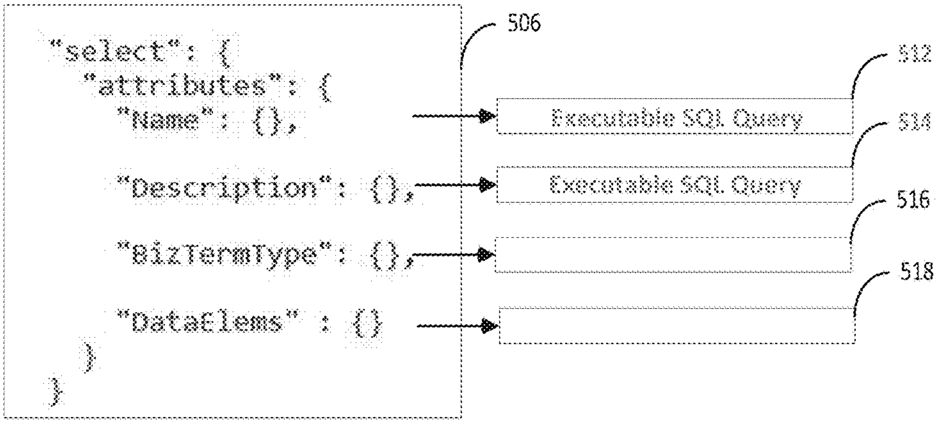

530

```
SELECT TBizTerm.BizTermID "TBizTerm.BizTermID",
       TBizTerm.Name "TBizTerm.Name",
       TBizTerm.Description "TBizTerm.Description"
FROM dd300N_appserver.X_N1043_EMMS_219_QT Tqt
INNER JOIN dd300N_main.AbBizTerm TBizTerm
    ON TBizTerm.BizTermID = Tqt.BizTermID0;
```

532

| [illegible] | [illegible] | [illegible] |
|---|---|---|
| 1024 | Average Exposure | Measure of the expected market-to-market value of derivative receivables at future time periods. |
| 1043 | Asset Quality Rating | Asset Quality Rating (AQR) is the internal rating assigned by the bank determined by the assigned BQR and CQR ratings. |
| 1053 | Address | The party's address. |
| 1097 | Agreement ID | Agreement Number is a value that is used for Counterparty to identify an agreement for netting purposes. |
| 1103 | Address Line 1 | The first line of the party's address. |
| 1108 | Address Line 2 | The second line of the party's address. |
| 1197 | Account Type | enterprise defined account type. 0 is a deposit account; 1 is a secured loan account; 2 is a revolving loan account; 3 is a securities account. |

FIG. 5D

630

```
SELECT TBizTerm.BizTermID "TBizTerm.BizTermID",
       TBizHierarchyDynamic.BizHierarchyTypeID "TBizHierarchyDynamic.BizHierar",
       TBizHierarchyDynamic.QualifiedName "TBizHierarchyDynamic.Qualified",
       TBizHierarchyDynamic.Name "TBizHierarchyDynamic.Name",
       TBizHierarchyXref1.ObjectID "TBizHierarchyXref1.ObjectID",
       TBizHierarchyXref1.ObjectClassID "TBizHierarchyXref1.ObjectClass",
       TBizHierarchyXref1.BizHierarchyID "TBizHierarchyXref1.BizHierarch"
FROM dd300N_appserver.X_N1043_EMMS_297_QT Tqt
INNER JOIN dd300N_appserver.X_N1043_EMMS_298_RP0 Trp0
   ON Trp0.BizTermID = TBizTerm.BizTermID
INNER JOIN dd300N_main.AbBizHierarchyXref TBizHierarchyXref1
   ON TBizHierarchyXref1.ObjectID = TBizTerm.BizTermID
INNER JOIN dd300N_main.AbBizHierarchy TBizHierarchyDynamic
   ON TBizHierarchyDynamic.BizHierarchyID = TBizHierarchyXref1.BizHierarchyID
      AND TBizHierarchyDynamic.BizHierarchyTypeID IN (1001, 1007)
      AND TBizHierarchyXref1.ObjectClassID = 55
```

632 634

FIG. 6D

682

```
SELECT  ...
FROM dd300N_appserver.X_N1043_EMMS_297_QT Tqt
INNER JOIN dd300N_main.AbBizTerm TBizTerm
   ON TBizTerm.BizTermID = Tqt.BizTermID0
INNER JOIN <inheritance path for attributes X, Y, Z>
INNER JOIN dd300N_main.AbBizHierarchyXref TBizHierarchyXref1
...
```

Accessing Inherited Values for Dynamic Attributes Sharing Common Inheritance Path 666

684

```
UNION ALL
SELECT  ...
FROM dd300N_appserver.X_N1043_EMMS_297_QT Tqt
INNER JOIN dd300N_main.AbBizTerm TBizTerm
   ON TBizTerm.BizTermID = Tqt.BizTermID0
INNER JOIN <inheritance path for attributes A, B, C>
INNER JOIN dd300N_main.AbBizHierarchyXref TBizHierarchyXref1
UNION ALL
...
```

Accessing Inherited Values for Dynamic Attributes Sharing Common Inheritance Path 667

FIG. 6F

710

```
SELECT Name
FROM BizTerm
WHERE xCalculationRules LIKE 'Multiply%'
```

FIG. 7B

720

```
SELECT BizTermID, Name
FROM BizTerm
WHERE xCalculationRules LIKE 'Multiply%'
```

FIG. 7C

730

```
SELECT BizTermID, Name
FROM BizTerm
 LEFT OUTER JOIN (
   select TextValue, ObjectID
   from ExtendedAttributeValue
   WHERE ObjectClassID=55 AND
         ExtendedAttributeID=1004
 ) TxCalculationRules
   ON TxCalculationRules.ObjectID = BizTerm.BizTermID
WHERE TxCalculationRules.TextValue LIKE 'Multiply%'
```

FIG. 7D

740

```
SELECT TBizTerm.BizTermID, TBizTerm.Name
FROM main.VbBizTerm TBizTerm
 LEFT OUTER JOIN (
   select TExtendedAttributeValue.TextValue, TExtendedAttributeValue.ObjectID
   from main.VbExtendedAttributeValue TExtendedAttributeValue
   WHERE TExtendedAttributeValue.ObjectClassID=55 AND
         TExtendedAttributeValue.ExtendedAttributeID=1004 AND
         TExtendedAttributeValue.DelChangeSetID IS NULL AND
         TExtendedAttributeValue.PartitionChangeSetID=1 AND
         TExtendedAttributeValue.NextVersionID=9223372036854775807
 ) TxCalculationRules
   ON TxCalculationRules.ObjectID = TBizTerm.BizTermID
WHERE TxCalculationRules.TextValue LIKE 'Multiply%' AND
      TBizTerm.DelChangeSetID IS NULL AND
      TBizTerm.PartitionChangeSetID=1 AND
      TBizTerm.NextVersionID=9223372036854775807
```

FIG. 7E

750

```
SELECT TBizTerm.BizTermID, TBizTerm.Name
FROM main.VbBizTerm TBizTerm
 LEFT OUTER JOIN (
   select TExtendedAttributeValue.TextValue, TExtendedAttributeValue.ObjectID
   from main.VbExtendedAttributeValue TExtendedAttributeValue
   WHERE TExtendedAttributeValue.ObjectClassID=55 AND
         TExtendedAttributeValue.ExtendedAttributeID=1004 AND
         TExtendedAttributeValue.DelChangeSetID IS NULL AND
         TExtendedAttributeValue.PartitionChangeSetID=1 AND
         TExtendedAttributeValue.NextVersionID=9223372036854775807 AND
         TExtendedAttributeValue.DerivedReadGroupID IN (52,54,55,56,66,1034,1035,1067,1351) AND
         EXISTS(
           SELECT 1
           FROM meta.MmPermissionGroupMember pgm
           WHERE pgm.PermissionGroupID = TExtendedAttributeValue.ReadPermissionGroupID AND
                 pgm.PrincipalID IN (52,54,55,56,66,1034,1035,1067,1351))
 ) TxCalculationRules
   ON TxCalculationRules.ObjectID = TBizTerm.BizTermID
WHERE TxCalculationRules.TextValue LIKE 'Multiply%' AND
      TBizTerm.DelChangeSetID IS NULL AND
      TBizTerm.PartitionChangeSetID=1 AND
      TBizTerm.NextVersionID=9223372036854775807 AND
      TBizTerm.DerivedReadGroupID IN (52,54,55,56,66,1034,1035,1067,1351) AND
      EXISTS(
        SELECT 1
        FROM meta.MmPermissionGroupMember pgm
        WHERE pgm.PermissionGroupID = TBizTerm.ReadPermissionGroupID AND
              pgm.PrincipalID IN (52,54,55,56,66,1034,1035,1067,1351))
```

FIG. 7F

```
"entityInstances": [
  {
    "entityInstanceID": {
      "entityClass": "DataElem",
      "identifyingName": "contact_info",
      "displayName": "contact_info",
      "entityType": "FileField",
      "compositeID": "170.65480"
    },
    "attributes": {
      "children": {
        "entityInstanceValues": [
          {
            "entityInstanceID": {
              "entityClass": "DataElem",
              "identifyingName": "contact_info.phone_number",
              "displayName": "phone_number",
              "entityType": "FileField",
              "compositeID": "170.65476"
            },
            "attributes": {
              "children": {
                "entityInstanceValues": []
              },
              "Name": {
                "stringValue": "phone_number"
              }
            }
          }
        ],
```

FIG. 8C-1

```
{
  "entityInstanceID": {
    "entityClass": "DataElem",
    "identifyingName": "contact_info.address",
    "displayName": "address",
    "entityType": "FileField",
    "compositeID": "170.65477"
  },
  "attributes": {
    "children": {
      "entityInstanceValues": [
        {
          "entityInstanceID": {
            "entityClass": "DataElem",
            "identifyingName": "contact_info.address.state",
            "displayName": "state",
            "entityType": "FileField",
            "compositeID": "170.65473"
          },
          "attributes": {
            "children": {
              "entityInstanceValues": []
            },
            "Name": {
              "stringValue": "state"
            }
          }
        },
        {
          "entityInstanceID": {
            "entityClass": "DataElem",
            "identifyingName": "contact_info.address.zip_code",
            "displayName": "zip_code",
            "entityType": "FileField",
            "compositeID": "170.65479"
          },
          "attributes": {
            "children": {
              "entityInstanceValues": []
            },
            "Name": {
              "stringValue": "zip_code"
            }
          }
        },
        {
          "entityInstanceID": {
            "entityClass": "DataElem",
            "identifyingName": "contact_info.address.city",
            "displayName": "city",
            "entityType": "FileField",
            "compositeID": "170.65461"
          },
          "attributes": {
            "children": {
              "entityInstanceValues": []
            },
            "Name": {
              "stringValue": "city"
            }
          }
        },
```

FIG. 8C-2

```
{
  "entityInstanceID": {
    "entityClass": "DataElem",
  "identifyingName": "contact_info.address.address_line",
    "displayName": "address_line",
    "entityType": "FileField",
    "compositeID": "170.65482"
  },
  "attributes": {
    "children": {
      "entityInstanceValues": []
    },
    "Name": {
      "stringValue": "address_line"
    }
  }
}
}
},
"Name": {
  "stringValue": "address"
}
}
},
{
  "entityInstanceID": {
    "entityClass": "DataElem",
    "identifyingName": "contact_info.email",
    "displayName": "email",
    "entityType": "FileField",
    "compositeID": "170.65478"
  },
  "attributes": {
    "children": {
      "entityInstanceValues": []

    },
    "Name": {
      "stringValue": "email"
    }
  }
}
}
},
"Name": {
  "stringValue": "contact_info"
}
}
}
}
```

FIG. 8C-3

810

```
{
  "operation": "ENTITY_QUERY",
  "entityClass": "DataElem",
  "filterExpression": "Name = 'phone_number'",
  "select": {
    "recurseOn": "ParentDataElem",
    "attributes": {
      "Name": {}
    }
  }
}
```

FIG. 8D

820

```
{
  "entityModelRevision": 61,
  "entityInstances": [
    {
      "entityInstanceID": {
        "entityClass": "DataElem",
        "identifyingName": "contact_info.phone_number",
        "displayName": "phone_number",
        "entityType": "FileField",
        "compositeID": "170.65476"
      },
      "attributes": {
        "ParentDataElem": {
          "entityInstanceValue": {
            "entityInstanceID": {
              "entityClass": "DataElem",
              "identifyingName": "contact_info",
              "displayName": "contact_info",
              "entityType": "FileField",
              "compositeID": "170.65480"
            },
            "attributes": {
              "ParentDataElem": {
                "entityInstanceValue": null
              },
              "Name": {
                "stringValue": "contact_info"
              }
            }
          }
        },
        "Name": {
          "stringValue": "phone_number"
        }
      }
    }
  ]
}
```

FIG. 8E

- Select all BizTerms with PIIClassification
  - Fetch: Name, LegacyURL
  - Navigate to BizTermGroup
    - Fetch: Name, DictionaryType

910

Identification Portion 912

Identification Portion 914

```
{
  "operation": "ENTITY_QUERY",
  "queryViewType": {
    "published": {}
  },
  "entitySQL": "SELECT b.BizTermID FROM BizTerm b WHERE b.PIIClassificationID IS NOT NULL",
  "select": {
    "attributes": {
      "Name": null,
      "LegacyURL": {},
      "BizTermGroup": {
        "select" : {
          "attributes": {
            "Name": {},
            "DictionaryType": {}
          }
        }
      }
    }
  }
}
```

FIG. 9C

<table>
<tr><th>Name</th><th>LegacyURL</th><th>BizTermGroup</th></tr>
<tr><td>Credit Score</td><td>http://app/id/abc</td><td><table><tr><th>Name</th><th>DictionaryType</th></tr><tr><td>Enterprise Glossary</td><td>Enterprise</td></tr></table></td></tr>
<tr><td>D.O.B</td><td>http://app/id/xyz</td><td><table><tr><th>Name</th><th>DictionaryType</th></tr><tr><td>Enterprise Acronyms</td><td>Enterprise</td></tr></table></td></tr>
</table>

FIG. 9D

- Select all BizTerms with BizTermGroup having 'Enterprise' DictionaryType
    - Fetch: Name
    - Navigate to BizTermGroup
        - Fetch: Name
    - Navigate to related DataElems
        - Fetch: Name
        - Navigate to DataSet
            - Fetch: Name
            - Navigate to Application
                - Fetch: Name
    - Count all related DataElems
    - Count related DataElems that are not part of an Application
    - Counts related DataElems grouped by Application

FIG. 9E

920

```
{
  "operation": "ENTITY_QUERY",
  "queryViewType": {
    "published": {}
  },
  "entitySQL": "SELECT b.BizTermID from BizTerm b INNER JOIN BizTermGroup bg ON b.BizTermGroupID
= bg.BizTermGroupID WHERE bg.DictionaryType ='Enterprise'",
  "select": {
    "attributes": {
      "Name": null,
      "BizTermGroup": {
        "select": {
          "attributes": {
            "Name": {}
          }
        }
      },
      "DataElems": {
        "select": {
          "attributes": {
            "Name": {},
            "DataSet": {
              "select": {
                "attributes": {
                  "Name": {},
                  "Application": {
                    "select": {
                      "attributes": {
                        "Name": {}
                      }
                    }
                  }
                }
              }
            }
          }
        }
      }
    },
```

FIG. 9F-1

```
"CountDataElems": {
  "expression": "COUNT(DataElems)"
},
"CountDataElemsWithoutApp": {
  "inlineView": {
    "queryType": "TABULAR_QUERY",
    "entitySQL": "SELECT de.BizTermID, COUNT(*) FROM DataElem de INNER JOIN DataSet ds ON
de.DataSetID = ds.DataSetID WHERE ds.ApplicationID IS NULL GROUP BY de.BizTermID",
    "outerJoinKeys": [
      "BizTermID"
    ],
    "innerJoinKeys": [
      "BizTermID"
    ]
  }
},
"CountOfDataElemsByApp": {
  "inlineView": {
    "queryType": "TABULAR_QUERY",
    "entitySQL": "Select de.BizTermID, a.Name AS AppName, COUNT(*) Count FROM DataElem de
LEFT OUTER JOIN DataSet ds ON de.DataSetID = ds.DataSetID LEFT OUTER JOIN Application a ON
ds.ApplicationID = a.ApplicationID GROUP BY de.BizTermID, a.Name",
    "outerJoinKeys": [
      "BizTermID"
    ],
    "innerJoinKeys": [
      "BizTermID"
    ]
  }
}
}
}
}
}
```

Inline View 922 (brackets "CountDataElemsWithoutApp")

Inline View 924 (brackets "CountOfDataElemsByApp")

FIG. 9F-2

| Name | BizTermGroup | DataElems | CountDataElems | CountDataElemsByApp | CountDataElemsWithoutApp |
|---|---|---|---|---|---|
| Credit Score | Name: Enterprise Glossary | Name: credit_score<br>DataSet: Name: cust_info.dat; Application: Name: Retail<br><br>Name: c_score<br>DataSet: Name: residential_cust.dat; Application: Name: Reporting<br>Name: business_cust.dat; Application: Name: Reporting | 2 | ApplicationName: Retail, Count: 1<br>ApplicationName: Reporting, Count: 2 | 0 |
| D.O.B. | Name: Enterprise Acronyms | Name: birth_date<br>DataSet: Name: demographics.dat; Application: NULL | 1 | NULL | 1 |

FIG. 9G

```
[
  {
    "operation": "TABULAR_QUERY",
    "entitySQL" : "SELECT b.Name as BizTermName, p.Name as ParentBizTermName FROM BizTerm b INNER JOIN BizTerm
p ON b.ParentBizTermID = p.BizTermID"
  }
]
```

FIG. 10A

```
[
  {
    "entityModelRevision": 74,
    "rows": [
      {
        "columns": {
          "BizTermName": {
            "stringValue": "Publicly Held Company"
          },
          "ParentBizTermName": {
            "stringValue": "Corporations"
          }
        }
      },
      {
        "columns": {
          "BizTermName": {
            "stringValue": "Publicly Held Company"
          },
          "ParentBizTermName": {
            "stringValue": "Corporations"
          }
        }
      }
    ],...
  }
]
```

FIG. 10B

```
[
  {
    "operation": "TABULAR_QUERY",
    "entitySQL" : " SELECT tg.Name, cnt.DataSetCount FROM TechGroup tg LEFT OUTER JOIN (SELECT ds.TechGroupID
TechGroupID, COUNT(ds.DataSetID) DataSetCount FROM DataSet ds GROUP BY ds.TechGroupID) cnt ON cnt.TechGroupID
tg.TechGroupID",
    "globalOptions" : {
      "retrieveDefinition" : true
    }
  }
]
```

FIG. 10C

```
[
  {
    "entityModelRevision": 74,
    "rowDefinition": {
      "columnDefinitions": {
        "Name": {
          "dataType": "STRING",
          "underlyingAttributeDefinition": {
            "dataType": "STRING",
            "displayName": "Name",
            "required": true,
            "maxLength": 256
          }
        },
        "DataSetCount": {
          "dataType": "NUMBER"
        }
      }
    },
    "rows": [
      {
        "columns": {
          "Name": {
            "stringValue": "cust_dwh"
          },
          "DataSetCount": {
            "numberValue": "2"
          }
        }
      },
      {
        "columns": {
          "Name": {
            "stringValue": "risk_dwh",
          },
          "DataSetCount": {
            "numberValue": "5"
          }
        }
      },...
    ]
  }
]
```

FIG. 10D

```
[
  {
    "operation": "ENTITY_QUERY",
    "entityClass": "BizTerm",
    "filterExpression": "COUNT(DataElems) > 0",
    "select": {
      "attributes": {
        "Name": {},
        "Applications": {
          "inlineView": {
            "queryType": "ENTITY_QUERY",
            "entitySQL": "SELECT a.Name, de.BizTermID FROM Application a INNER JOIN DataSet ds on ds.
ApplicationID = a.ApplicationID INNER JOIN DataElem de on de.DataSetID = ds.DataSetID",
            "outerJoinKeys": ["BizTermID"],
            "innerJoinKeys": ["BizTermID"]
          },
          "select" : {
            "attributes": {
              "Name": {}
            }
          }
        }
      }
    }
  }
]
```

FIG. 10E

```
[
  {
    "operation": "ENTITY_QUERY",
    "entitySQL": "Select Name from TechSystem",
    "select": {
      "attributes": {
        "CountOfDataSetsByTechGroup": {
          "inlineView": {
            "queryType": "TABULAR_QUERY",
            "entitySQL": "SELECT tg.TechSystemID, tg.TechGroupID, count(*) as Cnt FROM  TechGroup tg INNER JOIN
DataSet ds on ds.TechGroupID = tg.TechGroupID GROUP BY TechSystemID, TechGroupID",
            "outerJoinKeys": ["TechSystemID"],
            "innerJoinKeys": ["TechSystemID"]
          }
        }
      }
    }
  }
]
```

FIG. 10F

```
{
  {
    "entityInstances": [
      {
        "entityInstanceID": {
          "entityClass": "BizTerm",
          "identifyingName": "Postal Code",
          "displayName": "Postal Code",
          "entityType": "SDE",
          "compositeID": "54.1005"
        },
        "attributes": {
          "Name": {
            "stringValue": "Postal Code"
          },
          "Applications": {
            "entityInstanceValues": [
              {
                "entityInstanceID": {
                  "entityClass": "Application",
                  "identifyingName": "Feed",
                  "displayName": "Feed",
                  "entityType": "Application",
                  "compositeID": "20.1012"
                },
                "attributes": {
                  "Name": {
                    "stringValue": "Feed"
                  }
                }
              },
              {
                "entityInstanceID": {
                  "entityClass": "Application",
                  "identifyingName": "Storage",
                  "displayName": "Storage",
                  "entityType": "Application",
                  "compositeID": "20.1040"
                },
                "attributes": {
                  "Name": {
                    "stringValue": "Storage"
                  }
                }
              }
            }
          }
        }
      }
    },
```

FIG. 10G-1

```
{
  "entityInstanceID": {
    "entityClass": "BizTerm",
    "identifyingName": "Legal Entity ID",
    "displayName": "Legal Entity ID",
    "entityType": "SDE",
    "compositeID": "54.1006"
  },
  "attributes": {
    "Name": {
      "stringValue": "Legal Entity ID"
    },
    "Applications": {
      "entityInstanceValues": [
        {
          "entityInstanceID": {
            "entityClass": "Application",
            "identifyingName": "Storage",
            "displayName": "Storage",
            "entityType": "Application",

          },
          "attributes": {
            "Name": {
              "stringValue": "Storage"
            }
          }
        },
        {
          "entityInstanceID": {
            "entityClass": "Application",
            "identifyingName": "Storage",
            "displayName": "Storage",
            "entityType": "Application",
            "compositeID": "20.1040"
          },
          "attributes": {
            "Name": {
              "stringValue": "Storage"
            }
          }
        }
      }
    }
  }
},...
  }
 }
}
```

FIG. 10G-2

```
"entityInstances": [
  {
    "entityInstanceID": {
      "entityClass": "TechSystem"

      "identifyingName": "orcl",
      "displayName": "orcl",
      "entityType": "Database",
      "compositeID": "523.1001"
    },
    "attributes": {
      "Name": {
        "stringValue": "orcl"
      },
      "CountOfDataSetsByTechGroup": {
        "rowValues": [
          {
            "columns": {
              "TechSystemID": {
                "numberValue": 1001
              },
              "TechGroupID": {
                "numberValue": 1003
              },
              "Cnt": {
                "numberValue": 5
              }
            }
          },
          {
            "columns": {
              "TechSystemID": {
                "numberValue": 1001
              },
              "TechGroupID": {
                "numberValue": 1001
              },
              "Cnt": {
                "numberValue": 2
              }
            }
          }
        ]
      }
    }
  }
],
```

FIG. 10H-1

```
{
  "entityInstanceID": {
    "entityClass": "TechSystem",
    "identifyingName": "CreditRisk",
    "displayName": "CreditRisk",
    "entityType": "Database",
    "compositeID": "523.1003"
  },
  "attributes": {
    "Name": {
      "stringValue": "CreditRisk"
    },
    "CountOfDataSetsByTechGroup": {
      "rowValues": [
        {
          "columns": {
            "TechSystemID": {
              "numberValue": 1003
            },
            "TechGroupID": {
              "numberValue": 1018
            },
            "Cnt": {
              "numberValue": 1
            }
          }
        },
        {
          "columns": {
            "TechSystemID": {
```

FIG. 10H-2

```
                "numberValue": 1003
              },
              "TechGroupID": {
                "numberValue": 1028
              },
              "Cnt": {
                "numberValue": 2
              }
            }
          }
        ]
      }
    }
  },
  {
    "entityInstanceID": {
      "entityClass": "TechSystem",
      "identifyingName": "Technical Repository",
      "displayName": "Technical Repository",
      "entityType": "EMS_TR",
      "compositeID": "S23.1004"
    },
    "attributes": {
      "Name": {
        "stringValue": "Technical Repository"
      },
      "CountOfDataSetsByTechGroup": {
        "rowValues": [
          {
            "columns": {
              "TechSystemID": {
                "numberValue": "1004"
              },
              "TechGroupID": {
                "numberValue": "1005"
              },
              "Cnt": {
                "numberValue": "1"
              }
            }
          },
          {
            "columns": {
              "TechSystemID": {
                "numberValue": "1004"
              },
              "TechGroupID": {
                "numberValue": "1003"
              },
              "Cnt": {
                "numberValue": "2"
              }
            }
          }
        ]
      }
    }
  }
}
```

FIG. 10H-3

SYSTEMS AND METHODS FOR ACCESSING DATA ENTITIES MANAGED BY A DATA PROCESSING SYSTEM

CROSS-REFERENCE TO RELATED APPLICATIONS

This Application is a continuation of and claims priority under 35 U.S.C. § 120 to U.S. application Ser. No. 18/415,067, filed Jan. 17, 2024, which is a continuation of and claims priority under 35 U.S.C. § 120 to U.S. patent application Ser. No. 17/587,181, filed on Jan. 28, 2022, and titled "SYSTEMS AND METHODS FOR ACCESSING DATA ENTITIES MANAGED BY A DATA PROCESSING SYSTEM", which claims the benefit of priority under 35 U.S.C. 119(e) to U.S. Provisional Patent Application Ser. No. 63/143,895, filed on Jan. 31, 2021, and titled "SYSTEMS AND METHODS FOR ACCESSING DATA ENTITIES MANAGED BY A DATA PROCESSING SYSTEM", which is hereby incorporated by reference herein in its entirety.

FIELD

Aspects of the present disclosure relate to techniques for managing access to (e.g., querying, creating, updating, or deleting) data managed by a data processing system using data entities and data entity instances.

BACKGROUND

Modern data processing systems manage vast amounts of data (e.g., millions, billions, or trillions of data records) and manage how these data may be accessed. A data processing system may provide multiple interfaces for accessing data that it manages. For example, a data processing system may provide a graphical user interface (GUI) through which a user may perform actions on data (e.g., query, update, delete, create) managed by the data processing system. As another example, the data processing system may provide an application programming interface (API) through which software programs may perform actions on data managed by the data processing system.

SUMMARY

Some embodiments provide for a method, performed by a data processing system, for obtaining, in a computationally efficient manner, a first attribute value of a first instance of a data entity in response to a query, the method comprising: obtaining, through an application programming interface (API) of the data processing system, a query for accessing data, the query comprising: a first portion comprising information for identifying at least the first instance of the data entity stored in at least one data store; and a second portion indicating at least one attribute of the data entity for which to obtain a value; generating a plurality of executable queries including a first set of one or more executable queries and a second set of one or more executable queries, the generating comprising: using the first portion of the query, generating the first set of executable queries for identifying at least the first instance of the data entity stored in the at least one data store; using the second portion of the query, generating the second set of executable queries for obtaining attribute values for at least the first instance of the data entity identified using the first set of executable queries, the attribute values including the first attribute value; obtaining results for the query provided via the API by executing the plurality of executable queries, the results including at least the first attribute value of the first instance of the data entity; and outputting at least some of the results including at least the first attribute value of the first instance of the data entity.

Some embodiments provide for a data processing system, comprising: at least one computer hardware processor, and at least one non-transitory computer-readable storage medium storing processor-executable instructions that, when executed by the at least one computer hardware processor, cause the at least one computer hardware processor to perform a method for obtaining a first attribute value of a first instance of a data entity in response to a query, the method comprising: obtaining, through an application programming interface (API) of the data processing system, a query for accessing data, the query comprising: a first portion comprising information for identifying at least the first instance of the data entity stored in at least one data store; and a second portion indicating at least one attribute of the data entity for which to obtain a value; generating a plurality of executable queries including a first set of one or more executable queries and a second set of one or more executable queries, the generating comprising: using the first portion of the query, generating the first set of executable queries for identifying at least the first instance of the data entity stored in the at least one data store; using the second portion of the query, generating the second set of executable queries for obtaining attribute values for at least the first instance of the data entity identified using the first set of executable queries, the attribute values including the first attribute value; obtaining results for the query provided via the API by executing the plurality of executable queries, the results including at least the first attribute value of the first instance of the data entity; and outputting at least some of the results including at least the first attribute value of the first instance of the data entity.

Some embodiments provide for at least one non-transitory computer-readable storage medium storing processor-executable instructions that, when executed by at least one computer hardware processor, cause the at least one computer hardware processor to perform a method for obtaining a first attribute value of a first instance of a data entity in response to a query, the method comprising: obtaining, through an application programming interface (API) of the data processing system, a query for accessing data, the query comprising: a first portion comprising information for identifying at least the first instance of the data entity stored in at least one data store; and a second portion indicating at least one attribute of the data entity for which to obtain a value; generating a plurality of executable queries including a first set of one or more executable queries and a second set of one or more executable queries, the generating comprising: using the first portion of the query, generating the first set of executable queries for identifying at least the first instance of the data entity stored in the at least one data store; using the second portion of the query, generating the second set of executable queries for obtaining attribute values for at least the first instance of the data entity identified using the first set of executable queries, the attribute values including the first attribute value; obtaining results for the query provided via the API by executing the plurality of executable queries, the results including at least the first attribute value of the first instance of the data entity; and outputting at least some of the results including at least the first attribute value of the first instance of the data entity.

In some embodiments, the first and second sets of executable queries comprise executable structured query language (SQL) queries.

In some embodiments, the first portion comprises information for identifying one or more instances of each of a plurality of data entities, the plurality of data entities includes the data entity; wherein generating the first set of executable queries comprises generating, for each particular data entity of the plurality of data entities, a respective executable query for identifying instances of the data entity stored in the at least one data store.

In some embodiments, the at least one attribute comprises a plurality of attributes of the data entity, and generating the second set of executable queries comprises generating, for each particular attribute of at least some of the plurality of attributes, a respective executable query to obtain values of the particular attribute for instances of the data entity identified using the first set of executable queries.

In some embodiments, the plurality of attributes includes multiple dynamic attributes, and wherein generating the second set of executable queries comprises: grouping the multiple dynamic attributes into groups of dynamic attributes, each of the groups having at least one of the multiple dynamic attributes; and generating a respective executable query for each of the multiple groups of dynamic attributes to obtain values of attributes in the group for the instances of the data entity.

In some embodiments, grouping the multiple dynamic attributes is performed based on type of the dynamic attributes. In some embodiments, grouping the multiple dynamic attributes is performed based on whether dynamic attributes are stored in a same table in the at least one data store. In some embodiments, grouping the multiple dynamic attributes is performed based on whether dynamic attributes inherit their values along a common inheritance path.

In some embodiments, executing the plurality of executable queries comprises: executing the first set of executable queries to obtain information identifying at least the first instance of the data entity; and after executing the first set of executable queries, executing, using the information identifying at least the first instance of the data entity, the second set of executable queries.

In some embodiments, generating the second set of executable queries is performed after executing the first set of executable queries. In some embodiments, generating the second set of executable queries is performed before executing the first set of executable queries.

In some embodiments, the at least one attribute includes multiple groups of dynamic attributes of the data entity, the second set of executable queries includes multiple executable queries respectively corresponding to the multiple groups of dynamic attributes, and executing the second set of executable queries comprises executing each of the multiple executable queries to obtain respective multiple dynamic attribute value results.

In some embodiments, the method further comprises: after executing the second set of executable queries, combining the multiple dynamic value attribute results to obtain the results for the query.

In some embodiments, the second portion of the query comprises an inline view, and generating the second set of executable queries comprises generating an executable query using information specified in the inline view. In some embodiments, the inline view comprises a tabular query. In some embodiments, the tabular query is for performing an aggregate function. In some embodiments, the inline view specifies inner and outer join keys.

In some embodiments, wherein the at least one attribute of the data entity comprises at least one static attribute and at least one dynamic attribute.

In some embodiments, the at least one attribute of the data entity comprises a first dynamic attribute configured to inherit its value from an attribute of a second data entity.

In some embodiments, the second portion of the query indicates a hierarchy of attributes including the at least one attribute. In some embodiments, the second portion of the query indicates, using nesting, at least a part of the hierarchy of attributes.

In some embodiments, the second portion of the query indicates, using recursion, at least a part of the hierarchy of attributes.

In some embodiments, outputting at least some of the results comprises: formatting the at least some of the results in a hierarchical format corresponding to the hierarchy of attributes; and outputting the at least some of the results in the hierarchical format.

In some embodiments, wherein outputting the at least some of the results comprises outputting the at least some of the results in a hierarchical format. In some embodiments, outputting the at least some of the results comprises outputting the results in a non-tabular format.

In some embodiments, the first portion of the query is transformed through a series of transformations that augments the information in the first portion with information managed by the data processing system to generate the first set of executable queries that are configured to be executed against the at least one data store, and the second portion of the query is transformed through a series of transformations that augments the information in the second portion with information managed by the data processing system to generate the second set of executable queries that are configured to be executed against the at least one data store.

In some embodiments, generating the first set of executable queries comprises generating a first executable query at least in part by: generating an intermediate query representation using the first portion of the query; augmenting the intermediate query representation using unique identifier information, dynamic attribute reference information, view type information, and/or permissions information to obtain an augmented intermediate query representation; and generating the first executable query using the augmented intermediate query representation. In some embodiments, generating the first executable query comprises generating an executable SQL query. In some embodiments, generating the intermediate query representation comprises generating an abstract syntax tree.

In some embodiments, generating the second set of executable queries comprises generating a second executable query at least in part by: generating an intermediate query representation using the second portion of the query; augmenting the intermediate query representation using unique identifier information, dynamic attribute reference information, view type information, and/or permissions information to obtain an augmented intermediate query representation; and generating the second executable query using the augmented intermediate query representation.

In some embodiments, executing the plurality of executable queries comprises executing the first set of executable queries to obtain information identifying a plurality of data entity instances, and wherein generating the second set of one or more executable queries is performed using the second portion of the query and the information identifying the plurality of data entity instances.

In some embodiments, the at least one attribute includes a plurality of attributes, each attribute of the plurality of attributes is configured to inherit its value from one or more attributes of a same other data entity instance, the method further comprising: grouping, by the data processing system, the plurality of attributes into a single group; generating a single executable query for the single group; and executing the single executable query by the data processing system to cause the data processing system to obtain attribute values of the plurality of attributes.

In some embodiments, the at least one attribute includes a plurality of attributes, each attribute of the plurality of attributes is configured to inherit its value from one or more attributes of another data entity instance, the method further comprising: grouping, by the data processing system, the plurality of attributes into one or more groups using a grouping criterion; and generating a separate executable query for each of the groups, said separate executable queries, when executed by the data processing system, cause the data processing system to obtain attribute values of the attributes of the respective groups.

In some embodiments, grouping criterion is to group attributes of the attributes that share a common inheritance path into a single group such that a single one of the separate executable queries is used to access the inherited values for these grouped attributes.

In some embodiments, the at least one data store is configured to store a plurality of data entity instances and associated attribute values as well as information defining relationships among different data entity instances, wherein the at least one data store is configured to store, using the plurality of data entity instances, information describing data stored in distributed databases of a distributed network of computing systems which are communicatively connected with the data processing system.

In some embodiments, the at least one data store is configured to store a data entity instance of the plurality of data entity instances for each of multiple datasets stored by the distributed databases of the distributed computing systems, for each of multiple software applications configured to be executed by some system part of the distributed computing systems, or for each or multiple system parts of the distributed computing systems.

In some embodiments, the query is a declarative query.

Some embodiments provide for a method for using queries to obtain information about data entity instances managed by a data processing system using at least one data store, the method comprising using at least one computer hardware processor to perform: obtaining a query comprising: a first portion comprising information for identifying instances of at least one data entity stored in the at least one data store; and a second portion indicating at least one attribute of the at least one data entity; generating, from the query, a plurality of executable queries including a first set of one or more executable queries and a second set of one or more executable queries, the generating comprising: generating, using the first portion of the query, the first set of one or more executable queries for identifying instances of the at least one data entity stored in the at least one data store; generating, using the second portion of the query, the second set of one or more executable queries for obtaining attribute values for instances of the at least one data entity identified using the first set of executable queries; executing the plurality of executable queries to obtain results for the query; and outputting the results.

Some embodiments provide for a data processing system configured to manage a plurality of data entity instances using at least one data store, the data processing system comprising: at least one computer hardware processor; and at least one non-transitory computer-readable storage medium storing processor executable instructions that, when executed by the at least one computer hardware processor, cause the at least one computer hardware processor to perform a method comprising: obtaining a query comprising: a first portion comprising information for identifying instances of at least one data entity stored in the at least one data store; and a second portion indicating at least one attribute of the at least one data entity; generating, from the query, a plurality of executable queries including a first set of one or more executable queries and a second set of one or more executable queries, the generating comprising: generating, using the first portion of the query, the first set of one or more executable queries for identifying instances of the at least one data entity stored in the at least one data store; generating, using the second portion of the query, the second set of one or more executable queries for obtaining attribute values for instances of the at least one data entity identified using the first set of executable queries; executing the plurality of executable queries to obtain results for the query; and outputting the results.

Some embodiments provide for at least one non-transitory computer-readable storage medium storing processor executable instructions that, when executed by at least one computer hardware processor, cause the at least one computer hardware processor to perform a method comprising: obtaining a query comprising: a first portion comprising information for identifying instances of at least one data entity stored in at least one data store; and a second portion indicating at least one attribute of the at least one data entity; generating, from the query, a plurality of executable queries including a first set of one or more executable queries and a second set of one or more executable queries, the generating comprising: generating, using the first portion of the query, the first set of one or more executable queries for identifying instances of the at least one data entity stored in the at least one data store; generating, using the second portion of the query, the second set of one or more executable queries for obtaining attribute values for instances of the at least one data entity identified using the first set of executable queries; executing the plurality of executable queries to obtain results for the query; and outputting the results.

Some embodiments provide for a method for using queries to obtain information about data entity instances managed by a data processing system using at least one data store, the method comprising using at least one computer hardware processor to perform obtaining a query comprising: a first portion comprising information for identifying instances of at least one data entity stored in the at least one data store; and a second portion indicating at least one attribute of the at least one data entity; generating, using the first portion of the query, a first set of one or more executable queries for identifying instances of the at least one data entity stored in the at least one data store; executing, the first set of one or more executable queries to obtain information identifying a first plurality of data entity instances: generating, using the second portion of the query and the information identifying the first plurality of data entity instances, a second set of one or more executable queries for obtaining attribute values for the first plurality of data entity instances; and executing the second set of one or more executable queries to obtain the attribute values for the first plurality of data entity instances.

Some embodiments provide for a method, comprising: using at least one computer hardware processor to perform:

obtaining a query, the query comprising: a first portion comprising information for identifying instances of at least one data entity stored in at least one data store; and a second portion indicating a hierarchy of attributes including at least one attribute of the at least one data entity; generating, from the query, a plurality of executable queries for obtaining, from at least one data store, instances of the at least one data entity and attribute values for the instances of the at least one data entity; executing the plurality of executable queries to obtain results for the query; and outputting the results in a hierarchical format corresponding to the hierarchy of attributes.

Some embodiments provide for a data processing system, comprising: at least one computer hardware processor; and at least one non-transitory computer-readable storage medium storing processor executable instructions that, when executed by the at least one computer hardware processor, causes the at least one computer hardware processor to perform a method comprising: obtaining a query, the query comprising: a first portion comprising information for identifying instances of at least one data entity stored in at least one data store; and a second portion indicating a hierarchy of attributes including at least one attribute of the at least one data entity; generating, from the query, a plurality of executable queries for obtaining, from at least one data store, instances of the at least one data entity and attribute values for the instances of the at least one data entity; executing the plurality of executable queries to obtain results for the query; and outputting the results in a hierarchical format corresponding to the hierarchy of attributes.

Some embodiments provide for at least one non-transitory computer-readable storage medium storing processor executable instructions that, when executed by at least one computer hardware processor, causes the at least one computer hardware processor to perform a method comprising: obtaining a query, the query comprising: a first portion comprising information for identifying instances of at least one data entity stored in at least one data store; and a second portion indicating a hierarchy of attributes including at least one attribute of the at least one data entity; generating, from the query, a plurality of executable queries for obtaining, from at least one data store, instances of the at least one data entity and attribute values for the instances of the at least one data entity; executing the plurality of executable queries to obtain results for the query; and outputting the results in a hierarchical format corresponding to the hierarchy of attributes.

Some embodiments provide for a method, comprising using at least one computer hardware processor to perform: obtaining a query, the query comprising: a first portion comprising information for identifying instances of at least one data entity stored in at least one data store; and a second portion indicating at least one attribute of the at least one data entity; generating, from the query, a plurality of executable queries for obtaining, from at least one data store, instances of the at least one data entity and attribute values for the instances of the at least one data entity; executing the plurality of executable queries to obtain results for the query; and outputting the results.

Some embodiments provide for a data processing system comprising: at least one computer hardware processor, and at least one non-transitory computer-readable storage medium storing processor executable instructions that, when executed by the at least one computer hardware processor, causes the at least one computer hardware processor to perform a method comprising: obtaining a query, the query comprising: a first portion comprising information for identifying instances of at least one data entity stored in at least one data store; and a second portion indicating at least one attribute of the at least one data entity; generating, from the query, a plurality of executable queries for obtaining, from at least one data store, instances of the at least one data entity and attribute values for the instances of the at least one data entity; executing the plurality of executable queries to obtain results for the query; and outputting the results.

Some embodiments provide for at least one non-transitory computer-readable storage medium storing processor executable instructions that, when executed by at least one computer hardware processor, causes the at least one computer hardware processor to perform a method comprising: obtaining a query, the query comprising: a first portion comprising information for identifying instances of at least one data entity stored in at least one data store; and a second portion indicating at least one attribute of the at least one data entity; generating, from the query, a plurality of executable queries for obtaining, from at least one data store, instances of the at least one data entity and attribute values for the instances of the at least one data entity; executing the plurality of executable queries to obtain results for the query; and outputting the results.

Some embodiments provide for a method for using queries to obtain information about data entity instances managed by a data processing system using at least one data store, the method comprising using at least one computer hardware processor to perform: obtaining a tabular query; generating, from the tabular query, a set of one or more executable queries for accessing data stored in the at least one data store using one or more data entity instances, the generating comprising: generating an intermediate query representation of the tabular query; augmenting the intermediate query representation using unique identifier information, dynamic attribute reference information, view type information, and/or permissions information to obtain an augmented intermediate query representation; and generating the set of one or more executable queries using the augmented intermediate query representation; executing the set of executable queries to obtain results for the tabular query; and outputting at least some of the results.

The foregoing is a non-limiting summary of the invention, which is defined by the attached claims.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

FIG. 4E illustrates example results returned in response to processing the declarative query 420 shown in FIG. 4D, in accordance with some embodiments of the technology described herein.

FIG. 4F is a diagram of a variation of the declarative query 420 shown in FIG. 4D that is designed to reduce the number of related data entity instance results returned when the query is processed, in accordance with some embodiments of the technology described herein.

FIG. 5D is a diagram illustrating an enrichment portion of the declarative query 502 shown in FIG. 5A, an example of an executable SQL query that may be generated using the enrichment portion of the declarative query 502, and an illustration of at least a portion of the results that may be obtained by executing the executable SQL query, in accordance with some embodiments of the technology described herein.

FIGS. 6C-1, 6C-2, and 6C-3 are diagrams illustrating a declarative query 610 having an enrichment portion specifying multiple dynamic attributes, some of which are of a common type, in accordance with some embodiments of the technology described herein.

FIG. 6D is a diagram illustrating an example SQL query for obtaining values of dynamic attributes xRegion and xLineOfBusiness of a same type, in accordance with some embodiments of the technology described herein.

FIG. 6F is a diagram illustrating example SQL queries for accessing values of inherited dynamic attributes sharing a common inheritance path, in accordance with some embodiments of the technology described herein.

FIGS. 7B-7F show illustrate a sequence of transformations performed on at least a portion of a declarative query to generate one or more database-specific executable SQL queries, in accordance with some embodiments of the technology described herein.

FIGS. 8C-1, 8C-2, and 8C-3 show illustrative results obtained by a data processing system by processing the example declarative query 805 shown in FIG. 8B.

FIG. 8D shows another example declarative query 810 for retrieving hierarchical data using recursion, in accordance with some embodiments of the technology described herein.

FIG. 8E shows illustrative results obtained by a data processing system by processing the example declarative query 810 shown in FIG. 8D.

FIG. 9C shows a JavaScript Object Notation (JSON) implementation of the pseudo-code declarative query specification shown in FIG. 9B, in accordance with some embodiments of the technology described herein.

FIG. 9D shows an illustrative view of results that may be obtained by processing the JSON declarative query of FIG. 9C, in accordance with some embodiments of the technology described herein.

FIG. 9E shows a pseudo-code specification of another declarative query for retrieving hierarchical data, in accordance with some embodiments of the technology described herein.

FIGS. 9F-1 and 9F-2 show a JSON implementation of the pseudo-code declarative query specification shown in FIG. 9E, in accordance with some embodiments of the technology described herein.

FIG. 9G shows an illustrative view of results that may be obtained by processing the JSON declarative query of FIGS. 9F-1 and 9F-2, in accordance with some embodiments of the technology described herein.

FIG. 10A shows an illustrative declarative tabular query, in accordance with some embodiments of the technology described herein.

FIG. 10B shows illustrative results for the declarative tabular query shown in FIG. 10A, in accordance with some embodiments of the technology described herein.

FIG. 10C shows another illustrative declarative tabular query, in accordance with some embodiments of the technology described herein.

FIG. 10D shows illustrative results for the declarative tabular query shown in FIG. 10C, in accordance with some embodiments of the technology described herein.

FIGS. 10E and 10F show illustrative declarative queries with inline views, in accordance with some embodiments of the technology described herein.

FIGS. 10G-1 and 10G-2 show illustrative results of executing the declarative query of FIG. 10E, in accordance with some embodiments of the technology described herein.

FIGS. 10H-1, 10H-2, and 10H-3 shows illustrative results of executing the declarative query of FIG. 10F, in accordance with some embodiments of the technology described herein.

DETAILED DESCRIPTION

Figure 1A:
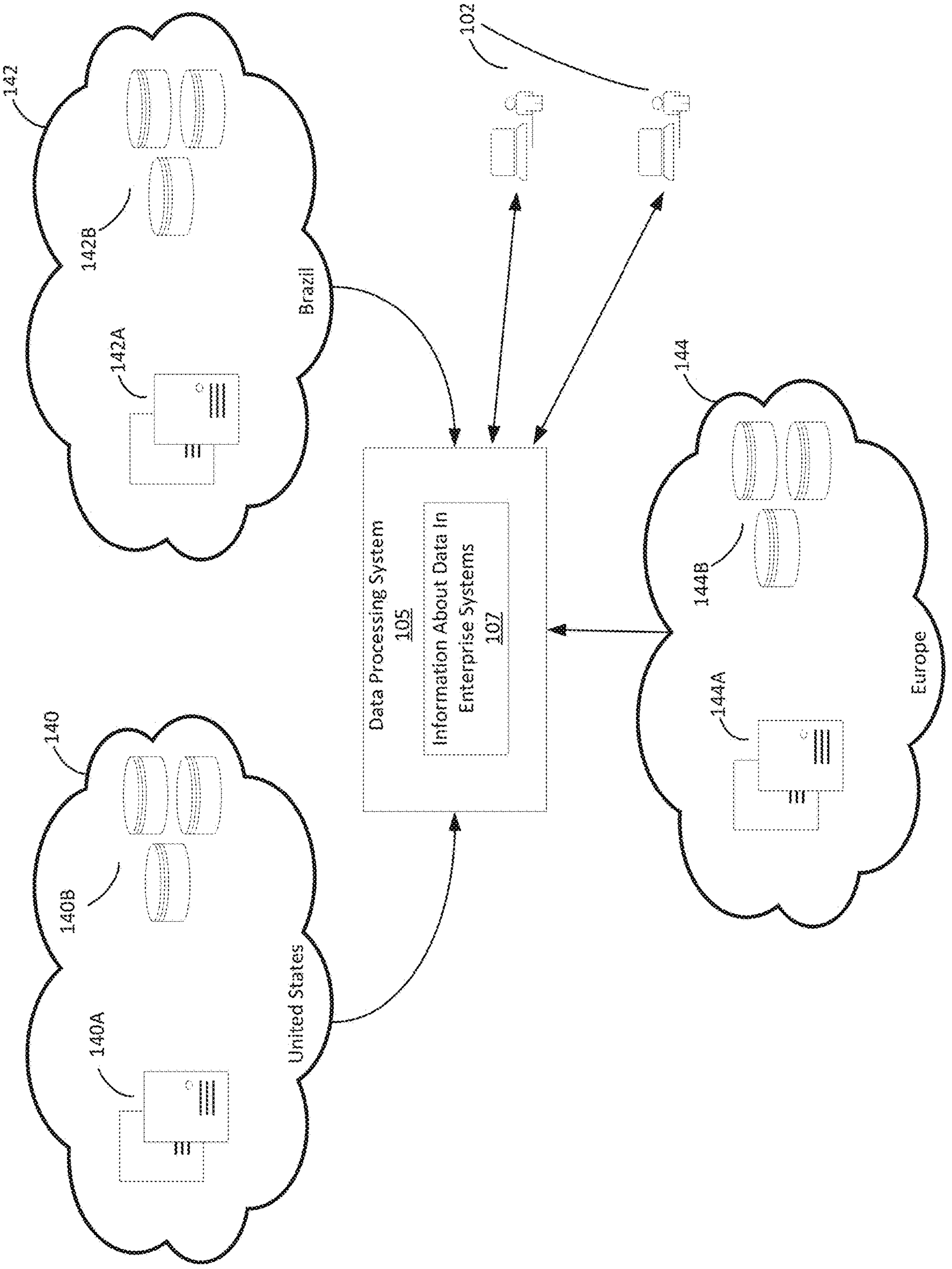
FIG. 1A shows an example environment in which a data processing system may operate, in accordance with some embodiments of the technology described herein.

The inventors have developed new techniques that allow for efficiently accessing (e.g., querying, creating, updating, and deleting) data that is managed by a data processing system using data entities and instances thereof. As described herein, in some embodiments, a data processing system may manage data using data entities, which may be used to organize the data using an object-oriented paradigm. Similar to how object-oriented programming involves classes and instances thereof, a data processing system may be configured with definitions of data entities and manage data using instances of the data entities and the data entity definitions. An instance of a data entity may be referred to as a "data entity instance" herein. A data entity may include multiple attributes, which may take on different values such as numbers, strings, or references to other data entities when instantiated. The techniques developed by the inventors allow for efficient access to the data entity instances managed by the data processing system.

In particular, the inventors have developed an interface, which may be embodied in an application programming interface (API), for providing efficient access to the data entity instances managed by the data processing system. Since the interface/API is for providing access to data entity instances, it is sometimes referred to herein as the "entity" API. The entity API provides users and computer programs with a declarative language for specifying a desired action to be performed such as, for example, querying the data processing system for data entity instances satisfying one or more criteria, creating new data entity instances, updating the values of data entity instances, and deleting existing data entity instances. The entity API receives input indicating a desired action and specified in the declarative language (e.g., using JavaScript Object Notation (JSON) or any other suitable format), generates executable statements from the input (e.g., executable SQL queries when the desired action is to query the data processing system for data entity instances, and the data entity instances are stored in a relational database supporting SQL), and executes the executable statements to perform the desired action.

The inventors have recognized that a data processing system may be configured to manage millions or billions of data entity instances. For example, as described below in more detail with reference to FIG. 1A, the techniques described herein may be used, in some embodiments, for metadata management in an enterprise setting, whereby data entity instances store information about individual data sets (e.g., tables, transactions, documents, data records, etc.) stored across a globally distributed information technology (IT) infrastructure comprising many databases, data warehouses, data lakes, etc. In this context, a data entity instance may store information about a corresponding dataset such as, for example, when the dataset was created, where it is stored, its size, the identity of the user(s) that are allowed to edit the dataset, information identifying which application programs use the dataset, information identifying the sensitivity level of the data, etc. Since a large organization (e.g., a financial institution such as a bank or credit card company, a utility such as a phone or electric company, etc.) will typically manage millions or billions of such datasets, there may be millions or billions of data entity instances storing information about such datasets that would be managed by the data processing system. Since, in this example application, the data processing system would store information about other data (sometimes called "metadata"), this example application may be called "metadata management". However, it should be appreciated that the techniques described herein are not limited to data processing systems being used for metadata management and may be applied to any data processing system using data entities and data entity instances to manage data irrespective of whether the managed data is metadata or any other type of data.

Regardless of the type of data managed by a data processing system using data entities instances thereof, the above example makes clear that in many practical applications a data processing system may be expected manage millions or billions of data entity instances. Accordingly, the inventors have designed and developed the entity API to provide efficient access to the data entity instances managed by the data processing system so that preferably access to data entity instances is provided rapidly without delay while minimizing the computational burden on the data processing system.

To this end, a beneficial feature of the entity API is that input (e.g., a declarative statements, for example, a declarative query) provided to the entity API is processed in two separate stages—one for identifying data entities (or instances thereof) of interest and another for accessing attribute values of the identified data entities. These stages are sometimes referred to herein as the "identification" and "enrichment" stages. For example, a declarative statement for retrieving information about data entity instances, which may be referred to as a "declarative query," may include two portions—an identification portion (e.g., identification portion 404 of declarative query 402 in FIG. 4A) for identifying data entity instances of interest (e.g., all instances of data entity "BizTerm" in the example of FIG. 4A) and an enrichment portion (e.g., enrichment portion 406 of declarative query 402 in the example FIG. 4A) for indicating attributes whose values are to be retrieved for the identified data entity instances (e.g., the attributes "Name" and "Description" in the example of FIG. 4A). In turn, during the first stage of processing the declarative query, its identification portion is processed to generate one or more executable (e.g., SQL) queries that, when executed against the data store(s) in the data processing system that store data entity instances, return information (e.g., unique identifiers) identifying the data entity instances of interest. At the same time or subsequently to the first stage, during the second stage of processing the declarative query, its enrichment portion is processed to generate one or more other executable (e.g., SQL) queries for obtaining values of attributes indicated as being of interest in the enrichment portion. In this stage, separate executable queries may be generated for different attributes or groups thereof. Subsequently, the results of all the executable queries are combined and output (e.g., to the user or computer program that input the declarative query).

It should be appreciated that, in some embodiments, input to the entity API may be a declarative statement, which may be termed a "declarative query" when the statement is for retrieving information from the entity API. However, the entity API is not limited to receiving only declarative queries as input and may be configured to receive, as input, any suitable type of query (whether or not declarative in the sense described herein) or statement (whether or not declarative in the sense described herein).

There are numerous technical advantages provided by the above-described staged architecture for specifying and executing input queries (e.g., declarative queries) and/or statements (e.g., declarative statements). First, separating "identification" from "enrichment" allows for processing to be performed using a "streaming" architecture, whereby only some of the data entity instances identified during the "identification" stage are enriched with their attribute values and additional data entity instances are enriched only after they are requested. This is described in greater detail below in the section called "Batch and Streaming Query Execution, Limiting Extent of Results Returned". This streaming architecture provides rapid access to data entity instances without the delay of waiting for all data entity instances to be enriched, and reduces the computational burden on the data processing system since not all data entity instance need be enriched, in some cases.

Second, it should be appreciated that attribute values of a single data entity instance are not necessarily stored in a single row of one table and instead may be stored across multiple different tables in the data processing system. For example, as described herein, a data entity may have static and dynamic attributes, and the dynamic attributes may be stored using name-value pairs in different tables. Generating multiple executable queries, as made possible by the staged architecture, allows for more efficient access of these attribute values. For example, as described in greater detail below in the section called "Accessing Attribute Values for Groups of Attributes", an enrichment portion of a declarative query may be processed by first grouping attributes that have the same type and/or are stored in the same table and generating a single executable query for each group of attributes, which substantially reduces the amount of computation to be performed when retrieving the attribute values because: (1) each table would be queried once, rather than multiple times; and (2) unlike conventional SQL queries that would join all the tables storing attribute values in the underlying database (which in practical applications would require dozens of tables being joined in the underlying database), attribute values may be retrieved using separate executable queries and joined outside of the underlying database (e.g., through pivoting as described in greater detail below in the section called "Pivoting"). The staged architecture provides many other efficiencies and benefits described herein including below in the section called "Optimizing Execution of Enrichment Queries."

Another beneficial feature of the entity API is that it allows a user or computer program to access (e.g., query, create, update, delete) data entity instances in a manner that is agnostic to how the data entity instances are stored by the data processing system. Conventional data processing systems require a user querying the system to know how the data being queried is stored. For example, in order to write a query, a user querying a conventional data processing system needs to know the type of database system used by the data processing system to store data (e.g., a relational database, an object oriented database, a NoSQL database and, the manufacturer or vendor of the database system) and how that database system stores the data being queried (e.g., the name of the table or tables storing the values of interest).

Without this information, the user would not be able to write a query at all. Additionally, the user may wish to know the exact version and vendor of the database system to be able to optimize access to the data of interest.

By contrast, the queries enabled by the entity API may be specified in a manner agnostic to how the data entity instances being queried are stored by the data processing system. In this way, the same exact query may be used to query data entity instances regardless of whether they are stored, within the data processing system, using a relational database, an object oriented database, a NoSQL database, using caching, using a search index (e.g., as discussed in greater detail below in the section called "Retrieving Data Using Search Index or Indices") or in any other way.

Figure 2B:
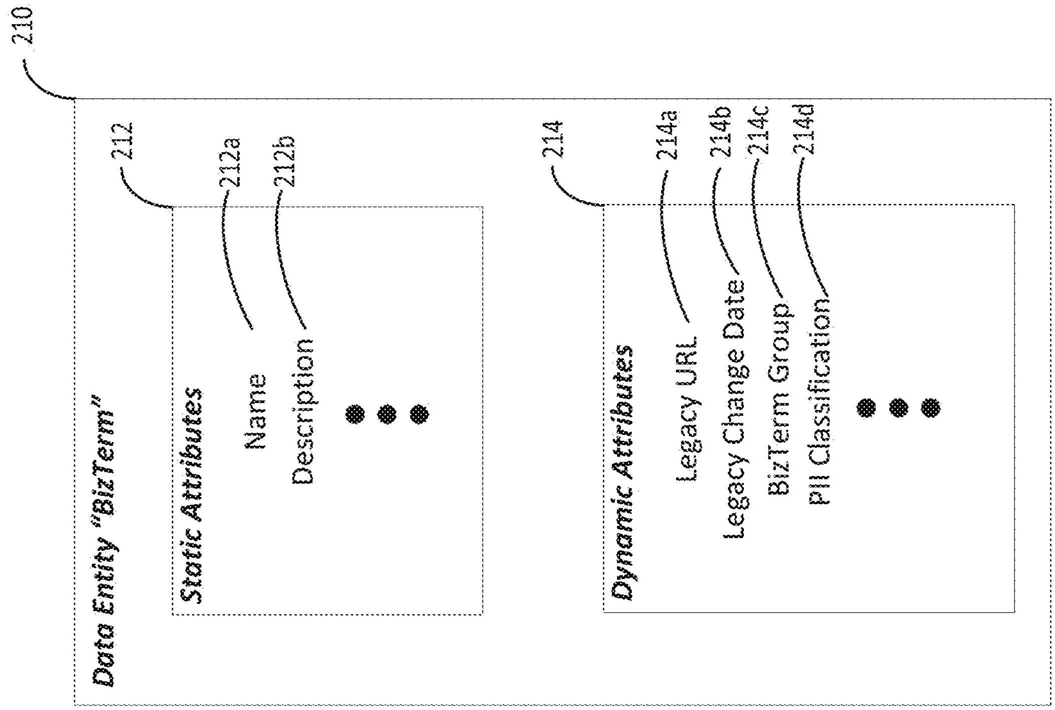
FIGS. 2B and 2C show illustrative diagrams of the "BizTerm" data entity, in accordance with some embodiments of the technology described herein.
Figure 2A:
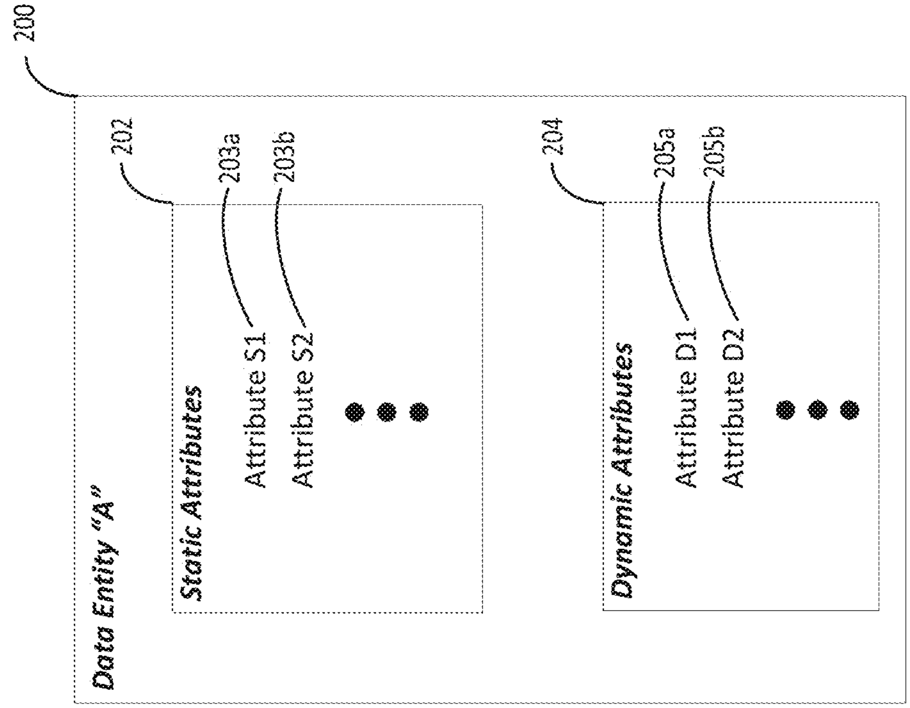
FIG. 2A shows an illustrative diagram of a data entity having one or more static attributes and/or one or more dynamic attributes, in accordance with some embodiments of the technology described herein.
Figures 2C, 2D:
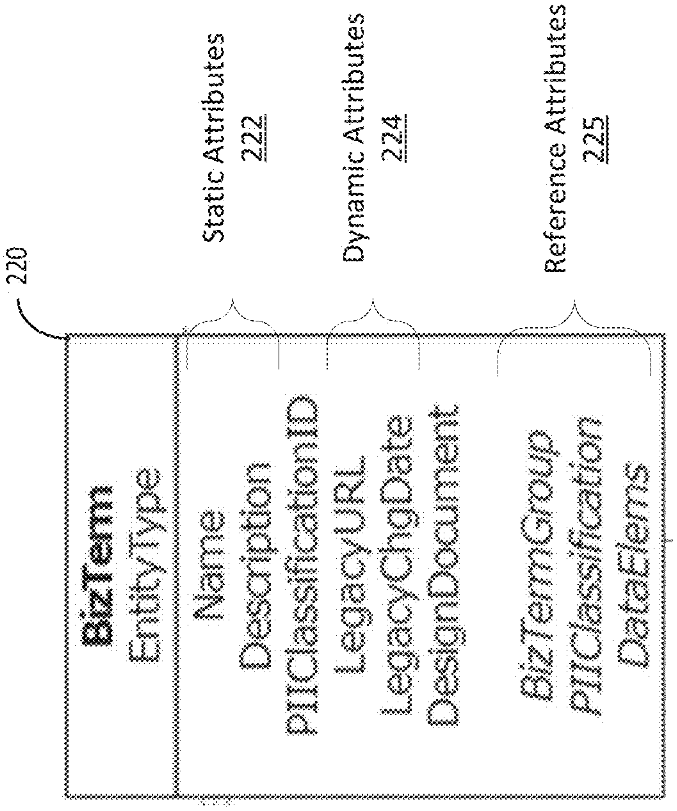
FIG. 2D is a table illustrating properties of attributes of at least some of the attributes of the data entity shown in FIG. 2C, including whether its attributes are static or dynamic, in accordance with some embodiments of the technology described herein.
Figure 2E:
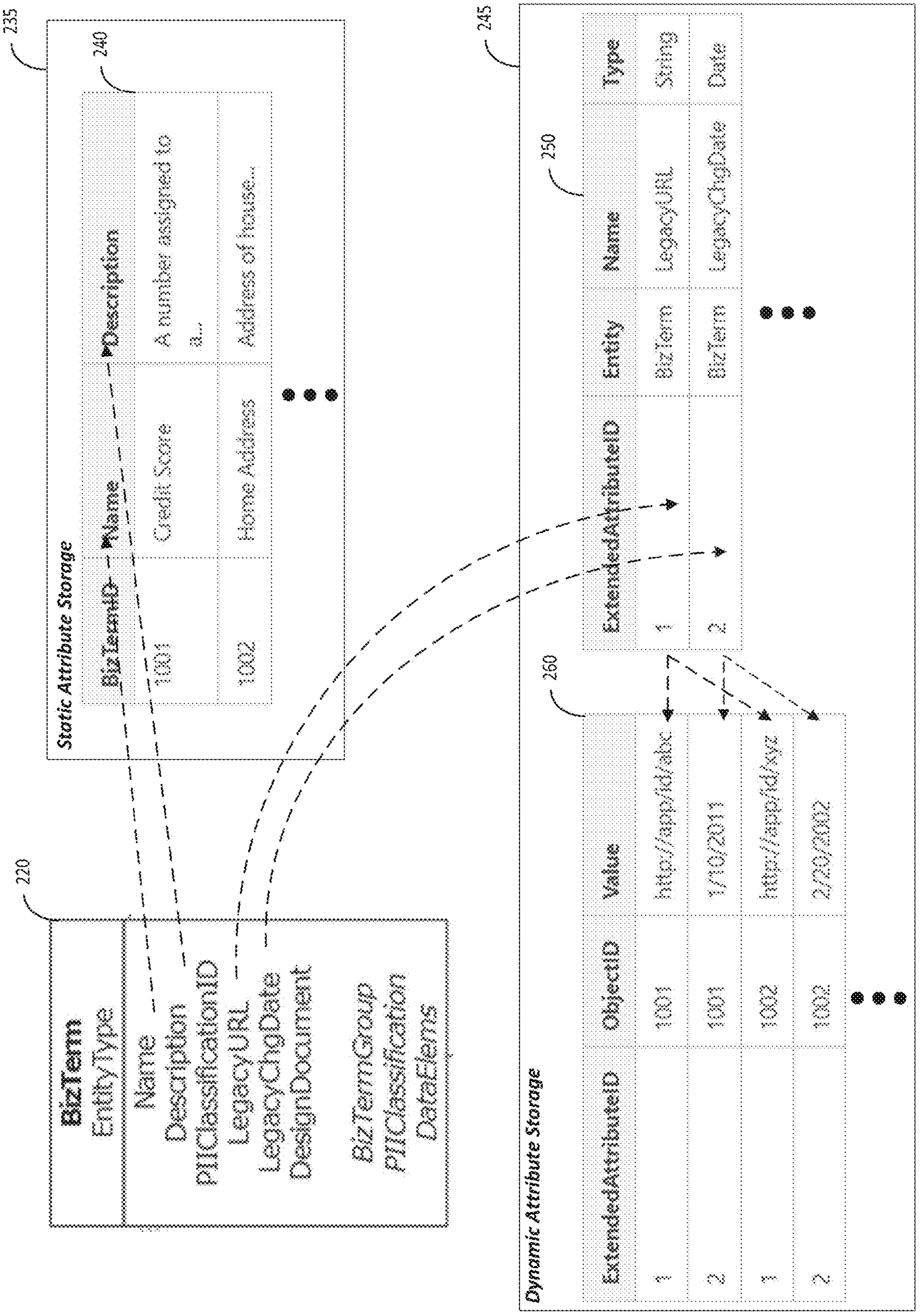
FIG. 2E is a diagram illustrating aspects of how static attribute values and dynamic attribute are stored by a data processing system, in accordance with some embodiments of the technology described herein.

As described herein, in some embodiments, data entity attributes may be static or dynamic, which means that their values are stored using different mechanisms (e.g., as described herein including with reference to FIG. 2E). However, queries (e.g., declarative queries) enabled by the entity API (and in particular the enrichment portions of the queries which may identify the attributes whose values are to be returned) may be specified in a manner agnostic to whether the attributes of interest are implemented as static or dynamic variables.

In some embodiments, in order to process statements (e.g., queries, such as declarative queries, for example) that do not include information about how the underlying data entity instances are stored in the data processing system, the entity API is configured to transform the input statements through a series of transformations to arrive at executable statements (e.g., executable SQL queries) that may be executed against the database system(s) storing the data entity instances and values of their attributes. When the statements provided as input to the entity API cannot are declarative statements, they cannot be executed against the database system(s) storing the data entity instances; they are "declarative" in the sense that they "declare" the desired action to be performed (e.g., by "declaring" which data entity instances and which of their attributes are to be returned, updated, created, etc.), but are not "executable" in and of themselves precisely because they are agnostic to how the data entity instances are stored. Thus, in some embodiments, a declarative statement (e.g., a declarative query) may not identify the table(s) in which the desired data entity instances and attribute values are stored and may not include any low-level optimizations that could be applied when executing the statement against the database system(s) storing the data entity instances.

In this sense, unlike a SQL statement, a declarative statement (e.g., a declarative query) of the entity API is not directly executable by an RDBMS (e.g., ORACLE, DB2, POSTGRES, SQL SERVER, etc.) or other data storage system; rather, it is transformed into one or multiple executable statements which are then executed by the RDBMS or other storage system. Although a part of an entity API declarative statement may be specified using SQL, as described herein, there are other portions of an entity API declarative statement that are not specified using SQL and that are first processed, as part of the overall declarative statement, by the entity API in order to transform an entity API declarative statement into one or more executable (e.g., SQL or other types of) statements (e.g., an executable SQL query or other type of executable query). Moreover, unlike SQL, entity API declarative statements are for specifying actions to be performed with respect to data entity instances—it is a higher level language whose statements can be translated into executable SQL (or other types of queries), but whose statements are not SQL queries in and of themselves.

Accordingly, in some embodiments, a declarative statement may be transformed through a series of transformations that augments the information in the declarative statement with information managed internally by the data processing system and the entity API to generate multiple executable statements (e.g., multiple executable SQL statements, for example, SQL queries) that can be executed against the database(s) or other systems used by the data processing system to store data entity instances and values of their attributes. Aspects of these transformations are described herein including below in the section called "Generating Executable Queries" and with reference to FIGS. 7A-7F.

As described above, some data entity attributes may reference other data entities and, as a result, data entity instances may be related to each other. Another beneficial feature of the entity API is that a single declarative query may be used to retrieve information about multiple related data entities. In some embodiments, the declarative query may expressly specify a hierarchy of related attributes whose values are to be retrieved (which may be referred to herein as "nesting") or do so using recursion.

Accordingly, in some embodiments, a single declarative query may specify a hierarchy of attributes (some of the attributes being attributes of different related data entities) and the values of attributes in the hierarchy may be retrieved by processing the single declarative query. In some embodiments, the retrieved attribute values may be output in a hierarchical format that corresponds to the hierarchical structure of the hierarchy of attributes specified in the declarative query. For example, the hierarchical format may have a nesting structure that is the same as the nesting structure of the attributes in the hierarchy of attributes specified in the declarative query. Aspects of hierarchical querying and hierarchical output of results are described herein including below in the section called "Retrieving Hierarchical Data". As described herein, the hierarchical queries enabled by the entity API allow for using a single declarative query to obtain results for multiple different data entity hierarchies and to perform aggregation operations thereon.

Accordingly, some embodiments provide for a method of using declarative queries to obtain information about data entity instances managed by a data processing system using at least one data store, the method comprising using at least one computer hardware processor to: obtain a query (e.g., a declarative query) comprising: a first portion (sometimes termed an "identification portion" herein) comprising information for identifying instances of at least one data entity stored in at least one data store; and a second portion (sometimes termed an "enrichment portion" herein) indicating at least one attribute of the at least one data entity; generating, from the query, a plurality of executable queries (e.g., executable SQL queries) including a first set of one or more executable queries and a second set of one or more executable queries, the generating comprising: (1) generating, using the first portion of the query, the first set of one or more executable queries for identifying instances of the at least one data entity stored in the at least one data store; (2) generating, using the second portion of the query, the second set of one or more executable queries for obtaining attribute values for instances of the at least one data entity identified using the first set of executable queries; executing the plurality of executable queries to obtain results for the query; and outputting at least some (e.g., all) of the results.

In some embodiments, the at least one data entity comprises a plurality of data entities, and generating the first set of executable queries comprises generating, for each data entity of the plurality of data entities, a respective executable (e.g., SQL) query for identifying instances of the data entity stored in the at least one data store.

In some embodiments, the at least one data entity comprises a first data entity, the at least one attribute comprises a first plurality of attributes of the first data entity, and generating the second set of executable queries comprises generating, for each attribute of at least some of the first plurality of attributes, a respective executable (e.g., SQL) query to obtain values of the attribute for the instances of the at least one data entity identified using the first set of executable queries.

As described herein, in some embodiments a data entity may have multiple attributes which may be grouped and a single respective executable query may be generated for each group of attributes, which significantly improves overall performance. Thus, in some embodiments, the first plurality of attributes includes multiple dynamic attributes, and generating the second set of executable queries comprises: (1) grouping the multiple dynamic attributes into groups of dynamic attributes, each of the groups having at least one of the multiple dynamic attributes; and (2) generating a respective executable query for each of the multiple groups of dynamic attributes to obtain values of attributes in the group for the instances of the first data entity.

In some embodiments, grouping the multiple dynamic attributes is performed based on type of the dynamic attributes, based on whether dynamic attributes are stored in a same table in the at least one data store, and/or based on whether dynamic attributes inherit their values along a common inheritance path.

In some embodiments, executing the plurality of executable queries comprises: (1) executing the first set of executable queries to obtain data entity instance results (e.g., identifiers of data entity instances satisfying the criteria specified in an identification portion of an input query); and (2) after executing the first set of executable queries, executing the second set of executable queries to obtain attribute value results for the data entity instances identified by executing the first set of executable queries. In some embodiments, the second set of executable queries is generated before the first set of executable queries is executed. In some embodiments, the second set of executable queries is generated after the first set of executable queries is executed.

In some embodiments, the at least one attribute includes multiple groups of dynamic attributes of a first data entity of the at least one data entity, the second set of executable queries includes multiple executable queries respectively corresponding to the multiple groups of dynamic attributes, and executing the second set of executable queries comprises executing each of the multiple executable queries to obtain respective multiple dynamic attribute value results. In some embodiments, after executing the second set of executable queries, the multiple dynamic value attribute results are combined to obtain the attribute value results.

The entity API supports inline views, as described herein including below in the section called “inline views”. In some embodiments, the second portion of the query comprises an inline view, and generating the second set of one or more executable queries comprises generating an executable query using information specified in the inline view. In some embodiments, the inline view may include a tabular query (e.g., a declarative tabular query). The tabular query may be for performing an aggregate function. In some embodiments, the inline view may specify inner and outer join keys.

In some embodiments, the at least one attribute of the first data entity comprises a first plurality of attributes of the first data entity, wherein the first plurality of attributes comprises at least one static attribute and at least one dynamic attribute. In some embodiments, the at least one attribute of the first data entity comprises a first dynamic attribute configured to inherit its value from an attribute of a second data entity.

In some embodiments, the second portion of the query may indicate a hierarchy of attributes including the at least one attribute. This indication may be made using nesting or recursion or both. In some embodiments, outputting the results comprises: formatting the results in a hierarchical format corresponding to the hierarchy of attributes; and outputting the results in the hierarchical format. Such a format may be non-tabular.

In some embodiments, generating the first set of executable queries (e.g., to identify data entity instances of interest) comprises generating a first executable query at least in part by: (1) generating an intermediate query representation (e.g., an abstract syntax tree) using the first portion of the query; (2) augmenting the intermediate query representation using unique identifier information, dynamic attribute reference information, view type information, and/or permissions information to obtain an augmented intermediate query representation; and (3) generating the first executable query using the augmented intermediate query representation.

In some embodiments, generating the second set of executable queries (e.g., to access values of data entity instances identified using the first set of executable queries) comprises generating a second executable query at least in part by: (1) generating an intermediate query representation using the second portion of the query; (2) augmenting the intermediate query representation using unique identifier information, dynamic attribute reference information, view type information, and/or permissions information to obtain an augmented intermediate query representation; and (3) generating the second executable query using the augmented intermediate query representation.

Some embodiments provide for a method comprising using at least one computer hardware processor to perform: obtaining a query (e.g., a declarative query), the query comprising: a first portion comprising information for identifying instances of at least one data entity stored in at least one data store; and a second portion indicating a hierarchy of attributes including at least one attribute of the at least one data entity; generating, from the query, a plurality of executable queries for obtaining, from at least one data store, instances of the at least one data entity and attribute values for the instances of the at least one data entity; executing the plurality of executable queries to obtain results for the query; and outputting at least some (e.g., all) of the results in a hierarchical format corresponding to the hierarchy of attributes.

Some embodiments provide for a method, comprising using at least one computer hardware processor to perform: obtaining a query (e.g., a declarative query), the query comprising: a first portion comprising information for identifying instances of at least one data entity stored in at least one data store; and a second portion indicating at least one attribute of the at least one data entity; generating, from the query, a plurality of executable queries for obtaining, from at least one data store, instances of the at least one data entity and attribute values for the instances of the at least one data entity; executing the plurality of executable queries to obtain results for the query; and outputting at least some (e.g., all) of the results.

It should be appreciated that the techniques described herein may be implemented in any of numerous ways, as the techniques are not limited to any particular manner of implementation. Examples of details of implementation are provided herein solely for illustrative purposes. Furthermore, the techniques disclosed herein may be used individually or in any suitable combination, as aspects of the technology described herein are not limited to the use of any particular technique or combination of techniques.

Illustrative Data Processing Systems and Applications

As described above, the inventors have recognized that a data processing system may be configured to manage millions or billions of data entity instances. For example, the techniques described herein may be used, in some embodiments, for metadata management in an enterprise setting, whereby data entity instances store information about individual data sets (e.g., tables, transactions, documents, data records, etc.) stored across a globally distributed information technology (IT) infrastructure comprising many databases, data warehouses, data lakes, etc. As described above, in this context, a data entity instance may store information about a corresponding dataset such as, for example, when the dataset was created, where it is stored, its size, the identity of the user(s) that are allowed to edit the dataset, information identifying which application programs use the dataset, information identifying the sensitivity level of the data, etc. Since a large organization (e.g., a financial institution such as a bank or credit card company, a utility such as a phone or electric company, etc.) will typically manage millions or billions of such datasets, there may be millions or billions of data entity instances storing information about such datasets that would be managed by the data processing system.

FIG. 1A shows an example environment in which a data processing system may be used for metadata management, in accordance with some embodiments of the technology described herein. It should be appreciated that the techniques described herein are not limited to data processing systems being used for metadata management and may be applied to any data processing system using data entities and data entity instances to manage data irrespective of whether the managed data is metadata or any other type of data.

FIG. 1A illustrates an enterprise system comprising systems 140, 142, 144, distributed across multiple different geographic locations (e.g., different cities, countries, continents, etc.) each storing vast amounts of data (e.g., in one or more database systems, data warehouses, data lakes, etc.). For example, the systems 140, 142, 144 may be components of an enterprise system of a global bank, with the system 140 being located in the United States, system 142 being located in Brazil, and the system 144 being located in Europe.

As shown in the example embodiment of FIG. 1A, each of the systems 140, 142, 144 includes a respective set of computing devices. System 140 includes servers 140A and database systems 140B. System 142 includes servers 142A and database systems 142B. System 144 includes servers 144A and database systems 144B. During operation of the enterprise system, each of the systems 140, 142, 144 may generate and/or store large amounts of data (e.g., terabytes of data). For example, the enterprise system may be for a credit card company, where each of the systems 140, 142, 144 generates and/or stores transaction data, credit scores, and/or any other suitable data. In another example, the enterprise system may be for a bank, where each of the systems 140, 142, 144 generates and/or stores data about bank records, loans, account holders, and/or any other suitable data. In another example, the enterprise system may be for a phone company, where each of the systems 140, 142, 144 generates and/or stores data about phone calls, text messages, data usage, and/or any other suitable data.

In some embodiments, the database systems 140B, 142B, 144B may be configured to store data (e.g., of an enterprise system). Each of the database systems 140B, 142B, 144B may comprise a database, data warehouse, data lake, and/or any other database system. The database systems 140B, 142B, 144B may be of any suitable type(s), either the same type or different types. For example, each of these systems may include one or more relational database systems (e.g., ORACLE, SQL SERVER, etc.) As another example, in some embodiments, each of these systems may include one or more other types of database systems (e.g., non-relational (e.g., NoSQL) database system, a multi-file system, or any other suitable type of database system).

In the example embodiment of FIG. 1A, the data processing system 105 may be configured to store information 107 describing data stored in the enterprise systems 140, 142, 144. In this sense, the information 107 may be considered to be metadata. The metadata may include any of numerous types of information about the data stored in the enterprise systems 140, 142, 144. For example, the metadata may include information about systems that process data (e.g., servers 140A, 142A, 144A), software applications executing on the enterprise system that are used to process data, and/or rules for the applications in storing the data. In another example, the metadata may include information about data throughout the enterprise software system such as how the data were generated, the size of data, description of the data, which user(s) are permitted to read, update, create, delete, or perform any other action with respect to the data, and/or any other suitable information about the data.

In some embodiments, the data processing system may manage the metadata using data entity instances and data entity definitions. For example, the data processing system 105 may store a data entity instance for each of multiple datasets (e.g., tables) stored by the enterprise system. Each such data entity instance may store information about the dataset (e.g., when the dataset was created or updated, where the dataset is stored, size of the dataset, the identity of the user(s) that are allowed to read, edit, delete, or perform any other suitable action with respect to the dataset, information identifying which software applications use the dataset, information identifying the sensitivity level of the data in the dataset, and/or any other suitable metadata). As another example, the data processing system 105 may store data entity instances for respective columns of tables in the enterprise system. Each such a data entity instance may store information about the column (e.g., the meaning of the values in the column, who is authorized to read, write, update, and/or delete values in the column, the range of permitted values of entries in the column, and/or any other suitable metadata). As yet another example, the data processing system 105 may store a data entity instance for each of multiple software applications configured to be executed by some system or device part of the enterprise system. Such a data entity instance may store information about the software application (e.g., which datasets the software application processes, where the application puts its output, a description of the application's functionality, the application's version, the application's dependency on data and/or other applications, where the executables of the application may be found, and/or any other suitable metadata). As yet another example, the data processing system 105 may store a data entity instance for each of multiple systems part of the enterprise system.

As can be readily appreciated from the foregoing, in such a metadata management scenario, the data processing system 105 may manage millions or billions of such data entity instances, which is why it is important that querying, creating, updating, deleting, or performing any other suitable actions with respect to the data entity instances be performed efficiently as possible.

Figure 1B:
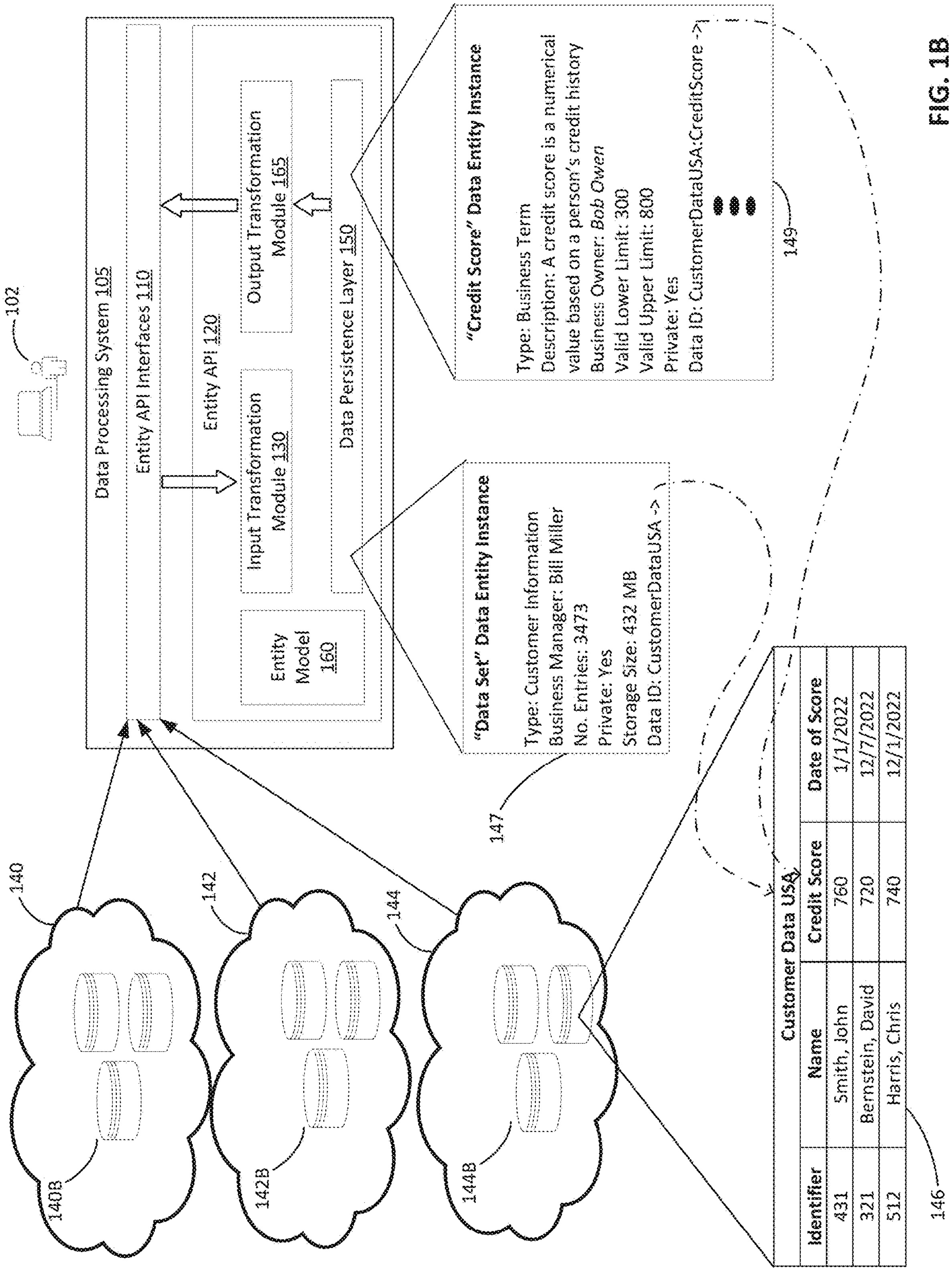
FIG. 1B is a diagram further illustrating the example environment of FIG. 1A in which a data processing system may operate, in accordance with some embodiments of the technology described herein.

FIG. 1B is a diagram further illustrating the example environment of FIG. 1A in which a data processing system may operate, in accordance with some embodiments of the technology described herein.

As shown in FIG. 1B, the data processing system 105 may be configured to manage data using data entities at least in part by using entity model 160, which includes data entity definitions and data entity relationships. In some embodiments, the instances of the data entities defined by entity model 160 may be stored in data persistence layer 150. Accordingly, at least some or all of the data associated with a data entity instance may be stored in data persistence layer 150. Aspects of entity model 160 and persistence layer 150 are described in more detail herein including with reference to FIG. 1D.

Also, as shown in FIG. 1B, in some embodiments, the entity API 120 provides access to the data entity instances managed by the data processing system 105 and persisted in the data persistence layer 150. For example, the entity API 120 exposes functionality through which data entity instances may be created, updated, deleted, and queried. In some embodiments, the data processing system may be configured such that data entity instances managed by the data processing system 105 may be accessed (e.g., created, updated, deleted, and/or queried) only through the entity API 120, as is shown by the border defining entity API 120 also encapsulating the data persistence layer 150 in FIG. 1B. The functionality exposed by the entity API may be accessed through any of numerous types of entity API interfaces 110.

In some embodiments, a declarative statement (e.g., a declarative query) or may be provided as input to the entity API 120 to perform an action with respect to one or more data entity instances managed by the data persistence layer 150. The declarative statement many be transformed into one or multiple executable queries using input transformation module 130. The queries are then executed and the results are provided to output transformation module 165 which may further process (e.g., combine, format, organize, etc.) the results prior to providing them back to the user or computer program that provided the declarative statement. Aspects of the entity API interfaces 110, entity API 120, input transformation module 130, and output transformation module 164 are described in more detail herein including with reference to FIG. 1D.

In the context of metadata management, in some embodiments, the interfaces 110 may be configured to generate graphical user interfaces (GUIs) through which users may access data from the information 107 about data stored in systems 140, 142, 144. The GUIs may allow the users to: (1) request information about data entity instances stored by the data processing system; and (2) view information about data entity instances stored by the data processing system. In some embodiments, the GUIs may allow users to access information 107 (e.g., metadata) stored about data stored by systems 140, 142, 144. For example, the GUIs may allow a user 102 to track data being generated in an enterprise software system (e.g., quality metrics, and other characteristics of the data). In another example, the GUIs may allow a user 102 to visualize lineage information. Lineage information may include information about relationships between different data entity instances. Aspects of lineage information are described in U.S. Pat. No. 10,489,384, entitled "SYSTEMS AND METHODS FOR DETERMINING RELATIONSHIPS AMONG DATA ELEMENTS", which is hereby incorporated by reference herein in its entirety.

To further illustrate the concept of metadata management in the context of data processing system, FIG. 1B illustrates two example data entity instances storing information about respective data in the database system 144B. The database system 144B stores a table 146 that includes information about customers (e.g., of a bank). The columns of the table 146 include "Identifier", "Name", "Credit Score", and "Date of Score". The data processing system 105 stores metadata about the table 146 and, in this example, achieves this by storing, the data persistence layer 150, an instance 147 of the "Data Set" data entity which stores information about the table 146.

In this example, the data entity instance 147 stores values of attributes including the attributes "Type" (indicating the type of information in the table), "Business Manager" (indicating the person responsible for the data in the table), "No. Entries" (indicating the number of entries in the table), "Private" (indicating a privacy setting), "Storage Size" (indicating the amount of memory taken by the table), and "Data ID". In some embodiments, the "Data Set" data entity instance 147 may store values of other attributes in addition to or instead of those shown in FIG. 1B.

In applications where a data entity instance contains metadata about data (e.g., information about a table), in some embodiments, the data entity instance may include information that can be used to identify and/or access the data. As shown in the example of FIG. 1B, the "Data ID" attribute identifies data (e.g., a table) that the information in the "Data Set" data entity instance 147 describes. For example, the value of "Data ID" may be an identifier of the table 146. In some embodiments, the value of "Data ID" may allow a user to navigate to the table 146. For example, the value of "Data ID" may be a hyperlink that navigates to the table 146 in database 144B. In some embodiments, the data entity instance may not itself store information for how to access the table, though the data processing system may store information associating a data entity instance with information that can be used to identify and/or access the data itself. For example, the data processing system may store such information in one or more tables (e.g., within data persistence layer 150) or in any other suitable way.

As shown in the example of FIG. 1B, the data persistence layer 150 further stores a "Credit Score" data entity instance 149. The "Credit Score" data entity instance 149 may be an instance of "BizTerm" data entity 220 shown in FIGS. 2C and 2E. The "Credit Score" data entity instance 149 includes values for the attributes "Type", "Description", "Business Owner", "Valid Lower Limit", "Valid Upper Limit", "Private", and "Data ID". As indicated by the arrow between the "Data ID" attribute and the "Credit Score" column of table 146, the "Credit Score" data entity instance 158 describes data in the "Credit Score" column of table 146. As shown in the example of FIG. 1B, the "Data ID" attribute indicates data that the information in the "Data Set" data entity instance 149 describes. For example, the value of "Data ID" may be an identifier of the "Credit Score" column in table 146. In some embodiments, the value of "Data ID" may allow a user to access the data stored in the "Credit Score"

column of table 146. For example, the value of "Data ID" may be a hyperlink that may be used to access data in "Credit Score" column to a user.

Figure 1C:
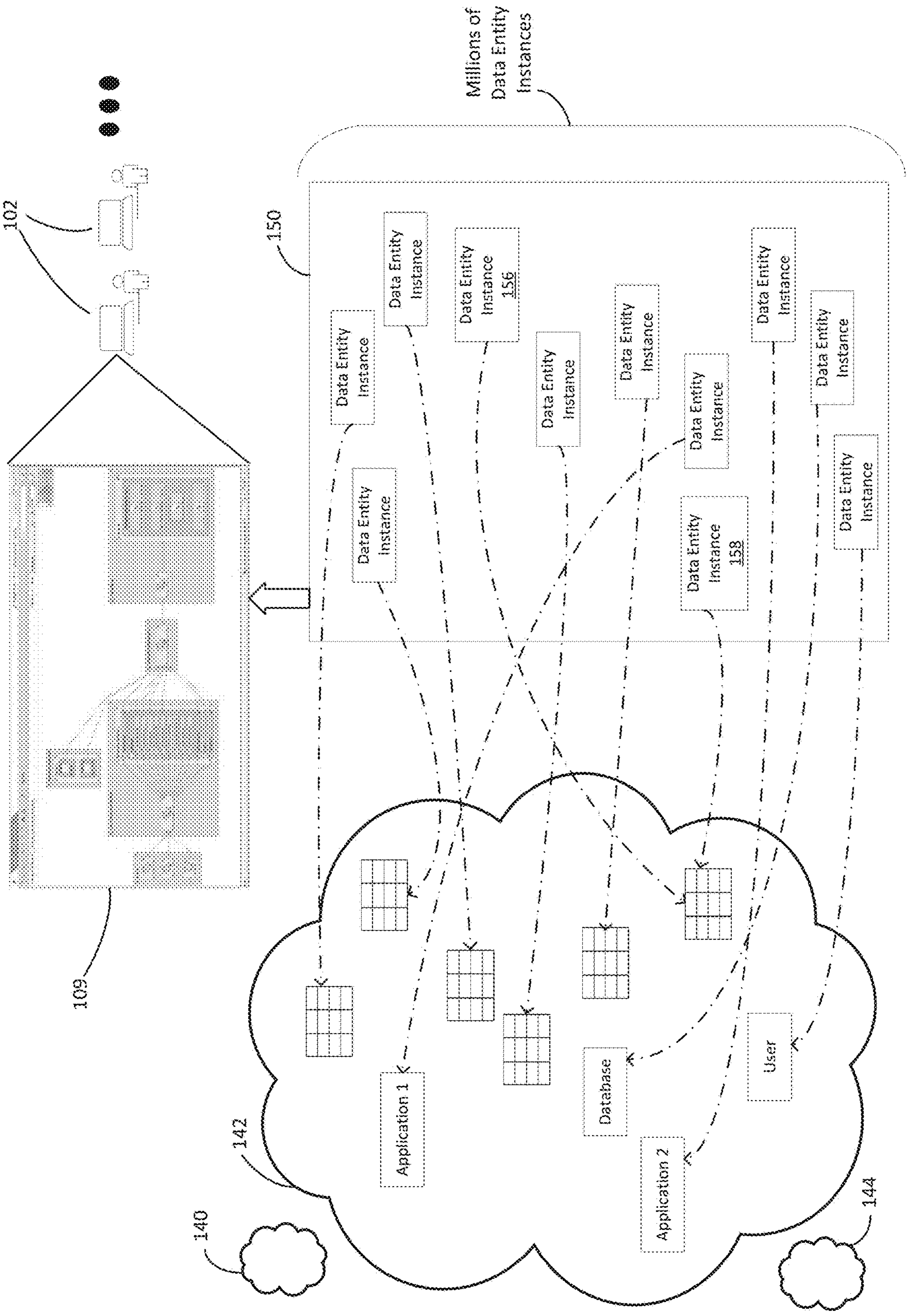
FIG. 1C is a diagram illustrating that a data processing system may, in some applications, be configured to manage millions or billions of data entity instances, in accordance with some embodiments of the technology described herein.

FIG. 1C is a diagram illustrating that a data processing system may, in some applications, be configured to manage millions or billions of data entity instances, in accordance with some embodiments of the technology described herein. As shown in the example embodiment of FIG. 1C, in some embodiments, the data persistence layer 150 stores large numbers (e.g., thousands, millions, billions) of data entity instances storing information about respective components of the enterprise system of FIG. 1A (e.g., datasets, software application, systems or any other component of the enterprise system). The arrow from each data entity instance of FIG. 1C indicates a component that the information in the data entity instance describes. A component may be a dataset, an application (e.g., one or more computer programs), a system (e.g., a database system), and/or other component of the enterprise system. For example, a data entity instance may store information about data (e.g., a table) in the enterprise system. In another example, a data entity instance may store information about an application of the enterprise system. In yet another example, a data entity instance may store information about users of the enterprise system.

As shown in the example embodiment of FIG. 1C, the metadata stored in data entity instance of the data persistence layer 150 may be used to provide a visualization 109 to a user 102. The visualization 109 may include a visualization of lineage information associated with the data entity instance. Lineage information may include information about relationships between different data entity instances. Aspects of lineage information are described in U.S. Pat. No. 10,489,384, entitled "SYSTEMS AND METHODS FOR DETERMINING RELATIONSHIPS AMONG DATA ELEMENTS", which is hereby incorporated by reference herein in its entirety.

Figure 1D:
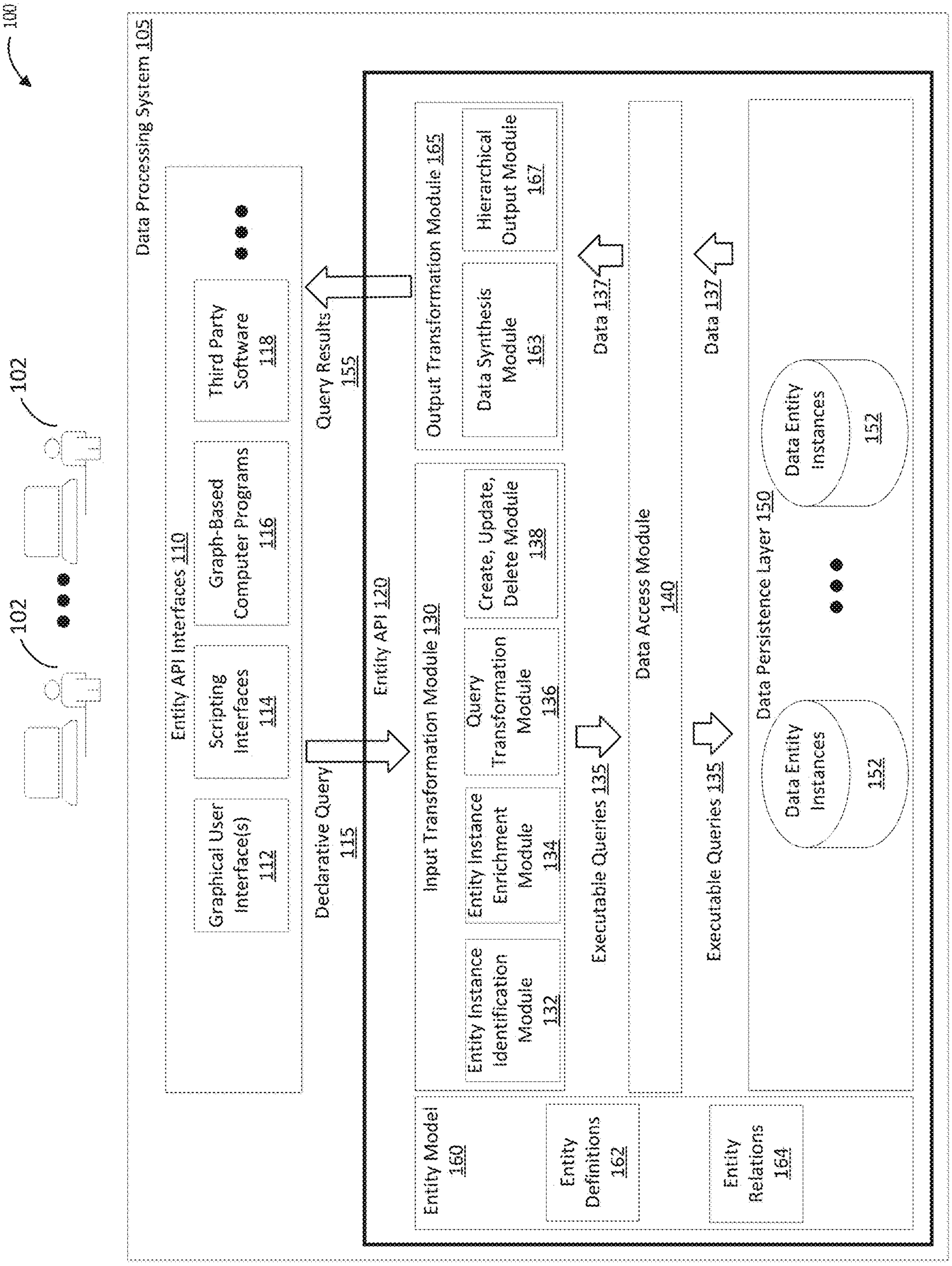
FIG. 1D is a block diagram illustrating aspects of an example data processing system 105 and an entity application programming interface (API) 120 integrated with the data processing system 105, in accordance with some embodiments of the technology described herein.

FIG. 1D is a block diagram 100 illustrating aspects of an example data processing system 105 and an entity application programming interface (API) 120 integrated with the data processing system 105, in accordance with some embodiments of the technology described herein.

In some embodiments, data processing system 105 may be configured to manage data using data entities and instances thereof. The data processing system 105 may be configured to manage data using data entities at least in part by using entity model 160, which includes data entity definitions 162 and data entity relationships 164.

The data processing system may be configured to manage data using any suitable number of data entities. For example, the entity model 160 may define tens, hundreds, thousands, or tens of thousands of data entities, as the case may be in enterprise computing environments.

In some embodiments, the data entity definitions 162 include a definition or specification for each data entity supported by the data processing system. A data entity definition may define the structure of the data entity. To this end, the data entity definition may define attributes of the data entity. An entity attribute may be scalar valued and may take on values such as strings and numbers. Alternatively, an entity attributes may refer to another data entity or entities. A data entity definition may sometimes be termed a "data entity class" or a "data entity specification," and may herein be referred to simply as a "data entity". Data entity definitions are described in more detail herein including below with reference to FIGS. 2A-20.

In some embodiments, the data entity relationships 164 define relationships among data entities. For example, data entity relationships 164 may define whether a particular data entity may have an attribute referring to another data entity (such an attribute may be referred to as a "reference" attribute herein in that its value refers to another data entity instance).

In some embodiments, an attribute of one data entity may be configured to inherit or take on its value from an attribute of another data entity. Different attributes of the same data entity may be configured to inherit their values from different data entities. In some embodiments, the inheritance configuration may be achieved using reference attributes. For example, one attribute (a reference attribute) may indicate a data entity instance from which a second attribute is to inherit its value. For example, a data entity "D1" may have two attributes "A1" and "A2" with A2 being a reference attribute, and the value of attribute "A2" may identify another data entity "D2" from which the value of attribute "A1" is to be inherited. Changing the value of attribute "A2" to a different data entity "D3" would change the data entity from which the attribute "A1" inherits its value.

As such, the concept of attribute inheritance as described herein is different from "inheritance" as that term is used in the context of object-oriented programming. In object-oriented programming, inheritance refers to a child class inheriting properties (e.g., variables, definitions of functions, implementations of functions) from a base class. This allows for code reuse and extension of software via public classes and interfaces. By contrast, "inheritance" as described herein refers to the situation where an attribute of a data entity can be configured to take on or "inherit" its value from an attribute of another data entity. The configuration would indicate the data entity from which the attribute would inherit the data—it would not be fixed like a base class in an object-oriented setting. Since the configuration of inheritance is at the level of attributes, different attributes of the same underlying data entity can be configured to take on or "inherit" their values from different attributes of multiple other data entities. This provides great flexibility for how attribute values can be set, and provides a level of indirection not available in object oriented programming. Indeed, a single data entity may be configured to not only inherit attribute values from multiple other data entities, but that configuration can be changed at the level of instances of the single data entity, as described above.

As can be appreciated from the foregoing, inheritance for data entities can be configured at an attribute level. To this end, in some embodiments, a data processing system may store an "inheritance configuration" for each of at least some (e.g., all) attributes of a data entity. The "inheritance configuration" may indicate whether the attribute inherits its value from another data entity attribute and, if so, which one.

In contrast, conventional object oriented systems do not have attribute-level inheritance configuration described herein. As described above, conventional object oriented systems do not support inheritance of values at the attribute level of a data entity instance. Rather, object-oriented inheritance is at the class level such that the data entity instance attributes inherit all values from a single parent data entity. Further, aspects of inheritance are described herein including with reference to FIGS. 6E and 6F.

In some embodiments, the entity model 160 (e.g., data entity definitions 162 and data entity relationships 164) may be stored partially or entirely in data persistence layer 150. In other embodiments, the entity model 160 may be stored in any other suitable storage, as aspects of the technology described herein are not limited in this respect.

In some embodiments, the instances of the data entities defined by entity model 160 may be stored in data persistence layer 150. Accordingly, at least some or all of the data associated with a data entity instance may be stored in data persistence layer 150. Non-limiting examples of data associated with a data entity instance include values of any attributes of the data entity instance, identifying information for the data entity instance (e.g., a unique identifier for the data entity instance through which the data processing system 105 may uniquely identify the data entity instance), the definition for the data entity, information indicating one or more other data entities having attributes whose values the data entity instance may be configured to inherit, permissions information indicating the user(s) authorized to create, read, write, and/or update the data entity instance, and/or any other suitable data. Some or all of these types of data may be stored in data persistence layer 150 for each of one or more of the data entity instances. In the illustrative embodiment of FIG. 1D, data persistence layer 150 includes one or more data stores 152 for storing (data associated with) data entity instances. In some embodiments, data store(s) 152 may include a relational database system so that the data associated with data entity instances is stored in tables of the relational database system. For example, data store(s) 152 may include an ORACLE database system, a MICROSOFT SQL SERVER database system, a POSTGRESQL database system, an IBM DB2 database system, and/or any other suitable relational database system, as aspects of the disclosure described herein are not limited in this respect. However, the data store(s) 152 are not limited to including only relational database systems, and may be configured to store data in any suitable way. For example, data store(s) 152 may comprise an object-oriented database, a distributed database, a NoSQL database (e.g., a MONGODB database), one or more text files, or any other suitable database and/or system for managing data. As another example, in some embodiments, data store(s) 152 may include one or more search indices (e.g., for optimizing data retrieval), caches (e.g., for pre-fetching small sets of data being repeatedly accessed such as, for example, reference data used to classify, categorize, or interpret other data) or any suitable combination thereof. Aspects of search indices are described herein including below in the section called "Retrieving Data Using Search Index or Indices."

As described herein, a benefit of the entity API's architecture is that calls to the entity API may be storage agnostic. In this way, a data processing system (e.g., data processing system 105) may be implemented using any suitable storage solution(s) (RDBMS, files, object-oriented databases, search indices, caches, any suitable combination thereof, etc.) and calls to the entity API need not be adapted to the storage solution adopted in a particular deployment or implementation.

More generally, each data store 152 may include one or multiple storage devices storing data in one or more formats of any suitable type. For example, the storage device(s) part of a data store may store data using one or more database tables, spreadsheet files, flat text files, and/or files in any other suitable format (e.g., a native format of a mainframe). The storage device(s) may be of any suitable type and may include one or more servers, one or more database systems, one or more portable storage devices, one or more non-volatile storage devices, one or more volatile storage devices, and/or any other device(s) configured to store data electronically. In embodiments where a data store includes multiple storage devices, the storage devices may be co-located in one physical location (e.g., in one building) or distributed across multiple physical locations (e.g., in multiple buildings, in different cities, states, or countries). The storage devices may be configured to communicate with one another using one or more networks of any suitable type, as aspects of the technology described herein are not limited in this respect.

The data persistence layer 150 may be configured to store any suitable number of data entity instances. As described above, the data processing system may be configured to support tens, hundreds, thousands, or tens of thousands of data entities. And in an enterprise computing environment, the data persistence layer 150 may be configured to store thousands, millions, or billions of data entity instances. For example, the data persistence layer 150 may store at least 10,000 data entity instances, at least 50,000 data entity instances, at least 100,000 data entity instances, at least 500,000 data entity instances, at least 1,000,000 data entity instances, at least 5 million data entity instances, at least ten million data entity instances, at least 50 million data entity instances, at least 100 million data entity instances, at least 500 million data entity instances, at least one billion data entity instances, at least 5 billion data entity instances, between 100,000 and 5 million data entity instances, between 1 and 500 million data, between one million and 5 billion data entity instances, or any other range within these ranges.

In some embodiments, the entity API 120 provides access to the data entity instances managed by the data processing system 105 and persisted in the data persistence layer 150. For example, the entity API 120 exposes functionality through which data entity instances may be created, updated, deleted, and queried. In some embodiments, the data processing system may be configured such that data entity instances managed by the data processing system 105 may be accessed (e.g., created, updated, deleted, and/or queried) only through the entity API 120, as is shown by the thick border defining entity API 120 in FIG. 1D. In such embodiments, the entity API 120 may provide a "fence" around the data entity instances.

The functionality exposed by the entity API may be accessed through any of numerous types of entity API interfaces 110. For example, a query for information associated with data entity instances may be provided (e.g., by one or more users 102) through one or more graphical user interface(s) 112 and the query results may be presented to the user(s) through the graphical user interface(s) 112. As another example, a query for information associated with data entity instances may be provided, programmatically, through a software interface such as through scripting interfaces 114 (e.g., a web-based program written using a scripting language), a graph-based computer program 116, and/or any other third-party software. In addition to retrieving information, any of these types of interfaces may also be used to create or delete data entity instances or otherwise update data entity instances (e.g., by updating a value of an entity instance attribute, changing where an attribute inherits its value, adding a new attribute to a data entity instance, removing an attribute from the data entity instance, etc.). It should be appreciated that the above examples of entity API interfaces are illustrative and that other types of interfaces may be used to gain access to the functionality exposed by the entity API 120.

With respect to graph-based computer programs 116, in some embodiments, a graph-based computer program may be developed as a dataflow graph. A dataflow graph may include components, termed "nodes" or "vertices," representing data processing operations to be performed on input data and links between the components representing flows of data. Techniques for executing computations encoded by dataflow graphs are described in U.S. Pat. No. 5,966,072, titled "Executing Computations Expressed as Graphs," which is incorporated by reference herein in its entirety. An environment for developing computer programs as data flow graphs is described in U.S. Pat. Pub. No. 2007/0011668, titled "Managing Parameters for Graph-Based Applications," which is incorporated by reference herein in its entirety.

In some embodiments, the entity API 120 allows for information about data entity instances to be obtained through the use of declarative queries. A declarative query may specify: (1) data entity instances of interest; and (2) the attributes whose values are to be retrieved for the data entities of interest. A declarative query is not an executable query that may be executed by one or more databases part of the data persistence layer 150. Rather, the entity API 120 may be configured to process the declarative query in order to generate, using the information specified by declarative query, a set of one or more executable queries (which are different from the declarative query) that, when executed by the data processing system against one or more datastores 152 in the data persistence layer 150, may be used to retrieve the information of interest as specified by the declarative query. The one or more executable queries generated using the information specified by the declarative query may be executable SQL queries or any other suitable type of executable queries.

In some embodiments, a declarative query may be specified using JavaScript object notation (JSON). However, in other embodiments, the declarative may be specified in any other suitable format (e.g., using any suitable mark-up language), as aspects of the technology described herein are not limited in this respect.

In some embodiments, a declarative query may include two portions: a so-called identification portion and a so-called enrichment portion. The identification portion may include information for identifying instances of at least one data entity. The enrichment portion may include information identifying attributes of the at least one data entity of interest.

In some embodiments, the data processing system 105 may be configured to process such a declarative query by: (1) identifying instances of the at least one data entity using the identification portion of the declarative query; and (2) obtaining attribute values for the identified data entity instances using the enrichment portion of the declarative query. For example, in some embodiments, the data processing system 105 may be configured to process a declarative query by: (1) generating a first set of one or more executable (e.g., SQL) queries using the identification portion of the declarative query; (2) generating a second set of one or more executable (e.g., SQL) queries using the enrichment portion of the declarative query; (3) executing the first set of executable queries to obtain results indicating one or more identified data entity instances: (4) executing the second set of executable queries to obtain results indicating attribute values for the identified data entity instance(s); (5) combine the results obtained from execution of the first and second sets of queries; and (6) output the results, optionally, applying formatting to the results (e.g., hierarchical formatting).

For example, as shown in FIG. 1D, a declarative query 115 may be provided as input to the entity API 120 from one of the entity API interfaces 110. Within the entity API 120, the input transformation module 130 may generate multiple executable queries 135 from the declarative query 115. The declarative query 115 may include an identification portion and an enrichment portion, and the multiple executable queries 135 may include one or more executable queries generated from the identification portion of the declarative query 115 and one or more executable queries generated from the enrichment portion of the declarative query 115.

As shown in FIG. 1D, the input transformation module includes entity instance identification module 132, entity instance enrichment module 134, and query transformation module 136. These modules may be configured to generate executable queries 135 from declarative query 115.

For example, in some embodiments, the entity instance identification module 132 may parse the identification portion of the declarative query 115 and generate an intermediate representation (e.g., as an abstract syntax tree) of a query for identifying data entity instances. In turn, the query transformation module 136 may: (1) transform the intermediate representation of the query in a series of one or more transformations to augment the representation with additional information; (2) generate an executable query from the transformed intermediate representation. This processing is described in more detail herein including with reference to FIG. 3 and in a preferred exemplary manner in 7A-7F.

As another example, in some embodiments, the entity instance enrichment module 134 may parse the enrichment portion of the declarative query 115 and generate an intermediate representation for each of one or multiple queries (often multiple queries!) for obtaining attribute values of the identified data entity instances. In turn, the query transformation module 136 may: (1) transform each intermediate query representation in a series of one or more transformations to augment the representation with additional information; and (2) generate a respective executable query from each transformed intermediate representation. This processing is described in more detail herein including with reference to FIGS. 3 and 7A-7F.

After the executable queries 135 are generated, the data processing system 105 may execute the executable queries 135, for example by invoking the queries 135 within one or more data stores 152 by using data access module 140, to obtain data 137 from the data persistence layer 150. The data 137 may include two types of results: (1) results from executing the one or more executable queries for identifying data entity instances; these results include information indicating one or more identified data entity instances (e.g., identifiers of identified entity instances); and (2) results from executing one or more executable queries for obtaining attribute values; these results include attribute values of the identified data entity instances. The data 137 may be provided to output transformation module 165, which may process the data 137 prior to outputting it to one or more of the entity API interfaces 110 as query results 155.

As shown in FIG. 1D, output transformation module 165 includes data synthesis module 163 and hierarchical output module 167. In some embodiments, the data synthesis module 163 may be configured to combine the results within data 137 in order to generate query results 155. As described above, the data 137 may include: (1) results containing information indicating one or more identified data entity instances; and (2) results including attribute values of the identified data entity instances. The data synthesis module 163 may combine these results (e.g., using pivoting or in any other way) so that the query results 155 associate each identified data entity instance with the values of its attributes. Aspects of combining results of executing identification and enrichment queries are described herein including with reference to FIG. 3 and in sections called "Declarative Queries: Identification and Enrichment" and "Optimizing Execution of Enrichment Queries."

As shown in FIG. 1D, output transformation module 165 also includes hierarchical output module 167. In some embodiments, the hierarchical output module may be configured to format data 137 for hierarchical presentation (e.g., using tabbing and/or nesting in text, using nested containers in a graphical user interface, using nested tags in a mark-up language, etc.). In some embodiments, the hierarchical structure of the results may match the hierarchical structure of the declarative query (e.g., the hierarchical structure of attributes identified in the enrichment portion of the declarative query). Aspects of hierarchical querying and presentation of results are described herein including with reference to FIGS. 4D-4F, 8A-8E, and 9A-9G.

Although the example of FIG. 1D is focused in part on how the data processing system 105 executes declarative queries, it should be appreciated that the data processing system 105 is not limited to executing only declarative queries. Indeed, the entity API 120 is also configured to process declarative statements (e.g., using module 138) for creating, deleting, or otherwise updating data entity instances persisted in layer 150. Aspects of creating, deleting, and updating data entity instances are described herein including in the Section called "Additional Entity API operations."

Figure 1E:
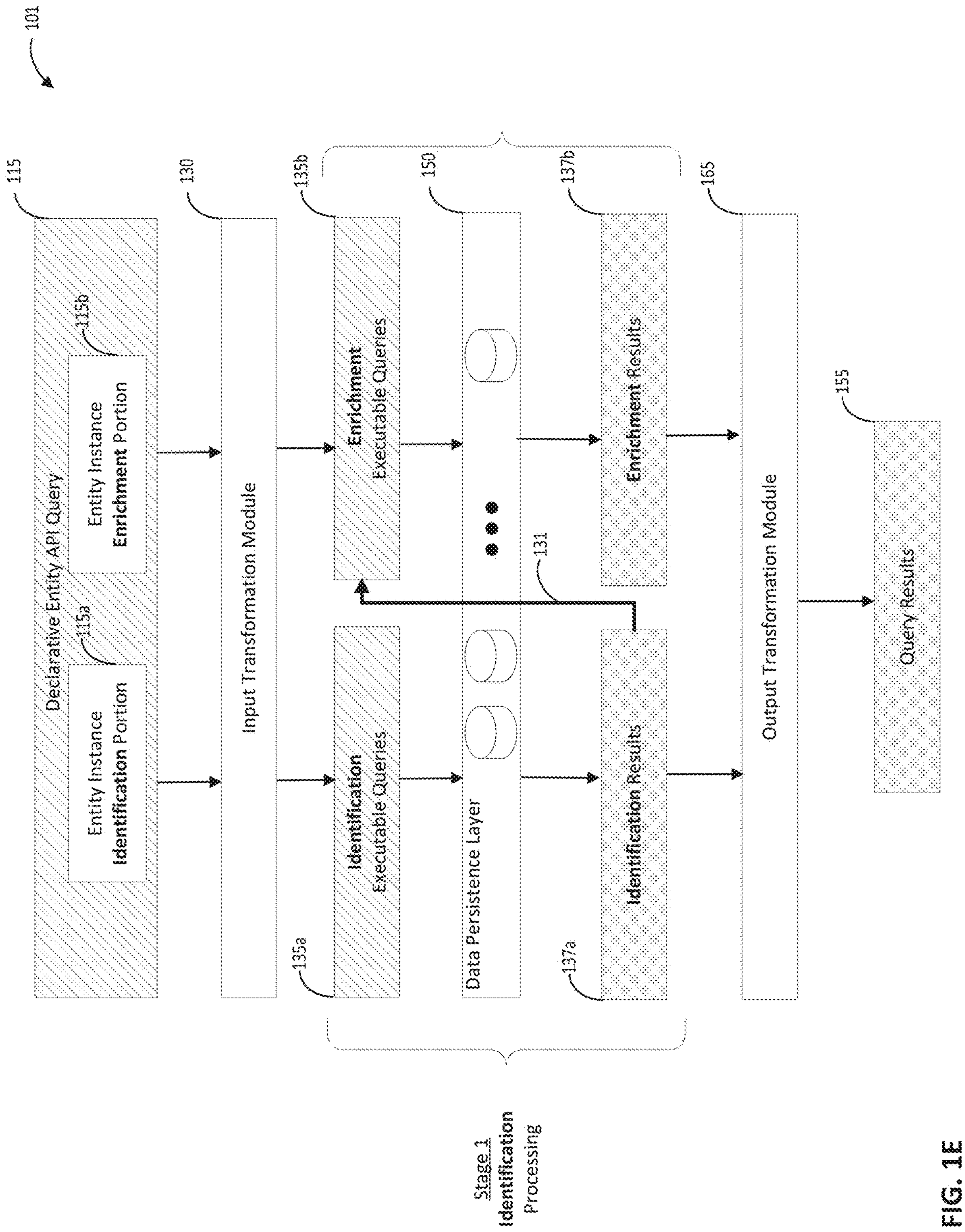
FIG. 1E is a diagram of an illustrative process 101 for generating query results in response to a declarative query for obtaining information about instances of one or more data entities, in accordance with some embodiments of the technology described herein.

Another view of how data processing system 105 may be configured to process a declarative query is shown in FIG. 1E, which is a diagram of an illustrative process 101 for generating query results in response to a declarative query 115 for obtaining information about instances of one or more data entities, in accordance with some embodiments of the technology described herein.

As shown in FIG. 1E, a declarative query 115 having an entity instance identification portion 115*a* and entity instance enrichment portion 115*b* may be processed by input transformation module 130 of the data processing system 105. As a result, one or more entity instance identification executable queries 135*a* may be generated using the entity instance identification portion 115*a* of the declarative query 115. The entity instance identification executable queries 135*a* may be executed by the data processing system to obtain entity instance identification results 137*a* from one or more data store(s) in data persistence layer 150.

The entity instance enrichment portion 115*b* may be used to generate one or more entity instance enrichment executable queries 135*b* for accessing attribute values of the entity instances identified by results 137*a*. As shown by arrow 131, in this illustrative example, when the enrichment executable queries 135*b* are executed, the queries may reference the results 137*a* of executing the identification queries so that attribute values are obtained for only those data entity instances that were identified by the results 137*a* (these are the instances identified using the identification portion of the declarative query 115). For example, the enrichment executable queries 135*b* may include a reference to a one or more tables and/or variables (see e.g., table "BizTermID0" in the example of FIGS. 5C-5F) for storing information identifying the data entity instances identified by using queries 135*a*. After the entity instance identification executable queries 135*a* are executed, the results may be stored in the referenced table(s) and/or variable(s) and accessed by the enrichment executable queries 135*b* when these queries are being executed.

In some embodiments, the entity instance identification executable queries 135*a* may be executed prior to the entity instance enrichment queries 135*b* being generated. In some such embodiments, the data entity instance identifiers may (but need not) be inserted directly into the enrichment queries 135*b* since these identifiers would be available. In this implementation, the executable enrichment queries would be generated based on both the content of the entity instance enrichment portion as well as the results of executing the identification executable queries 135*a*. However, in some embodiments, including the embodiment of FIGS. 1E and 5C-5F, the identification queries 135*a* need not be executed before the enrichment queries 135*b* are generated since the enrichment queries 135*b* can refer to one or more tables and/or variables (or other storage) where the data entity instance identifiers will be stored (after the identification queries 135*a* are executed) and the reference(s) (e.g., the name of the table(s) and/or variable(s)) can be included in the enrichment queries 135*b* before the entity instance identification queries 135*a* are executed. Thus, in some implementations, the enrichment queries may be generated before or after the identification queries are executed, as aspects of the technology described herein are not limited in this respect.

After the queries 135*a* are executed, the entity instance enrichment executable queries 135*b* may be executed to obtain entity instance enrichment results 137*b* from the data store(s) 152 in data persistence layer 150. As described herein, the data store(s) 152 may include a relational database or any other suitable type of data storage solution, examples of which are provided herein (e.g., with reference to data store(s) 152), as aspects of the technology described herein are not limited in this respect.

Next, the results 137*a* and/or 137*b* may be processed for output using output transformation module 165 to obtain query results 155, which may then be output. Various aspects of the stages of process 101 are described in greater detail herein including below with reference to FIG. 3.

It should be appreciated that the entity instance identification executable queries 135*a* and the entity instance enrichment queries 135*b* are obtaining different information from the data persistence layer 150. In particular, the queries 135*a* may be used to identify data entity instances satisfying the criteria set forth in the entity instance identification portion 115*a* and return information identifying such data entity instances. However, the results to queries 135*a*, generally, do not include values of data entity instance attributes. Rather, the values of the data entity instance attributes are obtained by processing the entity instance enrichment executable queries 135*b*. It should also be appreciated that the data obtained by queries 135*a* and 135*b* may be stored in different tables or other data structures of data store(s) 152. For example, the identifiers of data entity instances may be stored separately from values of dynamic attributes of those instances, which may be stored as name-value pairs.

Figure 1F:
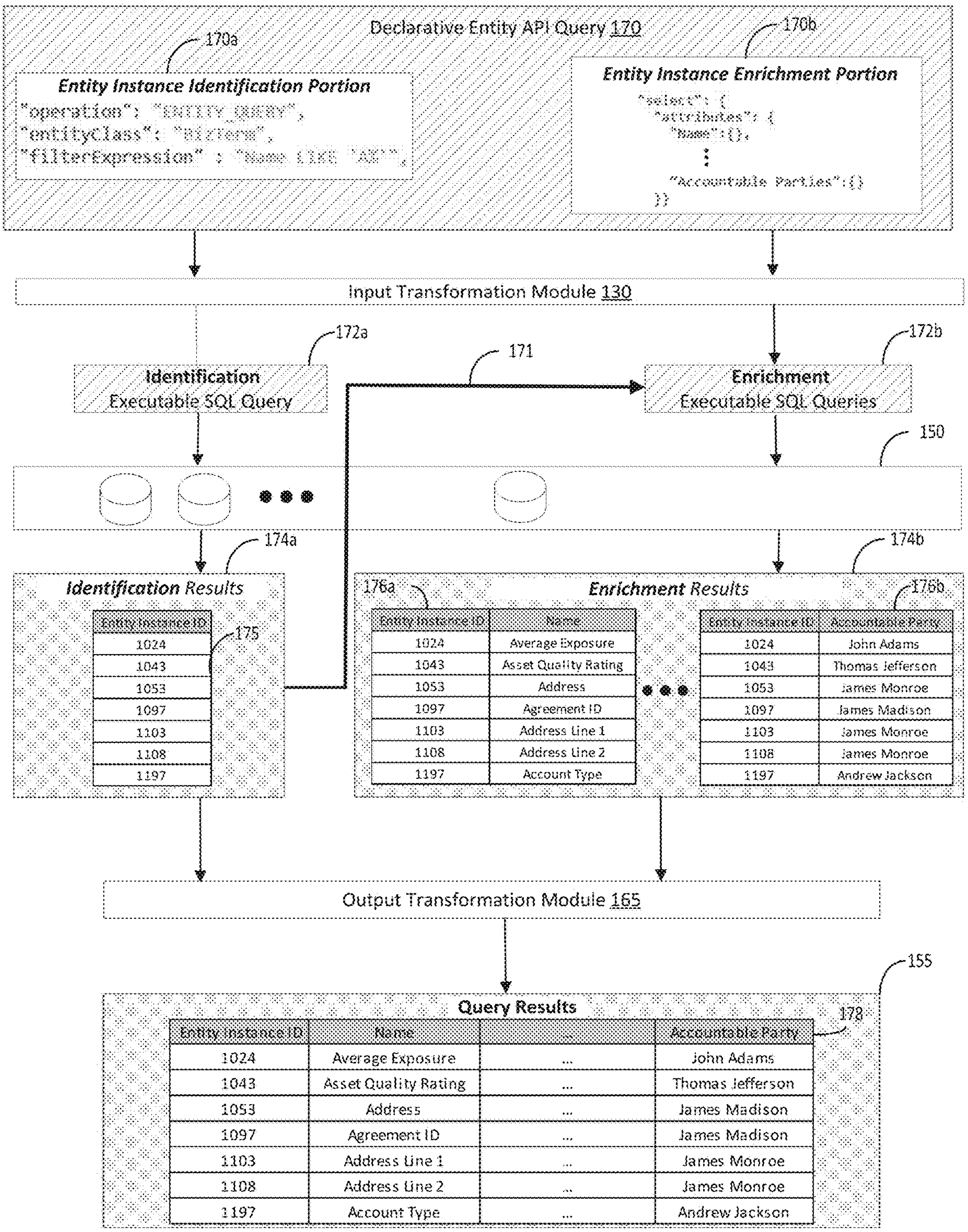
FIG. 1F shows an illustrative example of a declarative query being processed by the illustrative process 101 shown in FIG. 1E, in accordance with some embodiments of the technology described herein.

FIG. 1F shows an illustrative example of a declarative query 170 being processed by the illustrative process 101 shown in FIG. 1E, in accordance with some embodiments of the technology described herein. The declarative query 170 includes an entity instance identification portion 170*a* and an entity instance enrichment portion 170*b*.

The identification portion 170*a* indicates that instances of the "BizTerm" data entity whose name begins with "A" are to be identified. The enrichment portion 170*b* indicates that, for each data entity instance identified using identification portion 170*a*, values of a number of attributes including "Name" and "Accountable Party" are to be retrieved—the ellipsis indicates that more attributes may be specified in the enrichment portion 170*b*, but that only two are shown in this example for clarity of presentation.

Next, the input transformation module 130 processes the entity instance identification portion 170*a* to generate an entity instance identification executable SQL query 172*a*, which when executed by the data processing system, retrieves entity instance ID results 174*a* from data persistence layer 150. The entity instance ID results 174*a* include identifiers (shown in table 175) for data entity instances that satisfy the conditions set forth in the entity instance identification portion 170*a*. Though table 175 has only seven rows, this is for clarity presentation only, as any suitable number of data entity instances (e.g., tens, hundreds, thousands, millions, etc.) may be identified in response to executing an entity instance identification query (e.g., query 172*a* in this example or any other entity instance identification query described herein).

The input transformation module 130 also processes the entity instance enrichment portion 170*b* to generate entity instance enrichment executable SQL queries 172*b* which, when executed by the data processing system, retrieve entity instance enrichment results 174*b* from data persistence layer 150. As shown by arrow 171, in this illustrative example, when the enrichment executable queries 172*b* are executed, the queries may reference the results 174*a* of executing the identification query 172*a* so that attribute values are obtained for only those data entity instances that were identified by the results 174*a*. For example, the enrichment executable queries 172*b* may include a reference to one or more table(s) and/or other variable(s) for storing information identifying the data entity instances identified by using query 172*a*. After the entity instance identification executable query 172*a* is executed, the results may be stored in the table(s) and/or other variable(s), and accessed by the enrichment executable queries 172*b* when these queries are being executed.

In some embodiments, the entity instance identification executable queries 172*a* may be executed before the entity instance enrichment queries 172*b* are generated. In some such embodiments, the data entity instance identifiers may be inserted directly into the enrichment queries 172*b*, if needed, since these identifiers would be available. In this implementation, the executable enrichment queries 172*b* would be generated based on both the content of the entity instance enrichment portion as well as the results of executing the identification executable query 172*a*. However, as described herein, the identification query 172*a* need not be executed before the enrichment queries 172*b* are generated since the enrichment queries 172*b* can refer to one or more table(s) and/or variable(s) where the data entity instance identifiers will be stored (after the query 172*a* is executed) and the reference(s) (e.g., the name of the table(s) and/or variable(s)) can be included in the enrichment queries 172*b* before the entity instance identification query 172*a* is executed.

As shown in FIG. 1F, the entity instance enrichment results 174*b* include values of the attributes specified in the entity enrichment portion 170*b* from data persistence layer 150. For example, table 176*a* includes values of the "Name" attribute for the instances of the data entities identified in the entity instance ID results 174*a*. As another example, table 176*b* includes values of the "Accountable Party" attribute for the instances of the data entities identified in the entity instance ID results 174*a*. If the entity instance enrichment portion 170*b* specified additional attributes (as shown by ellipsis in 170*b*), then the entity instance enrichment results 174*b* may have included values for those additional attributes (as shown by ellipsis in 174*b*).

As described herein, in some embodiments, different executable SQL queries may be used to retrieve values of different groups of one or more attributes. In the example of FIG. 1F, executable SQL queries 172*b* includes at least two executable SQL queries—a first executable SQL query to get the values of the "Name" attribute and a second executable SQL query (different from and executed separately from the first executable SQL query) to get the values of the "Accountable Party" attribute. That is why, in this example, the results obtained by executing these two queries are shown in separate tables 176*a* and 176*b*.

After the entity enrichment results 176*b* are obtained, the results are processed by output transformation module 165 to generate query results 155 including table 178, which in this example groups all the attribute values retrieved for a particular data entity instance in a row of the table for that entity instance. As described herein, the query results output in response to processing an entity API query need not be tabular and, in some embodiments, may have any other suitable format (e.g., a hierarchical format), examples of which are provided herein. The query results are shown as rows of a table 178 for clarity of presentation of this example in FIG. 1F.

In the example of FIG. 1F, the output transformation module 165 is shown as receiving both the entity instance ID results 174*a* and the entity instance enrichment results 174*b*, and generating the query results from both of these inputs. A similar architecture is shown in FIG. 1E. The entity instance ID results 174*a* may include additional information about each entity instance ID beyond merely its identifier (e.g., the name of the entity instance, class of the entity, a name to display when generating a GUI referencing the entity, one or more other identifiers, and/or any other suitable information etc.). The entity instance enrichment results may include values of one or more attributes of the identified instances. The query results may include some or all of these types of information.

In some embodiments, the query results may be generated from the entity instance enrichment results directly, for example, without using the entity instance ID results 174*a*. For example, if only the entity instance identifier is to be returned without other information about each entity instance (e.g., other information that may be part of entity instance ID results 174*a*) and the enrichment results 174*b* organize attribute values using the entity instance ids (e.g., as shown in the first columns of tables 176*a* and 176*b* in FIG. 1F), the enrichment results may be used to generate the query results (e.g., table 178) directly, for example, without using the entity instance IDS results 174*a*.

Data Entities, Static and Dynamic Attributes, Relationships Among Entities

In some embodiments, data managed by a data processing system may be organized using data entities. Data entities may be used to organize data using an object-oriented paradigm. Similar to how object-oriented programming involves classes and instances thereof, a data processing system may be configured with definitions of data entities and manage data using instances of the data entities and the data entity definitions.

In some embodiments, a data entity definition defines the structure of the data entity. The data entity definition may define attributes (or variables) of the data entity. Entity attributes may take on scalar values like strings and numbers. For example, the "BizTerm" data entity 220 shown in FIG. 2C has a string-valued attribute named "Definition". Entity attributes may refer to other data entities. Such entity attributes may be termed "reference attributes". For example, as shown in FIG. 2G, the BizTermGroup attribute of data entity 220 refers to the BizTermGroup data entity. Other examples of entity attribute types are provided herein.

In some embodiments, a data entity definition may specify additional information for one or more of the attributes of the data entity. For example, a data entity definition may specify the attribute type. As another example, a data entity definition may specify the manner in which values for an attribute are stored by the data processing system (e.g., whether the attribute values are stored in rows or columns). As yet another example, a data entity definition may specify whether an attribute of a data entity inherits its value (e.g., from an attribute of another data entity). In some implementations, a data entity definition may specify a particular value (e.g., a default value) for a particular attribute, in which case all instances of the data entity would have the particular attribute set to the particular value. Otherwise, the values of data entity instance attributes may vary from instance to instance of the data entity.

In some embodiments, a data entity may include one or more static attributes and/or one or more dynamic attributes. For example, FIG. 2A shows an illustrative diagram of a data entity 200 having multiple static attributes 202, including static attributes 203*a* and 203*b*, and multiple dynamic attributes 204, including dynamic attributes 205*a* and 205*b*. As another example, FIG. 2B shows an illustrative diagram of a data entity 210, named "BizTerm", having multiple static attributes 212, including static attributes 212*a* and 212*b*, and dynamic attributes 214, including dynamic attributes 214*a*-214*b*. A data entity may have any suitable number of static attributes (including 0) and any suitable number of dynamic attributes (including 0), as aspects of the technology described herein are not limited in this respect.

FIG. 2C shows another illustrative diagram of the "BizTerm" data entity 220 having static attributes 222 ("Name" and "Description") and dynamic attributes 224 ("LegacyURL" and "LegacyChgDate"). The attributes 225 are reference attributes in that they refer to other data entities. For example, the BizTermGroup attribute of data entity 220 refers to the BizTermGroup data entity, the PIIClassification attribute points to the PIIClassification data entity, and the DataElems attribute points to a collection of DataElem data entities.

FIG. 2D is a table 230 illustrating properties of attributes of some of the attributes of the data entity shown in FIG. 2C, including whether its attributes are static or dynamic, in accordance with some embodiments of the technology described herein. In particular, table 230 indicates that the "Name", "Description", and "LegacyURL" attributes are string valued, while the "LegacyChgDate" takes on value of type Date. The table 230 indicates that "Name" and "Description" are static variables, while "LegacyURL" and "LegacyChgDate" are dynamic variables.

In some embodiments, static and dynamic attributes may be stored differently by a data processing system. For example, the values of static attributes may be stored in columns of a database table or multiple database tables. By contrast, the values of dynamic attributes may be stored as name-value pairs and, as such, are stored in separate rows of a database table or multiple database tables.

FIG. 2E is a diagram illustrating aspects of how static attribute values and dynamic attribute values may be stored by a data management system, in accordance with some embodiments of the technology described herein. In some embodiments, to store static attribute values, each entity instance may be represented as a row in a database table (or multiple database tables), and each static attribute of the instance may be represented as a column in the table(s). For example, as shown in FIG. 2E, static attribute values of instances of data entity 220 are stored in static attribute storage 235 (which may include one or more tables) and, specifically, in table 240. The table 240 includes a column for each static attribute, the rows of that column corresponding to different instances of the "BizTerm" data entity 220. Hence, the table has a column called "Name" for storing values of the "Name" attribute for different instances of data entity 220 (e.g., instances 1001 and 1002 in this example), and a column called "Description" for storing values of the "Description" attribute for different instances of the data entity 220. In some embodiments, the table 240 may be defined by a database administrator using a data definition language.

On the other hand, in some embodiments, dynamic attribute values may be stored using name-value pairs. In particular, each database record may store an attribute value for a particular entity instance. For example, as shown in FIG. 2E, dynamic attribute values of instances of data entity 220 are stored in dynamic storage 245 (which may include one or more tables) using tables 250 and 260. In this example, table 250 assigns each dynamic attribute a respective unique identifier, and table 260 stores a row for each dynamic attribute value—the dynamic attribute value is stored together with the unique identifier (e.g., 1, 2, . . . in this example) for the attribute and identifier (e.g., 1001, 1002, . . . , in this example) for the data entity instance.

Figure 2F:
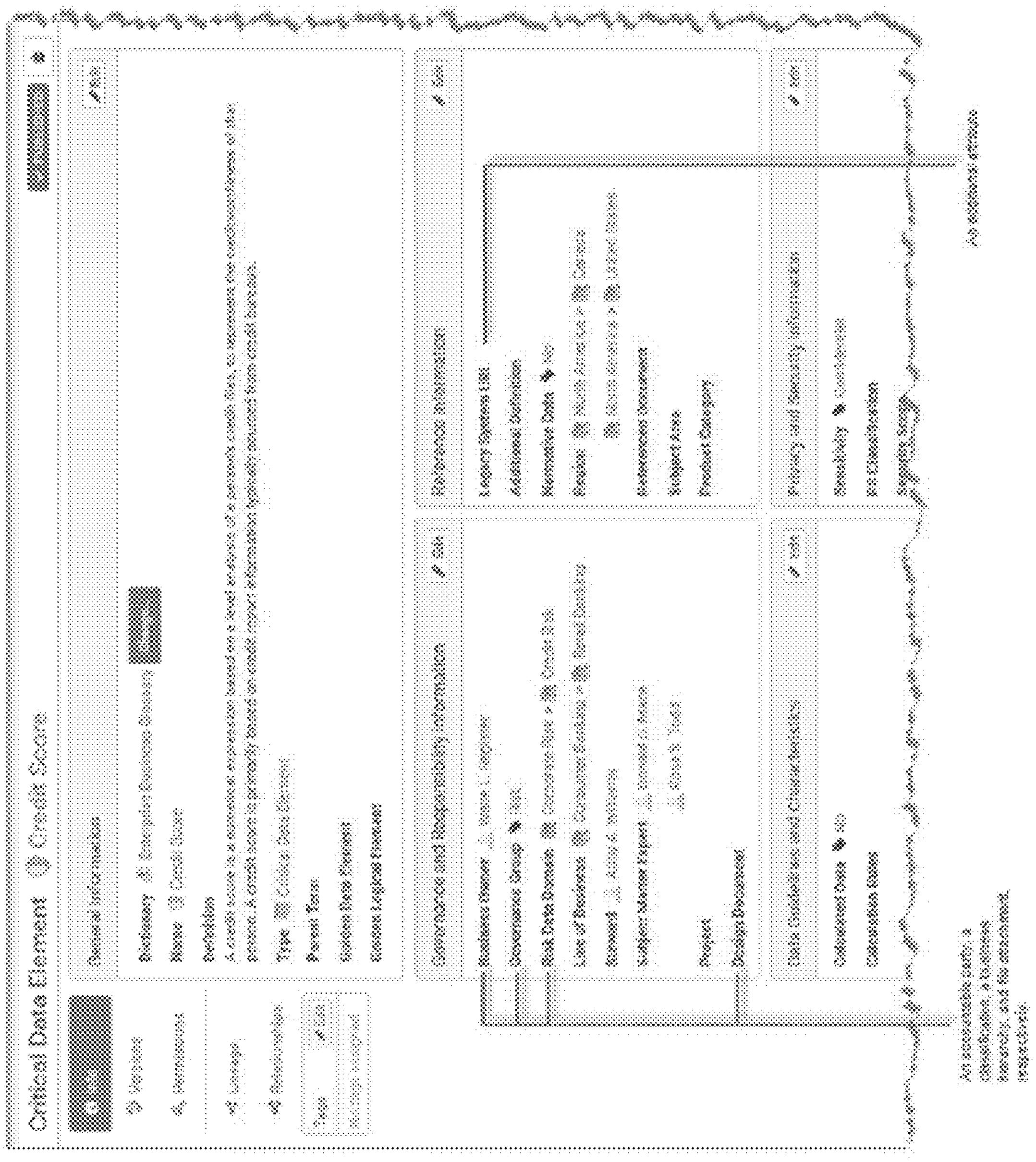
FIG. 2F is a screenshot of an illustrative graphical user interface showing a visualization of a data entity instance and the values of its attributes, in accordance with some embodiments of the technology described herein.
Figure 2G:
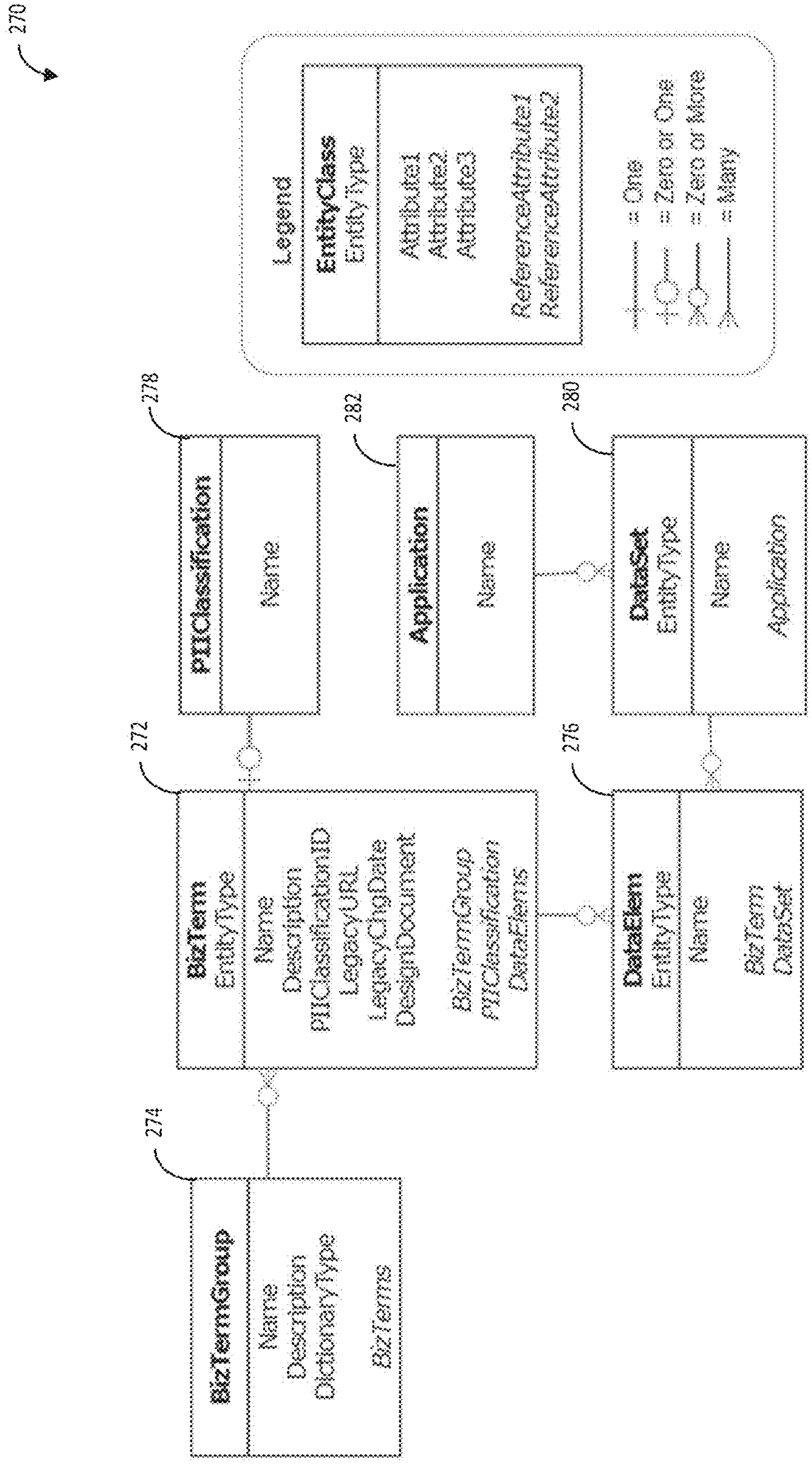
FIG. 2G is a diagram showing relationships among data entities in accordance with an example entity model, in accordance with some embodiments of the technology described herein.

Another example of a data entity instance 265 is shown in FIG. 2F, which is a screenshot of an illustrative graphical user interface showing a visualization of the data entity instance and the values of at least some of its attributes. The data entity instance 265 is an instance of the "BizTerm" data entity. In this example, the data entity instance 265 is named "Credit Score." The data entity instance 265 has many static (e.g., "Name", "Definition", and "Type") and dynamic attributes. In this example, the dynamic attributes are divided into groups of attributes for storing various types of information related to data governance in a banking application. For example, the data entity instance 265 has dynamic attributes relating to governance including: "Business Owner", "Governance Group", "Risk Data Domain", "Line of Business", "Steward," "Subject Matter Expert", etc. As another example, the "Credit Score" data entity instance has attributes relating to privacy and security including: "Sensitivity", "PI Classification" and "Security Scope". The screenshot of FIG. 2F illustrates example values of some of these attributes for the data entity instance 265.

As may be appreciated from the foregoing examples, attributes may be considered as being of different types depending on the types of values that they take on. Examples of different types of attributes are described below by way of example and not limitation. For example, an attribute may take on a scalar value such as a number, a string, a date, a time, or a date-time. This type of attribute may be referred to as an "Extended Attribute" in some of the examples described herein. In some embodiments, an attribute may be multi-valued and take on a set of values, each of which may be a number, a string, a date, a time, or a date-time.

As another example, an attribute may be discrete whereby it takes on values selected from a discrete set of values. Such a set may be referred to as an "enumeration". For example, an attribute may be of type "Classification," whereby its value is a label from selected from a set of labels. This allows for tagging of data with desired labels. As one specific example, certain data may be classified as being or containing personally identifiable information (PII), for example, with values such as "Yes" or "No". In the example of FIG. 2F, the PII Classification dynamic attribute is of type "Classification," as is the attribute "Governance Group". As another example, an attribute may take on values representing respective users or groups of users. In the example of FIG. 2F, the "Business Owner" attribute may be of type "Accountable Parties" and its values may represent users or groups of users. In the example of FIG. 2F, the "Business Owner" takes on the value "Wade L. Register". In some embodiments, one or more (e.g., all) of the values in the discrete set of values may be a reference to another data entity instance. All these example attributes are discrete.

As another example of a discrete attribute, an attribute may take on values in an ordered set of values. For example, values in the ordered set may be ordered according to a hierarchy. As one specific example, an attribute may store a value related to a geographic region, which may be selected from a hierarchical list of values (e.g., "United States", "Delaware", or "Wilmington"). Attributes taking on values in an ordered set of values may be of type "Hierarchy". In the example of FIG. 2F, the "Risk Data Domain", "Line of Business", and "Region" attributes are dynamic attributes of type "Hierarchy". When accessing the value of an attribute of type "Hierarchy", in some embodiments, the particular value taken on by the variable may be returned together with other related values. For example, as shown in FIG. 2F, the value of the "Risk Data Domain" is "Credit Risk" and it is displayed in FIG. 2F together with the related value "Corporate Risk", which is a value related to "Credit Risk" in the hierarchy of values of "Risk Data Domain" since "Credit Risk" is a type of "Corporate Risk". In some embodiments, one or more (e.g., all) of the values in the ordered set of values may be a reference to another data entity instance.

As another example, an attribute may be a reference attribute and its value may be a reference to another data entity (e.g., a reference to an instance of another data entity). In some embodiments, an attribute may be multi-valued and take on a set of values, each of which may be reference to a data entity.

As another example, in some embodiments, an attribute may be of type "file attachment" and its value may identify a file (e.g., a document, a report, a configuration file, a spreadsheet, etc.) of interest. In the example of FIG. 2F, the "Design Document" attribute is of the "Attachment" type.

In some embodiments, values of dynamic attributes of the same type may be stored in the same underlying relational database table, which allows for optimizations when retrieving values of these attributes. For example, as described below, in the section called "Optimizing Execution of Enrichment Queries", a single executable SQL query may be used to retrieve values of multiple dynamic variables of the same type.

As may be appreciated from the foregoing, storing a data entity instance may involve storing many different types of data as the entity instance may have different types of attributes. Moreover, a data entity instance may have static and dynamic variables, which may be stored in different ways by the data processing system. Accordingly, a single data entity instance may be stored using rows and/or columns of one or multiple tables in a database system (e.g., a relational database system, an object oriented database system, etc.). The table(s) may be stored on one or multiple computer-readable storage mediums.

As described above with reference to entity model 160 of data processing system 105, a data processing system may be configured with data entities that are related to one another through the use of reference attributes, whereby an attribute of one data entity may refer to another data entity. The configuration of a data processing system may include an entity model 160, which includes data entity definitions 162 and information specifying relationships 164 among the data entities. Aspects of such an entity model may be visualized in an entity relationship diagram (ERD) such as the illustrated ERD shown in FIG. 2G, which is a diagram 270 showing relationships among data entities in accordance with an example entity model with which a data processing system may be configured, in accordance with some embodiments of the technology described herein.

In the example of FIG. 2G, the "BizTerm" data entity 272 has the attributes "Name", "Description", "PIIClassificationID", "LegacyURL", "LegacyChgDate", and "DesignDocument," which take on various values. One or more of these attributes may be static (e.g., "Name" and "Description"). One or more of these attributes may be dynamic (e.g., "PIIClassificationID", "LegacyURL", "LegacyChgDate", etc.). The "BizTerm" data entity also has the reference attributes "BizTermGroup", "PIIClassification", and "DataElems", which refer to other data entities—the BizTermGroup data entity 274, the PIIClassification data entity 278, and the DataElem entity 276, respectively. The BizTermGroup attribute may refer to one or more BizTermGroup data entity instances. The PIIClassification attribute may refer to zero or one PIIClassification data entity instances. The DataElems attribute may point to zero, one or more DataElem entities.

The DataElem entity 276 includes the attribute "Name" and two reference attributes "BizTerm" (referring to the parent BizTerm) and "DataSet" referring to one or more instance of the DataSet entity 280. In turn, the DataSet entity 280 includes a reference attribute "Application" that points to one or more instances of the Application data entity 282.

It should be appreciated that the entity model illustrated in FIG. 2G is illustrative and non-limiting. A data processing system may be configured with any suitable data entity model having any suitable data entities and relationships therebetween, as aspects of the technology described herein are not limited to any particular entity model.

Retrieving Information About Data Entity Instances Using Declarative Queries

Figure 3:
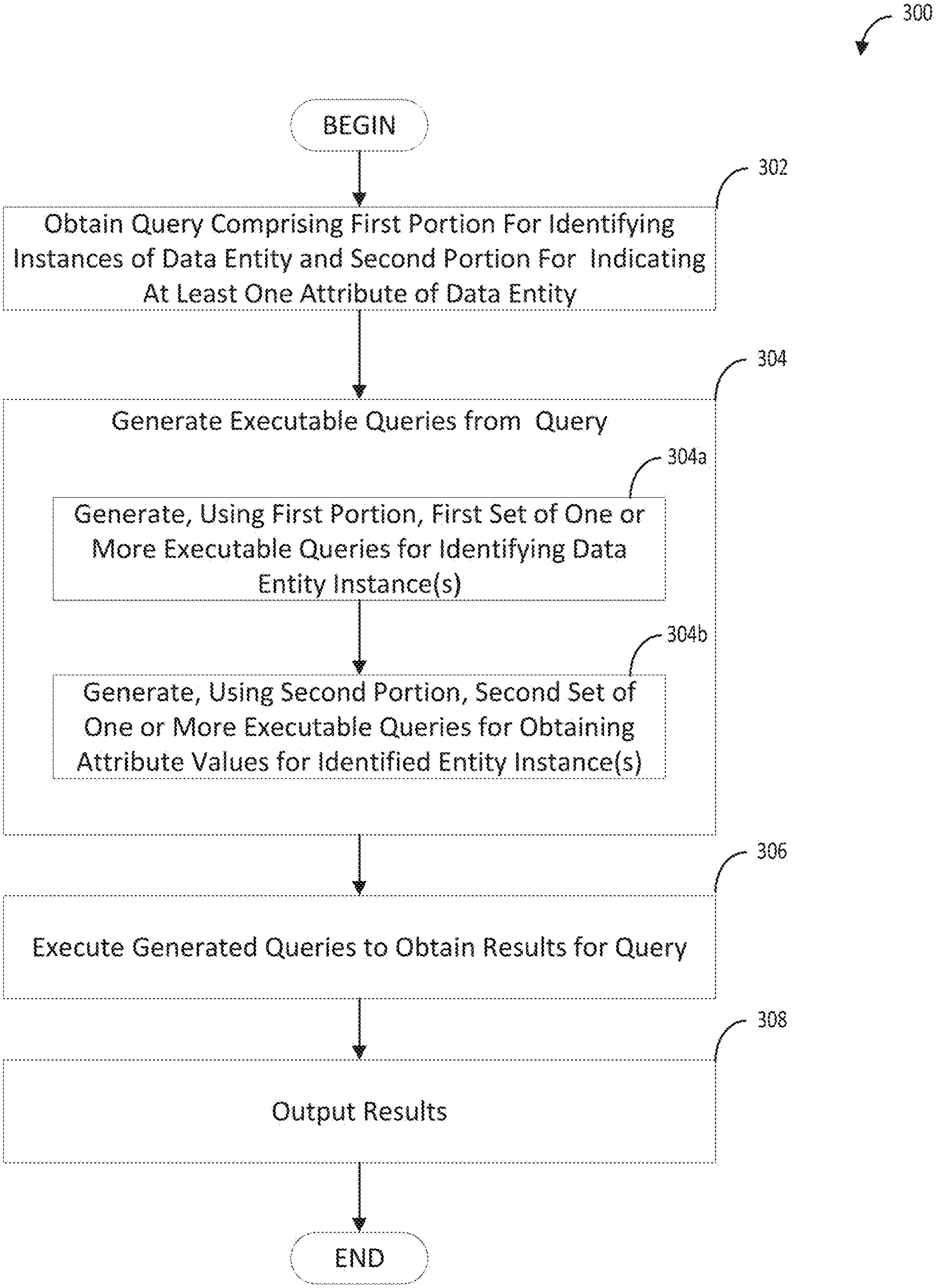
FIG. 3 is a flowchart of an illustrative process 300 for generating query results in response to a declarative query for obtaining information about instances of one or more data entities, in accordance with some embodiments of the technology described herein.

FIG. 3 is a flowchart of an illustrative process 300 for generating query results in response to a query (e.g., a declarative query) for obtaining information about instances of one or more data entities, in accordance with some embodiments of the technology described herein.

The process 300 may be performed by any suitable computing device(s). The process 300 may be performed by any suitable software executing on a data processing system (e.g., data processing system 105). For example, with reference to the data processing system 105 shown in FIG. 1D, the process 300 may be performed at least in part by using input transformation module 130 to perform act 304 (including acts 304*a* and 304*b*) and output transformation module 160 to perform act 308. As another example, data access module 140 may be configured to perform act 306, in some embodiments.

In the illustrative embodiment of FIG. 3, the process 300 begins at act 302, where a query (e.g. a declarative query) is obtained. The query may include a first portion for identifying instances of a data entity (the "identification portion" of the query) and a second portion indicating at least one attribute of the data entity for which to retrieve values (the "enrichment portion" of the query). In some embodiments, the query may be specified using JSON. However, in other embodiments, the query may be specified in any other suitable format, as aspects of the technology described herein are not limited in this respect. Examples of queries (e.g., declarative queries) are provided herein.

The query may be obtained from any suitable source. For example, in some embodiments, the query may be obtained through one of the entity API interfaces 110 described with reference to FIG. 1D. As one example, the query may be written by a user in a graphical user interface. As another example, the query may be generated programmatically using a scripting language, a graph-based computer program, a third-party application, or any other suitable software.

After the query is obtained at act 302, process 300 proceeds to act 304 where one or more executable queries are generated from the query obtained at act 302. In some embodiments, the executable queries may be executable SQL queries.

In some embodiments, the act 304 may be performed in two stages. First, at act 304*a*, one or more executable queries (e.g., executable SQL queries) are generated from the identification portion of the query ("identification queries"). Next, at act 304*b*, one or more executable queries (e.g., executable SQL queries) are generated from the enrichment portion of the query ("enrichment queries"). The executable identification and enrichment queries generated at acts 304*a* and 304*b*, respectively, may be generated in any suitable way including in any of the ways described in the section below named "Generating Executable Queries." The first, identification portion of the query may be transformed through a series of transformations that augments the information in the first portion with information managed by the data processing system to generate the first set of one or more executable queries that are configured to be executed against a data store of the at least one data store used by the data processing system to store the data entity instances, and wherein the second, enrichment portion of the query may be transformed through a series of transformations that augments the information in the second portion with information managed by the data processing system to generate the second set of one or more executable queries that are configured to be executed against a data store of the at least one data store used by the data processing system to store the attribute values.

In some embodiments, at act 304*a*, a single executable (SQL) query may be generated using the identification portion of the query in accordance with process 700 described herein with reference to FIGS. 7A-7F.

In some embodiments, at act 304*b*, one or multiple executable SQL queries may be generated using the enrichment portion of the query in accordance with process 700 described with reference to FIGS. 7A-7F. Whether or not multiple executable SQL queries are generated using the enrichment portion depends on the number of attributes identified in the enrichment portion. A single executable SQL query may be sufficient when only a single attribute is identified. However, in some embodiments, when multiple attributes are identified in the enrichment portion, multiple executable SQL queries may be generated using the enrichment portion.

In particular, in some embodiments, when multiple attributes are identified in the enrichment portion of a query, the attributes may be grouped into groups and an executable SQL generated may be generated for each group of attributes. In some embodiments, the attributes may divided into groups as follows: (1) static attributes of the data entity may grouped into a single group; (2) dynamic attributes may be grouped into one or multiple groups based on their type in the entity model (e.g., extended attributes, classifications, hierarchies, accountable parties, and attachments for the example entity model illustrated in FIG. 2G) and/or based on the manner they are stored; and (3) one group for each reference dynamic attribute (i.e., a dynamic attribute referring to another data entity instance) or inline view within the enrichment portion. Aspects of grouping dynamic attributes into groups are described herein including below in the section called "Accessing Attribute Values for Groups of Attributes."

In some embodiments, for each group of static or dynamic attributes, a respective executable query (e.g., executable SQL query) may be generated using the process 700 described with reference to FIG. 7A. For any reference attribute referring to an instance of a second data entity, the same overall approach may be applied recursively: (1) the requested static and dynamic attributes of the other data entity instance are grouped; (2) an executable SQL query is generated for each of the resulting groups (e.g., using process 700); and (3) if the second data entity instance includes a reference attribute referring to an instance of a third data entity then: (3a) its requested static and dynamic variables are grouped; and (3b) an executable SQL query is generated for each resulting group (e.g., using process 700). Should the third data entity instance have a reference attribute referring to an instance of a fourth data entity, the process of grouping static and dynamic attributes into groups and generating executable queries for each group may continue, and so on, recursively.

In some embodiments, an enrichment portion of a query may include an inline view containing another query. That other query may be a declarative entity query for which results include attribute values of instances of one or more data entities or a declarative tabular query (aspects of declarative tabular queries are described herein including in the section below called "Additional Aspects of Entity API"). For example, the enrichment portion of a declarative query 920 includes two inline views: an inline view 922 including a declarative entity query and an inline view 924 including a declarative tabular query. In this way, declarative queries may be nested. Where an enrichment portions contains an inline view, the declarative query in the inline view may be processed in a manner similar to that described above; namely, static, and dynamic attributes may be grouped and a respective executable (e.g., SQL) query may be generated for each of the groups, with further recursive processing applied to any referenced data entity queries or further nested inline views.

After the executable instance and enrichment queries are generated at act 304, process 300 proceeds to act 306 where these executable queries are executed to obtain query results, and the query results may be combined and output at act 308.

In some embodiments, performing the act 306 comprises first executing the identification queries generated at act 304*a* to obtain information identifying one or more data entity instances. This information may be stored in one or more table(s) and/or variable(s). After the identification queries are executed, the act 306 may comprise executing the enrichment queries generated at act 304*b* to obtain attribute values for the identified data entity instances. The enrichment queries generated at act 304*b* may thus refer to the information identifying the data entity instance(s) obtained by executing the identification queries generated at act 304*a*. The reference may be to the table(s) and/or variable(s) storing the information the data entity instance(s).

Also, as described herein, in some embodiments, in a variation of the illustrated process 300, the enrichment queries may be generated after the identification queries are executed. In such an embodiment the process may proceed by: (1) generating one or more executable identification queries from the identification portion of a declarative query: (2) executing the identification query or queries to obtain information identifying one or more data entity instances; (3) generate one or more executable enrichment queries (optionally, using the information identifying the data entity instance(s)) obtained at the second step); and (4) execute the enrichment query or queries to obtain attribute values for the identified data entity instances. Thus, it should be appreciated that the enrichment queries may be generated before or after the identification queries are executed, as aspects of the technology described herein are not limited in this respect.

In some embodiments, the query results obtained at act 306 may include: (1) identifiers for each data entity instance identified by executing the executable query obtained using the identification portion of the query; and (2) values of attributes obtained by executing the executable query or queries obtained using the enrichment portion of the query. Such query results may be combined by placing the data entity instance identifiers into a table and, since the attribute values are also associated with the identifiers of the respective entity instance, placing the dynamic attribute values into the same table (which, as described below, is effectively performing a pivoting operation). Aspects of combining query results of the generated executable queries are described further herein including in the sections called "Declarative Queries: Identification and Enrichment" and "Optimizing Execution of Enrichment Queries."

The combined query results may be output in any of numerous ways. For example, in some embodiments, the results may be saved to memory or any other suitable computer readable storage medium or media so that the results may be subsequently accessed. In some embodiments, where the query was received from a software program (e.g., script, graph-based computer program, third party software, etc.) the results may be provided to the software program. In some embodiments, where the query was input by a user via a graphical user interface, the results may be displayed to the user through the graphical user interface.

The combined query results may be output in any suitable format. For example, the query results may be output in text format, JSON, or any other suitable format. In some embodiments, the query results may be formatted for hierarchical presentation (e.g., using tabbing and/or nesting in text, using nested containers in a graphical user interface, using nested tags in a mark-up language, etc.). In some embodiments, the hierarchical structure of the results may match the hierarchical structure of the query (e.g., the hierarchical structure of attributes identified in the enrichment portion of the declarative query). Aspects of hierarchical querying and presentation of results are described herein including with reference to FIGS. 4D-4F, 8A-8E, and 9A-9G.

Declarative Queries: Identification and Enrichment

Figure 4A:
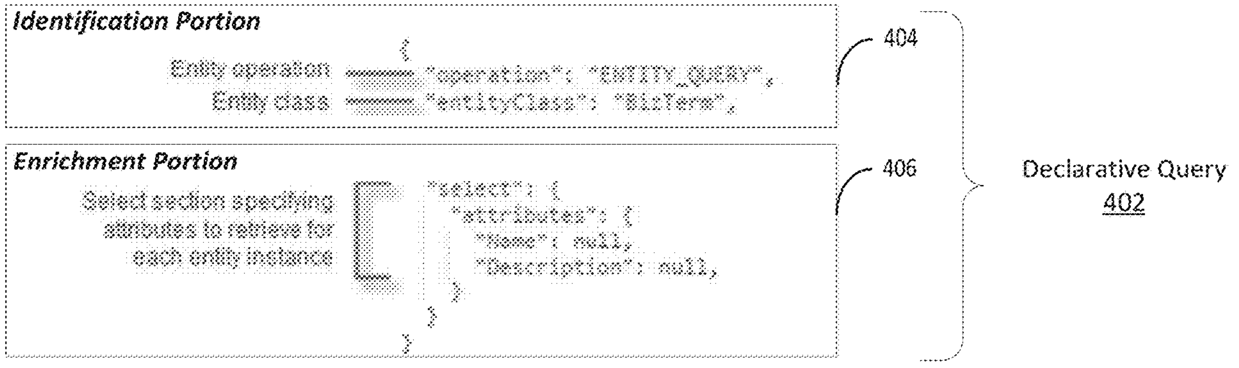
FIG. 4A is a diagram illustrating an example declarative query 402 comprising an identification portion and an enrichment portion, in accordance with some embodiments of the technology described herein.

FIG. 4A is a diagram illustrating an example declarative query 402 comprising an identification portion 404 and an enrichment portion 406, in accordance with some embodiments of the technology described herein. The declarative query 402 is specified in JSON format in this example. However, it should be appreciated that a declarative query may be specified in any other suitable format(s), as aspects of the technology described herein are not limited to using only JSON format to specify declarative queries.

As described herein, an identification portion of a declarative query contains information for identifying instances of one or more data entities, which instances may be stored by a data processing system (e.g., using data persistence layer 150 described with reference to FIG. 1D). The enrichment portion of the declarative query contains information identifying one or more attributes of the data entity or entities whose values are to be obtained (for the identified data entity instances) in response to processing the declarative query. In this way, processing a declarative query involves: (1) processing its identification portion to select data entity instances; and (2) processing its enrichment portion to obtain attribute values of the selected data entity instances. When an attribute's value is a reference to one or more other data entity instances, processing the enrichment portion may further include using that reference value to obtain values of attributes of the other data entity instance(s) or, even, values of attribute(s) of still other data entity instance(s) related to the other data entity instance(s), as described herein.

In the example of FIG. 4A, the declarative query 402 is for retrieving information about instances of any data entity whose "entityClass" is "BizTerm." This is indicated in the second line of the identification portion 404 as shown in FIG. 4A. In turn, the enrichment portion 406 specifies that, for each data entity instance identified using the identification portion 404, values of the "Name" and "Description" attributes should be obtained.

Figure 4B:
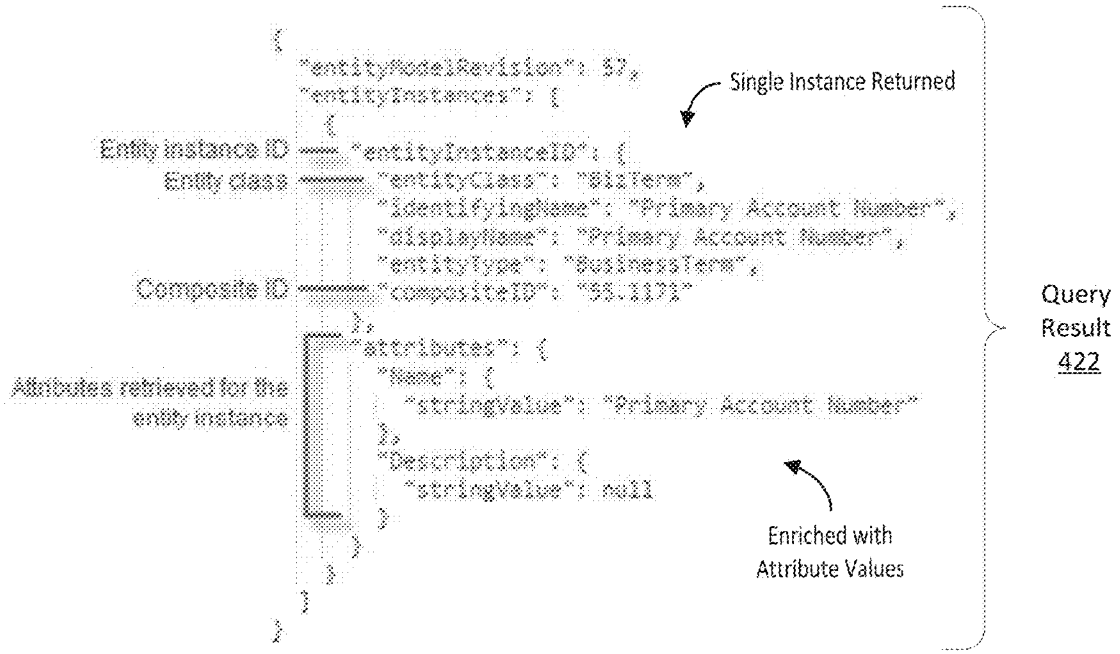
FIG. 4B is a diagram illustrating an example results generated by processing the declarative query shown in FIG. 4A, in accordance with some embodiments of the technology described herein.

An illustrative query result 422 generated by processing the declarative query 402 of FIG. 4A is shown in FIG. 4B. In this example, the query result 422 generated in response to processing the declarative query 402 includes information for a single data entity instance. (This is an abridged example for clarity. In practice information about many data entity instances may be returned). The information for that single data entity instance includes: (1) identifying information for the data entity instance; and (2) values (for the single instance) of attributes of the data entity identified in the enrichment portion 406 of declarative query 402 (i.e., the values for the attributes "Name" and "Description", which values in this example are "Primary Account Number" and a null value, respectively). If additional attributes were identified in the enrichment portion 406, then values for those attributes would also have been included in the query result 422.

As also shown in FIG. 4B, the identifying information for the data entity instance (part of query result 422), includes multiple fields with corresponding values including, for example, the field ("entityClass") for indicating the entity class of the data entity instance with the corresponding value "BizTerm" (which is consistent with the identification portion 404 of the declarative query 402), the field ("identifyingName") for indicating an internal name for the data entity with the corresponding value "Primary Account Number", the field ("displayName") for indicating the name of the data entity instance to use for display with the corresponding value "Primary Account Number", the field ("entityType") for indicating the entity type with its corresponding value of "BusinessTerm", and a field ("compositeID") for indicating an alphanumeric (or numeric or alphabetic) identifier for the data entity instance with the corresponding value of "55.1171".

As may be appreciated from FIGS. 4A and 4B, the declarative query 402 is a query because it is a declarative statement for retrieving information about data entity instances managed by the data processing system. A declarative query for obtaining information about data entities may be referred to as an "entity query" (see e.g., the first line of identification portion 404). As described herein, embodiments of the technology described herein are not limited to merely retrieving information about data entities (e.g., data entity instances, definitions of data entities, related configuration information, etc.), but can be used to update, delete, or create such information in the data processing system. In such a case, a declarative statement can be used to effect such an operation. Examples of such declarative statements (a declarative query is an example of declarative statement) and a description of how such statements are processed by a data processing system are described herein including below in section titled "Additional Entity Operations."

In the simple example of FIG. 4A, the identification portion 404 specifies that instances of data entity having a particular class are to be identified. However, the identification portion may specify which data entity instances are to be selected in other ways, which may be more complex. For example, the identification portion may specify that data entity instances having certain attribute values are to be selected. As one specific example, the identification portion 411 of declarative query 410 shown in FIG. 4C, indicates at line 412 that information should be retrieved about data entity instances having the class "BizTerm" and whose "Name" attribute is a string containing the value "Account." As another example, the identification portion may specify that data entity instances that are related to other data entities having certain attribute values are to be selected.

More generally, in some embodiments, the conditions for selecting data entity instances may depend on any data stored and/or accessible by the data processing system, including any data related to the data entity instances themselves, global parameters and/or variables, data processing system configuration, computing environment variable values, and/or any other suitable data stored by and/or accessible to the data processing system. In some embodiments, one or more such conditions may be expressly articulated in the identification portion of a declarative query (e.g., using JSON), examples of which are provided herein. In some embodiments, one or more such conditions may be imposed by the data processing system when processing the declarative query. For example, the data processing system may provide a user information about only those data entity instances that the user is authorized to access. Such a condition, in some embodiments, may be imposed automatically without having to be expressly written as part of the declarative query.

Thus, in some embodiments, the conditions for selecting data entity instances depend on data associated with the data entity instances (e.g., attribute values of data entity instances, attribute values of related data entity instances, definitions of data entities, permissions associated with access to data entities, the version of the data stored in data entity instances, etc.). Additionally or alternatively, the conditions for selecting data entity instances may depend on other information. For example, the conditions may specify a numeric limit on the number of results to be returned (see e.g., line 414 of the declarative query 410 shown in FIG. 4C limiting the number of returned results to 5,000). A limit on the number of results returned may be set also in the enrichment portion of a declarative query (see e.g., line 416 of the enrichment portion 415 shown in FIG. 4C limiting the number of results returned in response to the "select" statement to 500). As another example, the conditions may specify selecting only those data entity instances that the user of the data processing system (e.g., the user logged in) is authorized to access.

As yet another example, the conditions may specify selecting data entity instances based on their history (e.g., when created, when last updated, whether updated within a specified period of time, whether created and/or edited by a particular user or group of users, etc.).

As yet another example, the conditions may specify selecting data entity instances based on their workflow status. In some embodiments, the data processing system may be configured to manage changes to data entity instances using a workflow management system so that at least some changes made by a user to any data associated with a data entity instance (e.g., an attribute value) have to be approved by one or more other users. The workflow management system may keep track of which changes need approval and which changes have been approved. Thus, a data entity instance may be associated with a workflow state where all previously-submitted changes have been approved (sometimes termed a "published" or "approved" workflow state), with a workflow state where one or more of the previously-submitted changes have not yet been approved (sometimes termed a "pending" or "pending approval" workflow state), or any other workflow state as the case may be. More complex workflow management systems may have other states depending on the way in which change management is implemented. Aspects of how a workflow management system may be implemented are described in U.S. Patent Application Publication No. 2020/0234242, titled "Finite State Machines for Implementing Workflows for Data Objects Managed by a Data Processing System," filed on Jan. 22, 2020, which is incorporated by reference herein in its entirety.

Figure 4C:
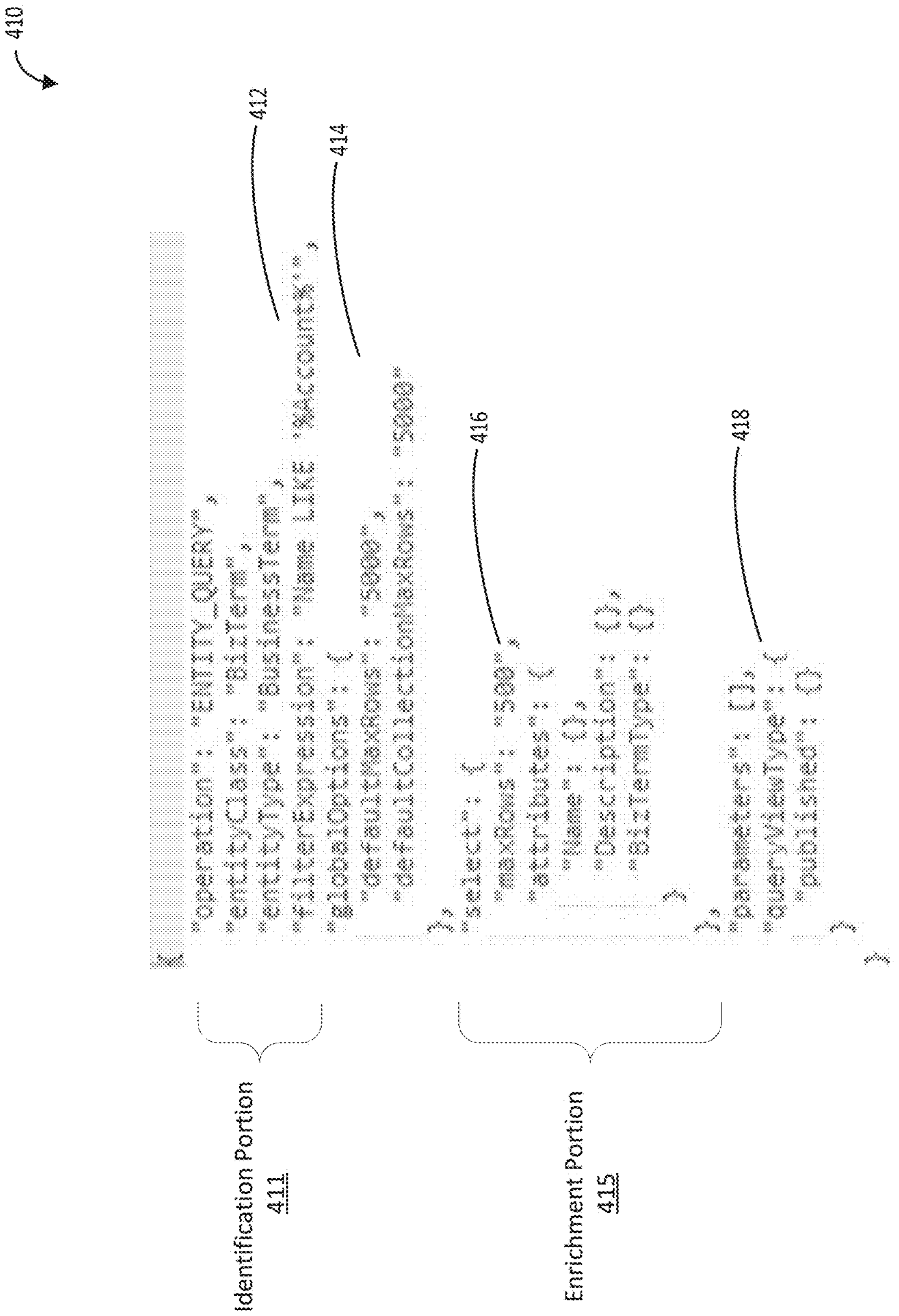
FIG. 4C is a diagram of another illustrative declarative query 410, in accordance with some embodiments of the technology described herein.

Regardless of the details of how a workflow management system is implemented, however, in some embodiments, data entities may be associated with a corresponding workflow status (e.g., workflow state) and the conditions for identifying data entity instances (e.g., as articulated expressly in the identification portion of a declarative query and/or as implicitly applied by the data processing system when processing the declarative query) may specify selecting data entity instances based on that workflow status. For example, the conditions may specify selecting data entity instances having a particular workflow state (e.g., "published," "pending approval," etc.), selecting those data entity instances that have been updated (e.g., moved from a "pending approval" to an "approved" state) within a threshold period of time or within a specified range, or selecting data entity instances based on their workflow status in any other suitable way, as aspects of the technology described herein are not limited in this respect. For example, as shown in FIG. 4C, the declarative query 410 indicates, using the "queryViewType" parameter 418, that only "published" data entity instances should be selected when the identification portion 411 is processed (and therefore that any data entity instances associated with changes still pending approval are not selected).

In some embodiments, the data entity instances may be "versioned" in that, when a change is made to a data entity instance, the modified data entity instance is stored as a new version of the data entity instance and the previous version of the data entity instance is persisted. In some such embodiments, an identification portion of a declarative query may be used to select the most current version of a data entity, one or more previous versions of the data entity persisted by the data processing system, the values indicating changes between the current and one or more previous versions of the data entity, and/or any other suitable information about the current and/or persisted data entity instances.

As may be appreciated from the foregoing, there is a rich set of conditions that may be included as part of an identification portion of a declarative query to indicate which data entity instances are to be selected. The technology developed by the inventors provides for a different ways of expression such conditions. For example, in some embodiments, the identification portion of a declarative query may specify the data entity instances to be selected using a structured query language (SQL) query. As another example, in some embodiments, the identification portion of a declarative query may specify the data entity instances to be selected using the so-called "filter expression" syntax. As yet another example, in some embodiments, the identification portion of a declarative query may specify the data entity instances to be selected using alphanumeric (or numeric or alphabetic) identifiers associated with the data entity instances. This third option may be applicable when those alphanumeric identifiers are already accessible (e.g., after creating or updating data entity instances)). As yet another example, in some embodiments where the data processing system utilizes one or more search indices to access the data entity instances as described below in the section called "Retrieving Data Using Search Index or Indices, the identification portion of a declarative query may specify the data instances to be selected using a search string.

In some embodiments, the identification portion of the declarative query may specify data entity instances using a SQL query. For example, the SQL query may use any suitable syntax and/or commands compliant with the ANSI SQL standard (e.g., of any past, current, or future version). In some embodiments, the SQL query may conform to any vendor-specific SQL implementation consistent with the ANSI SQL standard (e.g., implementations for MySQL, Oracle, PostgreSQL, Teradata, etc.). In some embodiments, the SQL query may use a strict subset (i.e., some but not all syntax and/or commands) part of the ANSI SQL standard. The SQL query in Table 1 is one example of a SQL query that could be included in an identification portion of a declarative query.

TABLE 1

SQL query for selecting all instances of data entity 'BizTerm' that are part of the (classification group called "Finance" business terms". This SQL query may be used as part of an identification portion of a declarative query.

```
SELECT b.Name
FROM BizTerm b
   INNER JOIN xGroupXref xref
   ON b.BizTermID = xref.EntityInstanceID AND xref.EntityClass =
   'BizTerm'
   INNER JOIN xGroup g ON xref.xGroupID = g.xGroupID
WHERE g.Name = 'Finance'
```

Additional examples of SQL queries used in identification portions of declarative queries are provided herein including in FIGS. 4D, 9C, and 9F-1 and 9F-2.

In some embodiments, the identification portion of a declarative query may specify the data entity instances to be selected using the so-called "filter expression" syntax. In some embodiments, a filter expression may include a SQL "WHERE" clause. Additionally, unlike SQL queries compliant with the ANSI SQL standard, a filter expression may include a so-called "entity model" path, which allows accessing values using strings that conform to the entity model using a dot notation, which notation is sometimes used in object oriented programming languages. For example, the dot notation may be used to traverse data entity relationships in the data entity model (e.g., according to the relationships in the ERD shown in FIG. 2G). An example of selecting data entity instances using a filter expression syntax is shown in Table 2 below. This filter expression is used to select instances of the "BizTerm" data entity whose name begins with the letter "A" and that belong to the Business Term Group called "Enterprise Business Glossary". In this example, "BizTermGroup.Name" is an entity model path.

TABLE 2

Identification portion of declarative query using "filter expression" syntax to identify instances of the "BizTerm" data entity whose name begins with the letter "A" and which belong to the "Enterprise Business Glossary" Business Term Group.

```
{    "operation": "ENTITY_QUERY",
     "entityClass" : "BizTerm",
     "filterExpression" : "Name like 'A%' AND BizTermGroup.Name =
     'Enterprise Business Glossary'"}
```

Additional examples of filter expressions used in identification portions of declarative queries are provided herein including in FIGS. 4A, 4C, 5A, and 8B.

As described herein, data entities may be related to one another. For example, attributes of a data entity instance may themselves reference other data entity instances (e.g., the value of a data attribute may be a reference to another data entity instance). And one or more of those other data entity instances may also have attributes that reference other data entity instances. And so on. As a result, a data entity instance may be associated with a hierarchy of attributes and, in some embodiments, a single declarative query may be used to obtain values of some or all of the attributes in such a hierarchy. In this sense, that declarative query may be considered as being hierarchical.

Accordingly, in some embodiments, a declarative query can traverse related entities and their attributes to allow for the retrieval of a lot of related data in a single request. To this end, in some embodiments, the enrichment portion of the declarative query contains information identifying one or more attributes of the related data entities of interest so that their values may be obtained (e.g., for the data entity instances identified using the identification portion of the same declarative query) by processing the declarative query.

The enrichment portion may indicate the attributes of interest in any of numerous ways. For example, in some embodiments, that indication may be explicit in the enrichment portion of the declarative query, and may be specified, for example, using nesting as described herein including with reference to FIGS. 4D-4F and 9A-9G. As another example, in some embodiments, that indication can be made without explicitly stating a hierarchy of attributes in the declarative query and instead by relying on recursion, as described herein including with reference to FIGS. 8A-8C.

Figure 4D:
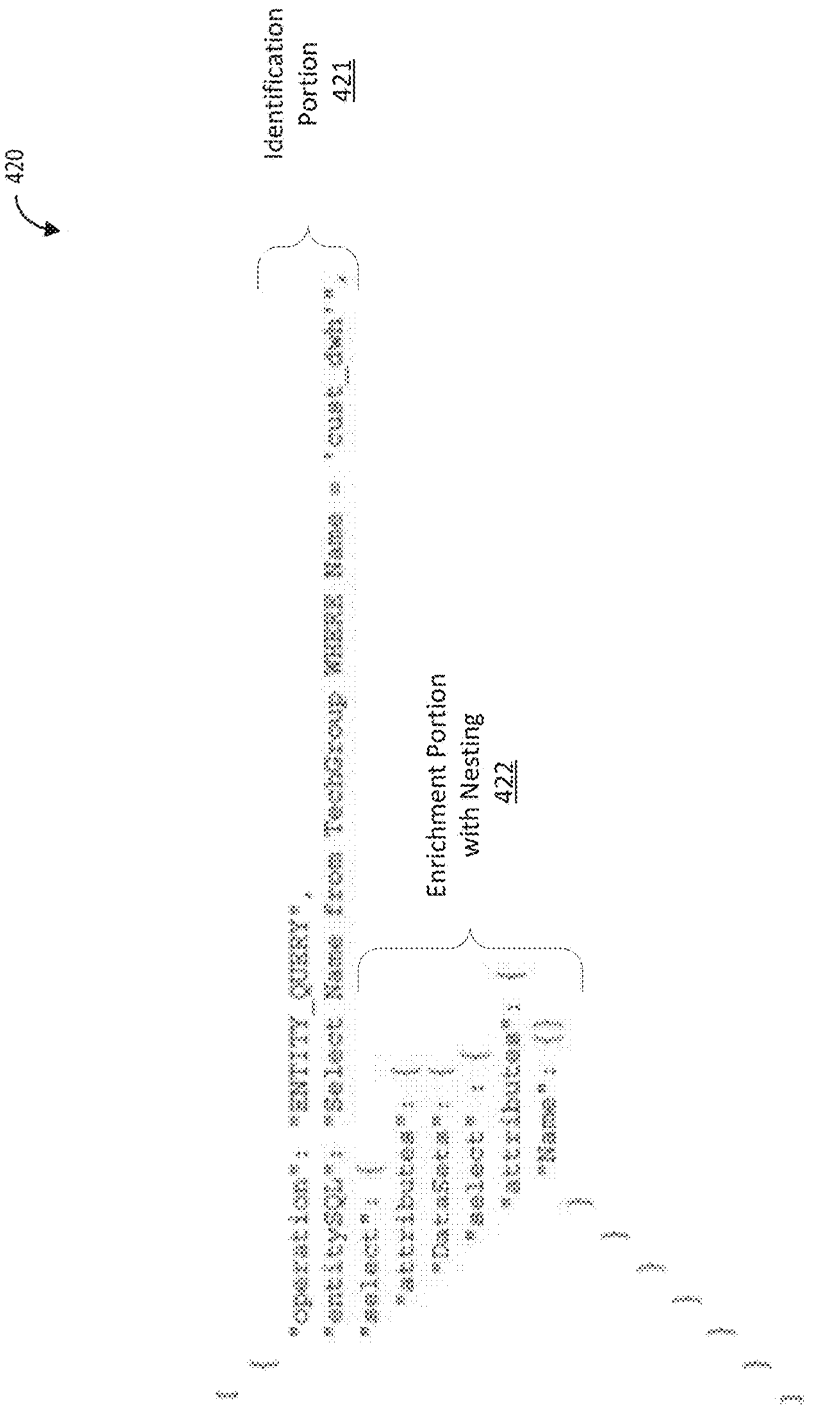
FIG. 4D is a diagram of a declarative query 420 that specifies a hierarchy of attributes whose values are to be returned in response to processing the declarative query, in accordance with some embodiments of the technology described herein.

One example of a hierarchical declarative query is shown in FIG. 4D, which is a diagram of a declarative query 420 that specifies a hierarchy of attributes whose values are to be returned in response to processing the declarative query, in accordance with some embodiments of the technology described herein. Declarative query 420 includes an identification portion 421 containing a SQL query for selecting instances of the data entity "TechGroup" whose "Name" attribute takes on the value "cust_dwh".

Declarative query 420 also includes an enrichment portion 422 that uses nesting to specify a hierarchy of attributes whose values are to be retrieved. In this example, an instance of the "TechGroup" data entity may reference a list of one or more "DataSet" data entity instances, and enrichment portion 422 indicates that, for each identified "TechGroup" data entity instance, identifying information and the name for each particular DataSet data entity instance (referenced by the particular "TechGroup" data entity instance) are to be retrieved.

FIG. 4E illustrates example results 430 returned in response to processing the declarative query 420 shown in FIG. 4D. Notably, the results 430 include information about nested entity instances. In particular, the results 430 include information about a single instance of the "TechGroup" data entity including: (1) identifying information 431; (2) the value of its Name attribute 432; and (3) and information about two "DataSet" data entity instances referenced by the single instance of the "TechGroup" data entity. The information about the two "DataSet" instances is shown in nested results 434 and 436. For each "DataSet" instance, the returned information includes identifying information about the instance (e.g., entityClass, identifyingName, displayName, entityType, and compositeID values) and the values of the "Name" attributes. In this example, the values of the "Name" attributes in the results 434 and 436 are "CUSTOMER_INFO" and "DEPOSIT_ACCOUNT," respectively.

In some embodiments, results generated by processing a declarative query may be formatted in a hierarchical format corresponding to the hierarchy of attributes specified in the declarative query. For example, as can be seen from the examples of FIGS. 4D and 4E, the hierarchical structure of the results 430 shown in FIG. 4E matches (and, therefore, corresponds to) the hierarchical structure of the nesting shown in the enrichment portion 422 of the declarative query 420 of FIG. 4D. In this way, declarative query is not only used to obtain data from one or more data stores (e.g., from data persistence layer 150), but also to put the data in an appropriate format for output. For example, the data retrieved by processing a declarative query may be stored one or multiple tables in a relational database. However, after being retrieved, the hierarchical structure of the declarative query may be used (e.g., by hierarchical output module 167 described with reference to FIG. 1D) to re-organize the data in a hierarchical format matching that of the enrichment portion of the declarative query and output in that format.

In some embodiments, it may be desirable to not return values associated with all related data entity instances. For example, there may simply be too many related data entity instances. In this case, the results may be circumscribed by imposing a numeric limit on the number of results returned (e.g., as shown in FIG. 4C). As another example, the results may be filtered by using a filter expression or a SQL statement within the nested structure of the enrichment portion of the declarative query. For example, as shown in FIG. 4F, the declarative query 420 of FIG. 4D may be augmented with a filter expression 442 to obtain declarative query 440, in order to reduce the number of "DataSet" entity instances returned by returning only those instances whose "Application.Name='Feed'.

As described herein, a declarative query includes an identification portion and an enrichment portion and, in order to process the declarative query: (1) the identification portion is converted to one or more executable SQL queries (sometimes referred to as "identification query" or "identification queries" herein); (2) the enrichment portion is converted to one or more executable SQL queries; (3) all the executable SQL queries are executed to obtain respective results (sometimes referred to as "enrichment query" or "enrichment queries" herein), which are (4) combined and, optionally formatted (e.g., hierarchically) to generate the response to the declarative query. FIGS. 5A-5F illustrate some aspects of this process.

Figure 5A:
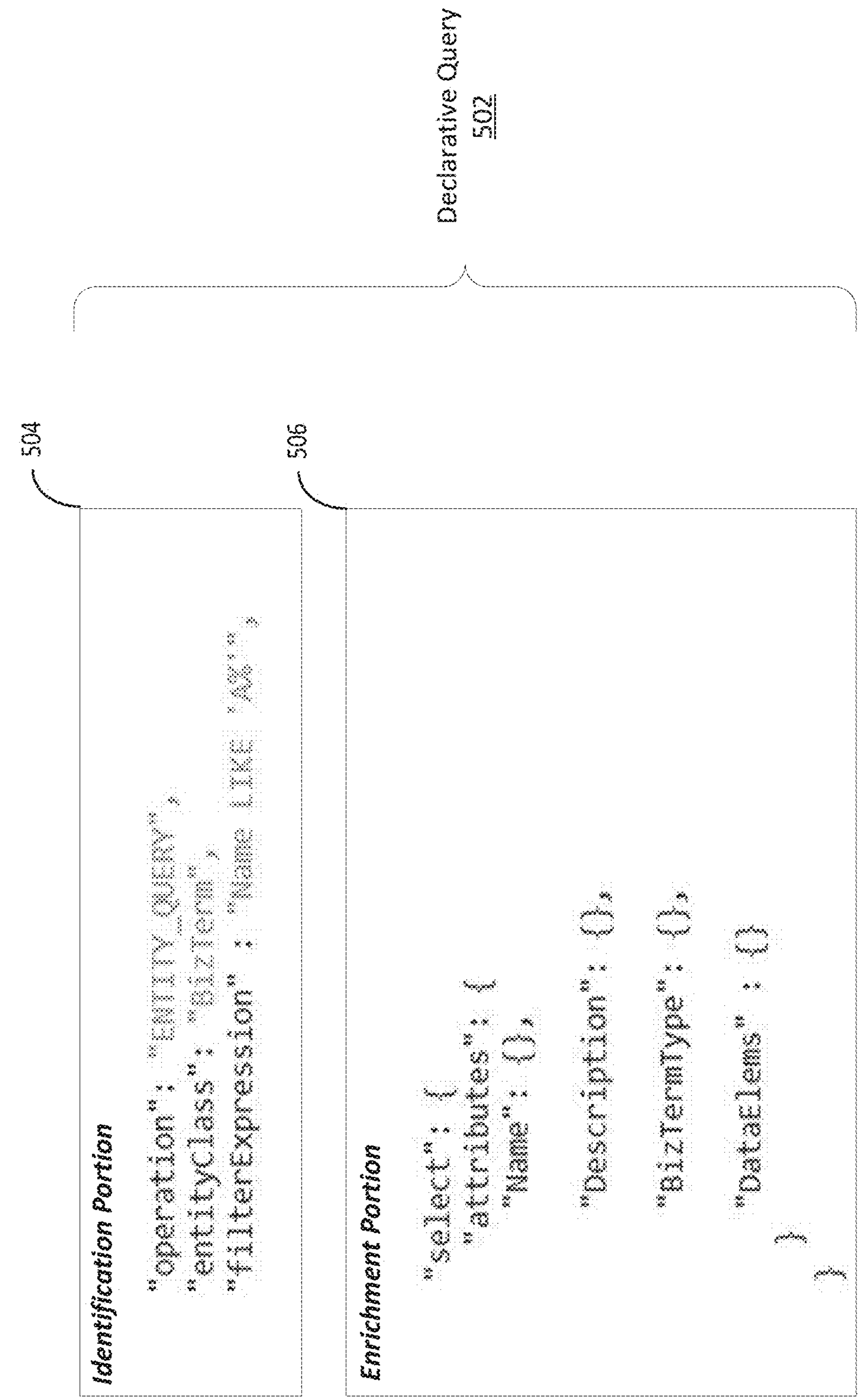
FIG. 5A is a diagram illustrating an example declarative query 502 comprising an identification portion and an enrichment portion, in accordance with some embodiments of the technology described herein.

FIG. 5A is a diagram illustrating an example declarative query 502 comprising an identification portion and an enrichment portion, in accordance with some embodiments of the technology described herein. The declarative query 502 includes identification portion 504 and enrichment portion 506. The identification portion 504 indicates that instances of the "BizTerm" data entity whose name begins with "A" are to be identified when the identification portion 504 is processed. The enrichment portion 506 indicates that, for each data entity instance identified using identification portion 504, information about the "Name," "Description," "BizTermType", and "DataElems" attributes is to be retrieved. In this example, "Name" and "Description" are static attributes and "BizTermType" and "DataElems" are reference attributes.

Figure 5B:
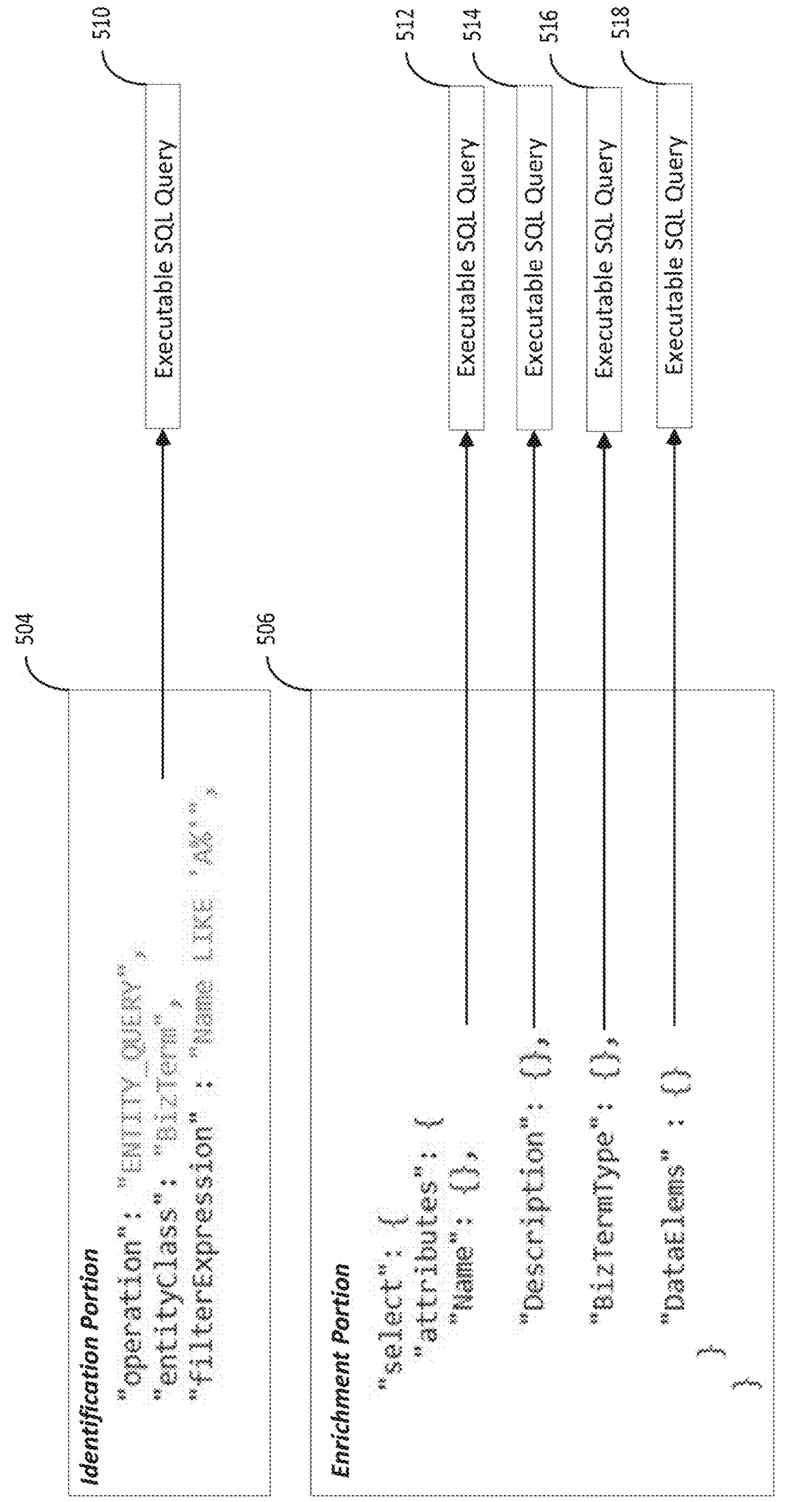
FIG. 5B is a diagram illustrating executable SQL queries that may be generated by a data processing system by processing the declarative query 502 shown in FIG. 5A, in accordance with some embodiments of the technology described herein.

FIG. 5B is a diagram illustrating executable SQL queries that may be generated by a data processing system by processing the declarative query 502 shown in FIG. 5A, in accordance with some embodiments of the technology described herein. In particular, as shown in FIG. 5B, the identification portion 504 may be processed to generate executable SQL query 510 for identifying "BizTerm" data entity instances that have a name beginning with "A". Separately, the enrichment portion 506 may be processed to generate: (1) an executable SQL query 512 to obtain values of the Name attribute; (2) an executable SQL query 514 to obtain values of the Description attribute; (3) an executable SQL query 516 to obtain values of the "BizTermType" attribute; and (4) an executable SQL query 518 to obtain values of the "DataElems" attribute. The results obtained by executing the SQL query 510 may include (e.g., numeric) identifiers of identified data entity instances, and these identifiers may be used to combine the results of executing all the executable SQL queries 510, 512, 514, 516, and 518. As described herein, in some embodiments, the executable SQL queries generated using the enrichment portion may be executed (and, optionally, generated) using the results of the executing the executable SQL query (e.g., query 510 in this example) for identifying data entity instances of interest (in this example, the data entity instances that have a name beginning with "A").

It should be appreciated that although, in this example, values of each attribute are obtained using a single executable SQL query, in some embodiments, more than one SQL query or any other suitable combination of executable SQL statements may be used to obtain the values of one or more of the attributes, as aspects of the technology described herein are not limited in this respect.

It should also be appreciated that, in some embodiments, a single executable SQL query may be used to retrieve values of multiple different attributes. This may provide efficiency in processing the declarative query (e.g., when different attribute values are stored in a same table, are of the same type, are stored on the same storage medium, etc.) thereby reducing the amount of computational resources (e.g., processor cycles, memory, network bandwidth) used to process the query. Examples of using a single executable SQL query to retrieve values of multiple different attributes are provided herein including with reference to FIGS. 5D and 6A-6F.

Figure 5C:
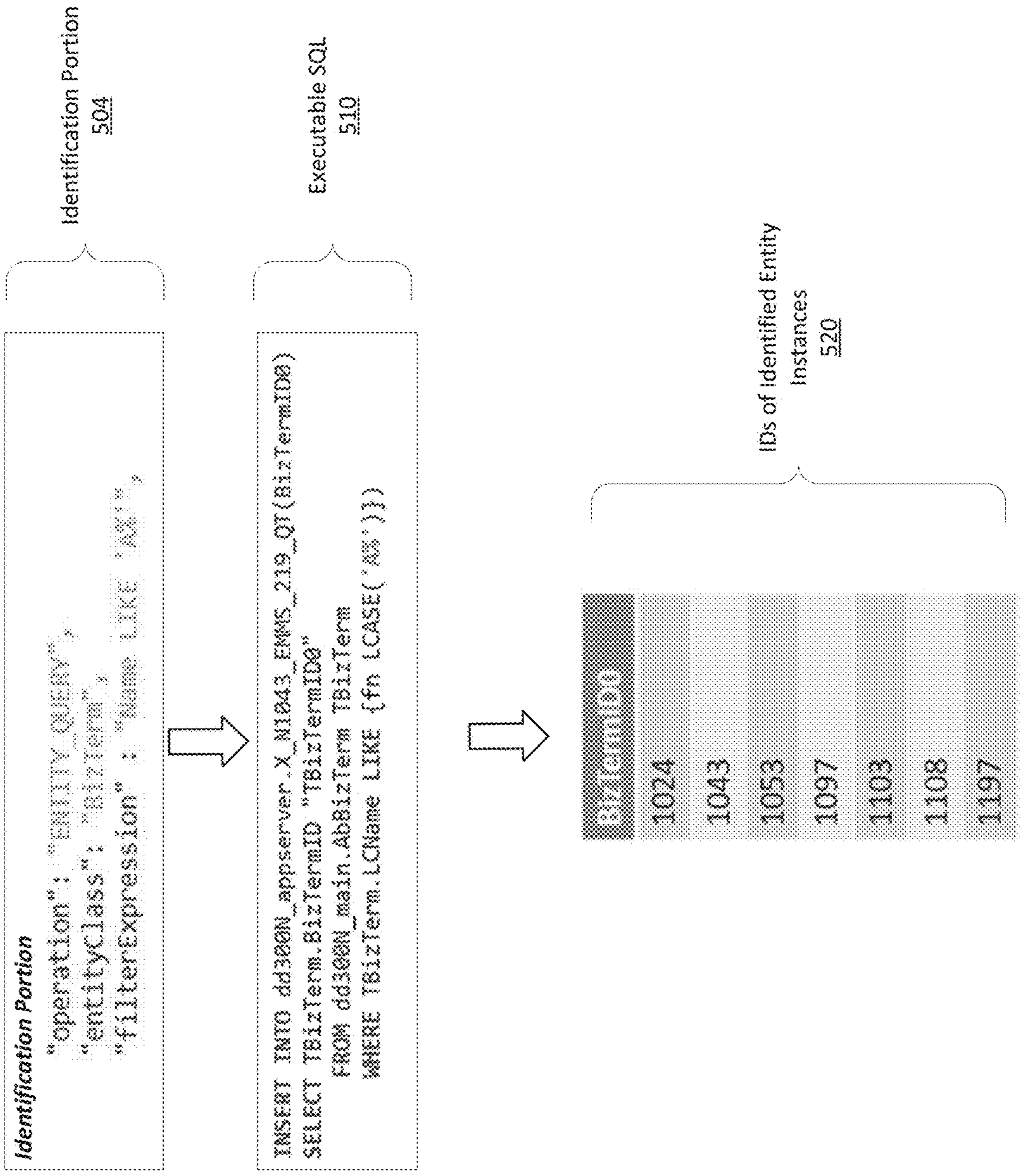
FIG. 5C is a diagram illustrating an identification portion of the declarative query 502 shown in FIG. 5A, an example of the executable SQL query that may be generated using the identification portion of the declarative query 502, and an illustration of at least a portion of the results that may be obtained by executing the executable SQL query, in accordance with some embodiments of the technology described herein.

Returning to the example of FIGS. 5A and 5B, and to provide further detail about this example, consider FIG. 5C that shows an illustrative example of an executable SQL query 510 generated using the identification portion 504 of declarative query 502. The executable SQL query 510 may be generated in any suitable way including, for example, as described herein including with reference to FIGS. 7A-7C. The executable SQL query 510 may be an executable database-specific SQL query for obtaining data from particular type of relational database. Results of executing this example query are shown in table 520, which shows identifiers (i.e., 1024, 1043, 1053, 1087, 1103, 1008, 1197) of the "BizTerm" data entity instances identified by processing the executable SQL query 510.

FIG. 5D shows an illustrative example of an executable SQL query 530 generated using the enrichment portion 506 of the declarative query 502 that, when executed obtains values of the "Name" and "Description" attributes for each of the "BizTerm" data entity instances identified using the executable query 510 and whose identifiers are shown in FIG. 5C. The resulting values are shown in table 532, which has a row for each data entity instance identifier and a column for each of these two attributes. In the executable SQL query 530, "Tqt.BizTermID0" refers to the "BizTerm" data entity instances obtained as a result of executing the SQL query 510 shown in FIG. 5C.

Although it is possible to use separate executable SQL queries 512 and 514 to obtain the values of the "Name" and "Description" attributes, in the example of FIG. 5D a single SQL query 530 is used because, in the example, the values of both of these attributes are stored in the same table. As described herein, including below with reference to FIGS. 6A-6F, in some embodiments where attribute values are stored in a same table (or there are other efficiencies to be garnered from using a single query rather than multiple queries to access the data), a single executable SQL query may be used to access the attribute values instead of multiple SQL queries. However, separate queries could be used as well; examples of such queries are shown in Tables 3 and 4 below.

TABLE 3

| Example executable SQL query 512 for obtaining values of the "Name" attribute for each of the "BizTerm" data entity instances whose identifiers are shown in FIG. 5C. |
|---|

```
SELECT TBizTerm.BizTermID "TBizTerm.BizTermID",
    TBizTerm.Name "TBizTerm.Name",
FROM dd300N_appserver.X_N1043_EMMS_219_QT Tqt
INNER JOIN dd300N_main.AbBizTerm TBizTerm
    ON TBizTerm.BizTermID = Tqt.BizTermID0;
```

TABLE 4

| Example executable SQL query 514 for obtaining values of the "Description" attribute for each of the "BizTerm" data entity instances whose identifiers are shown in FIG. 5C. |
|---|

```
SELECT TBizTerm.BizTermID "TBizTerm.BizTermID",
    TBizTerm.Description "TBizTerm.Description"
FROM dd300N_appserver.X_N1043_EMMS_219_QT Tqt
INNER JOIN dd300N_main.AbBizTerm TBizTerm
    ON TBizTerm.BizTermID = Tqt.BizTermID0;
```

Figure 5E:
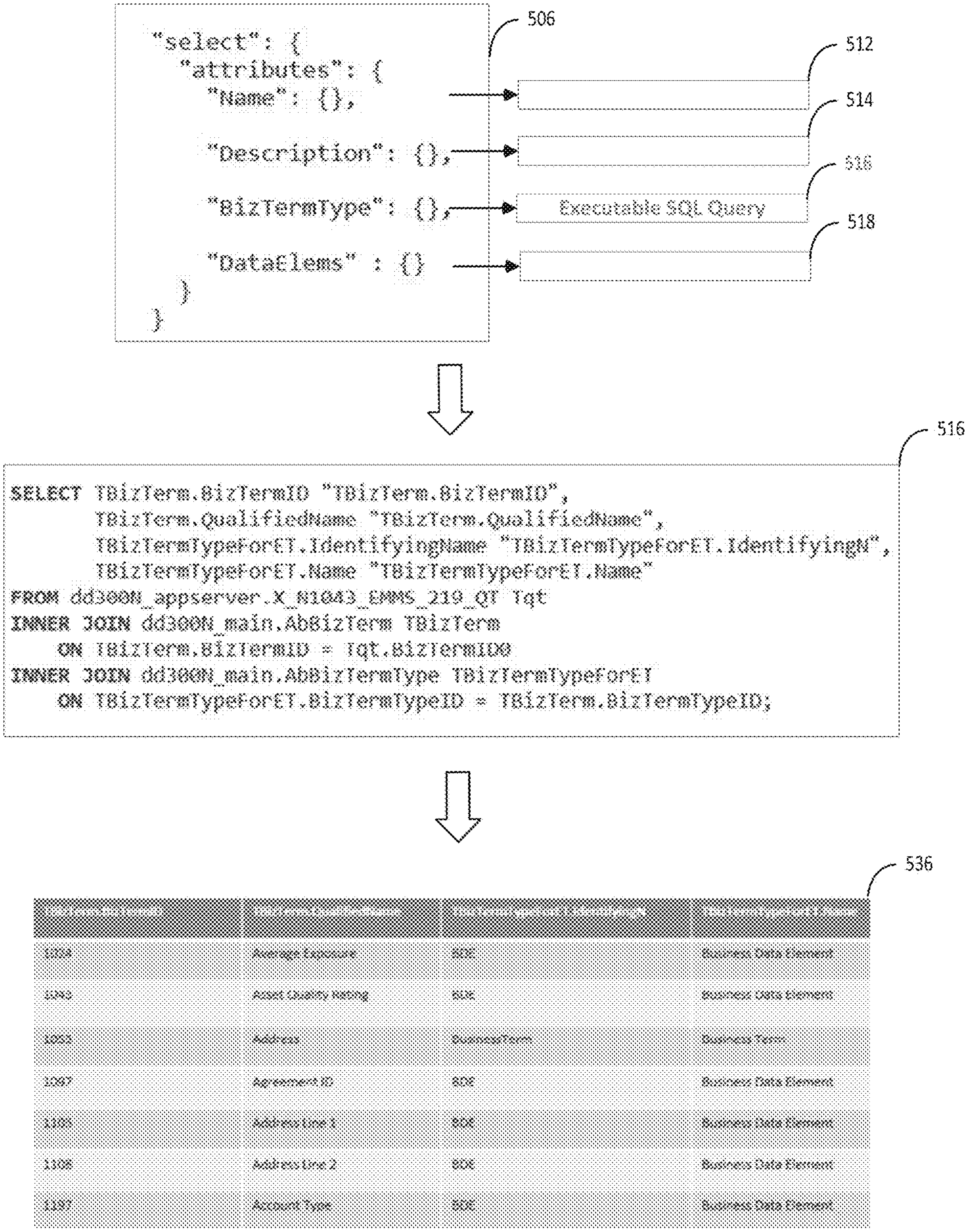
FIG. 5E is a diagram illustrating an enrichment portion of the declarative query 502 shown in FIG. 5A, an example of another executable SQL query that may be generated using the enrichment portion of the declarative query 502, and an illustration of at least a portion of the results that may be obtained by executing the executable SQL query, in accordance with some embodiments of the technology described herein.

FIG. 5E shows an illustrative example of an executable SQL query 516 generated using the enrichment portion 506 of the declarative query 502 that, when executed obtains values of the BizTermType attribute for each of the "BizTerm" data entity instances identified using the executable query 510 and whose identifiers are shown in FIG. 5C. The results of executing executable SQL query 516 are shown in table 536. Table 536 includes a row for each entity instance identifier shown in FIG. 5C. The BizTermType attribute refers to another data entity instance and values of at least some of its attributes are shown in the columns of table 536.

Figure 5F:
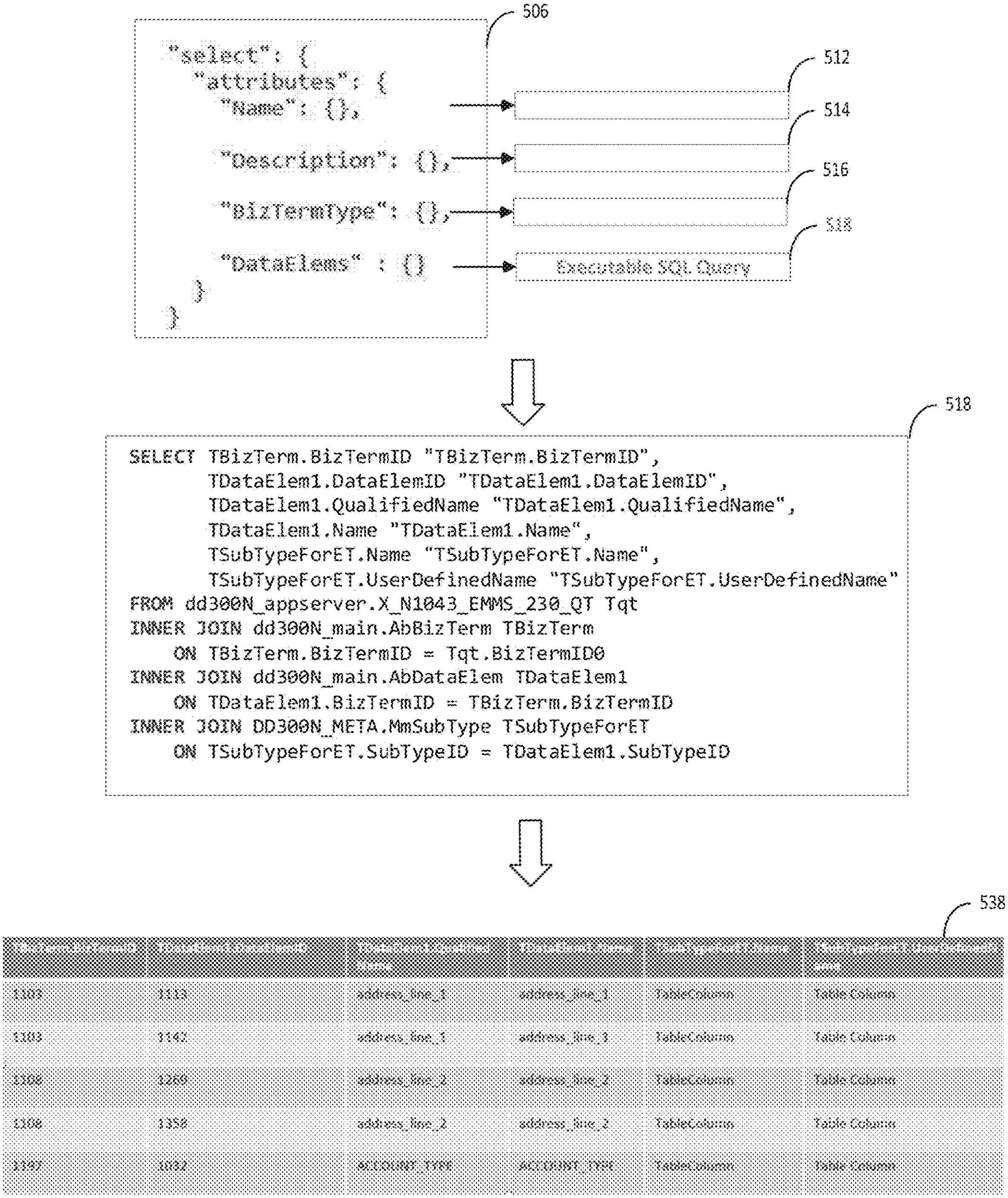
FIG. 5F is a diagram illustrating an enrichment portion of the declarative query 502 shown in FIG. 5A, an example of another executable SQL query that may be generated using the enrichment portion of the declarative query 502, and an illustration of at least a portion of the results that may be obtained by executing the executable SQL query, in accordance with some embodiments of the technology described herein.

FIG. 5F is shows an illustrative example of an executable SQL query 518 generated using the enrichment portion 506 of the declarative query 502 that, when executed, obtains values of the DataElems attribute for each of the "BizTerm" data entity instances identified using the executable query 510 and whose identifiers are shown in FIG. 5C. The results of executing executable query 518 are shown in table 538. Table 538 includes a row for each entity instance identifier shown in FIG. 5C. The DataElems attribute refers to another data entity instance and values of at least some of its attributes are shown in the columns of table 538.

As may be appreciated from the examples of FIGS. 5C-5F, in some embodiments, the data obtained as a result of processing the various executable SQL queries may be combined using the data entity instance identifiers 520, since each piece of data requested in the enrichment portion 506 is associated with a respective identifier indicating the data entity instance with which it is associated. The data could be combined in any suitable way. For example, the data can be combined into a single table. As another example, the data could be formatted for hierarchical presentation. As yet another example, the data can be written to a file or other database system in any suitable format, as aspects of the technology described herein are not limited in this respect.

Optimizing Execution of Enrichment Queries

Temp Tables and Common Table Expressions

In some embodiments, the results generated by executing identification and enrichment SQL queries may be combined using a table. For example, in some embodiments, the data entity instance identifiers (e.g., data instance identifiers 520 described above) obtained by executing an identification SQL query may be inserted into a temporary table, and then the temporary table may be joined with at least some (e.g., all) of the data obtained using the enrichment SQL queries. In turn, the data in the resulting table (after the joining) may be formatted in any suitable way and output in any of the ways described herein.

In some embodiments, where information about only a single data entity and its direct properties is being accessed (e.g., information about any other data entities being referenced by the single data entity is not being requested), a common table expression may be used to obtain the requested data instead of using separate identification and enrichment queries and joining the results using a temporary table. One example of such a common table expression is shown in Table 5 below.

TABLE 5

Executable SQL Query for Obtaining Information About Single Data Entity and Its Direct Properties

```
WITH qtCte(BizTermID0) AS
(
  SELECT TBizTerm.BizTermID BizTermID0
  FROM dd300N_main.AbBizTerm TBizTerm
  WHERE TBizTerm.LCName LIKE {fn LCASE('A %')}
)
SELECT TBizTerm.BizTermID "TBizTerm.BizTermID",
        TBizTerm.Name "TBizTerm.Name",
        TBizTerm.QualifiedName "TBizTerm.QualifiedName",
        TBizTermTypeForET.IdentifyingName
        "TBizTermTypeForET.IdentifyingN",
        TBizTermTypeForET.Name "TBizTermTypeForET.Name"
FROM qtCte TqtCte
INNER JOIN dd300N_main.AbBizTerm TBizTerm
     ON TBizTerm.BizTermID = TqtCte.BizTermID0
INNER JOIN dd300N_main.AbBizTermType TBizTermTypeForET
     ON TBizTermTypeForET.BizTermTypeID =
     TBizTerm.BizTermTypeID
```

Pivoting

As described above, after different executable SQL queries generated from the enrichment portion of declarative query are processed to obtain respective results, these results may be combined. Recall that different executable enrichment queries may be used to access values stored in different database tables. The conventional approach to accessing values stored in different tables and then combining their values is to: (1) join the tables within the database (e.g., by joining the tables using a SQL 'join' command) to obtain a joined table; and (2) read the desired portion of the joined table. However, the inventors recognized that such an approach would be extremely inefficient (in terms of processing and memory requirements) in the present context because data entity instances have many dynamic attributes, many of which are stored in different tables. As a result, processing many declarative queries would require joining tens (e.g., at least 10, at least 20, at least 30, between 10 and 50) tables every time a query is to be execute, which is extremely inefficient. As an example, it is not uncommon for a data entity to have at least dynamic 20 attributes, which would require performing at least as many joins if the values of the dynamic attributes were to be combined with the database storing the tables of dynamic attribute values.

An example of the complexity of performing pivoting using SQL is shown in Table 5 below. Table 5 includes SQL statements for accessing variables for multiple attributes (of type "Extended Attribute" in this example). Each attribute requires a left outer join, and so the SQL for only two such attributes is shown in Table 6 below. Generating and executing such code is extremely inefficient because it requires the construction of large intermediate tables within the database storing the attribute values. This takes significant time (therefore the query will take longer to execute) and consumes substantial amounts of memory.

TABLE 6

Illustrative example of pivoting in SQL.

```
SELECT ...
FROM dd300N_main.AbBizTerm Tqo0
LEFT OUTER JOIN (-- SubselectNumber=2
        SELECT T_ExtendedAttributeValue.ObjectClassID ObjectClassID,
T_ExtendedAttributeValue.ObjectID ObjectID,
             T_ExtendedAttributeValue.ExtendedAttributeValueID ID
        FROM dd300N_main.AbExtendedAttributeValue T_ExtendedAttributeValue
        INNER JOIN dd300N_main.AbExtendedAttribute TE
          ON TE.ExtendedAttributeID = T_ExtendedAttributeValue.ExtendedAttributeID
        WHERE TE.ExtendedAttributeID = 1004
             AND T_ExtendedAttributeValue.ObjectClassID = 55) T_DMPEID1
  ON T_DMPEID1.ObjectID = Tqo0.BizTermID
LEFT OUTER JOIN dd300N_main.AbExtendedAttributeValue T_DMPEVAL2
  ON T_DMPEVAL2.ExtendedAttributeValueID = T_DMPEID1.ID
LEFT OUTER JOIN (-- SubselectNumber=3
        SELECT T_ExtendedAttributeValue.ObjectClassID ObjectClassID,
T_ExtendedAttributeValue.ObjectID ObjectID,
             T_ExtendedAttributeValue.ExtendedAttributeValueID ID
        FROM dd300N_main.AbExtendedAttributeValue T_ExtendedAttributeValue
        INNER JOIN dd300N_main.AbExtendedAttribute TE
          ON TE.ExtendedAttributeID = T_ExtendedAttributeValue.Extended AttributeID
        WHERE TE.ExtendedAttributeID = 1001
             AND T_ExtendedAttributeValue.ObjectClassID = 55) T_DMPEID3
  ON T_DMPEID3.ObjectID = Tqo0.BizTermID
LEFT OUTER JOIN dd300N_main.AbExtendedAttributeValue T_DMPEVAL4
  ON T_DMPEVAL4.ExtendedAttributeValueID = T_DMPEID3.ID
...
<more joins>
....
INNER JOIN dd300N_main.AbBizTermType TBizTermType
     ON TBizTermType.BizTermTypeID = Tqo0.BizTermTypeID
```

On the other hand, processing the enrichment portion of a declarative query by generating and executing a number of different executable SQL queries for different attributes, allows for the attribute values to be combined after being accessed from the database(s) storing them. This avoids the need to perform pivot in SQL, for example by joining a large number of tables within the database in which the tables are stored.

Accordingly, in some embodiments, the attribute values obtained by processing different executable SQL enrichment queries may be combined by processing these data after they have been accessed from the database(s) in which they are persisted. In some embodiments, the combining may be performed by pivoting the data using software written in Java or any other programming language, and without invoking of any SQL statement (e.g., a SQL command for joining tables) for processing by the database system(s) from which the data were accessed. Simply put, the results may be combined external to any SQL processing that would have been performed within a database system using conventional methods. When accessing values of multiple dynamic variables, the results of each query include rows of name-value pairs, which can be turned into columns of a table storing attribute values for data entity instances.

Figure 5G:
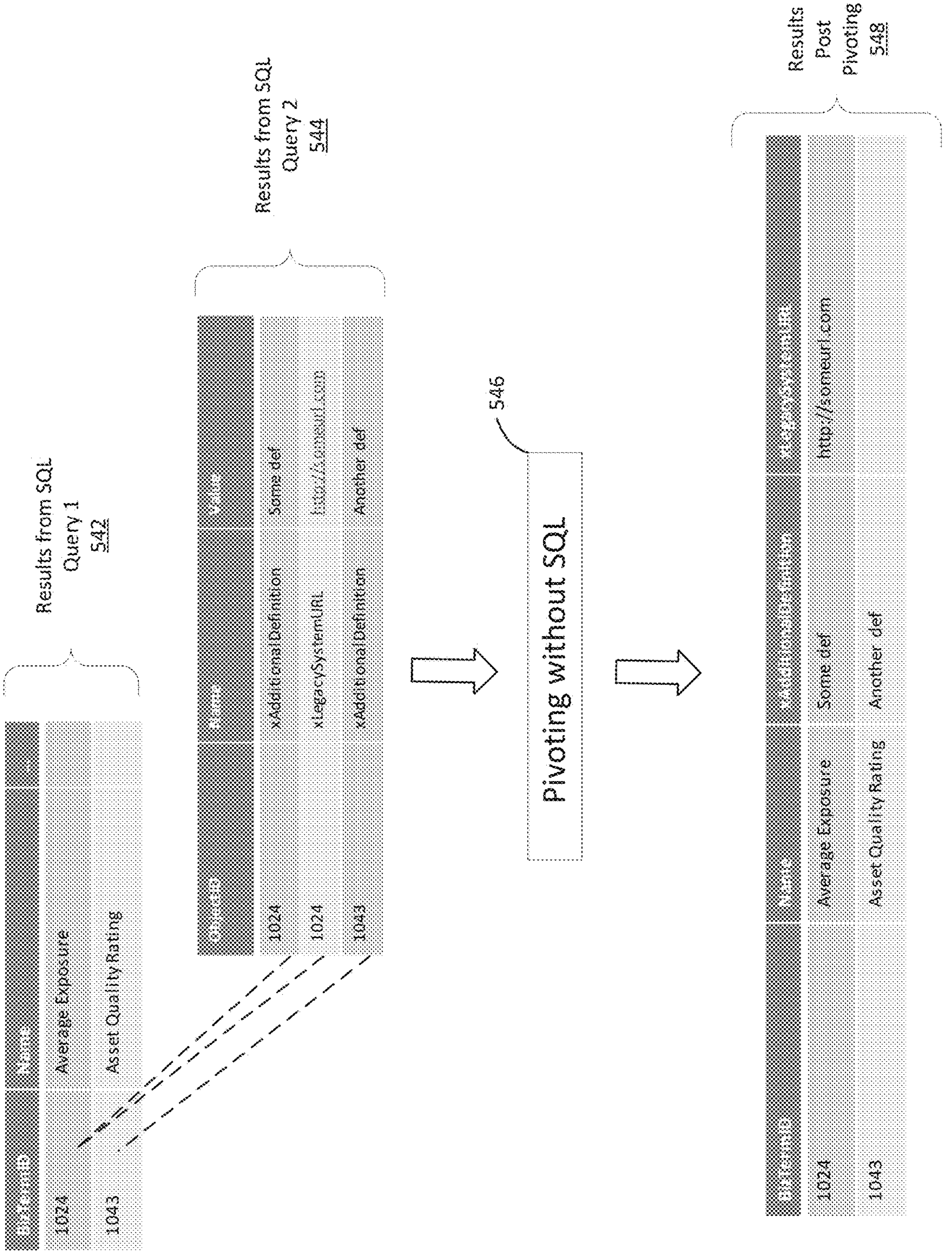
FIG. 5G is a diagram illustrating pivoting of SQL query results external to SQL, in accordance with some embodiments of the technology described herein.

FIG. 5G is a diagram illustrating pivoting of SQL query results without using SQL, in accordance with some embodiments of the technology described herein. As shown in FIG. 5G, the results 542 and 544 obtained from executing different enrichment queries may be combined by pivoting 546 using Java software or any other software program (but not a SQL command and without joining the tables storing the attributes) to obtain the results 548. In this example, the results obtained from each of the queries include many rows, which is turned by the Java software into a column of the entity instance as shown in results 548.

Accessing Attribute Values for Groups of Attributes

As described herein, the inventors have recognized that a declarative query may be processed more efficiently when fewer executable queries (e.g., executable SQL queries or any other suitable type of executable query) are used to obtain attribute values. For example, when certain attribute values are stored in a common table, it is more efficient to execute a single query against the database storing the table to retrieve the attribute values than it is to execute multiple queries against the same table. An example of this was described above with reference to FIG. 5C. Further examples are described below including with reference to FIGS. 6A-6F.

Figure 6A:
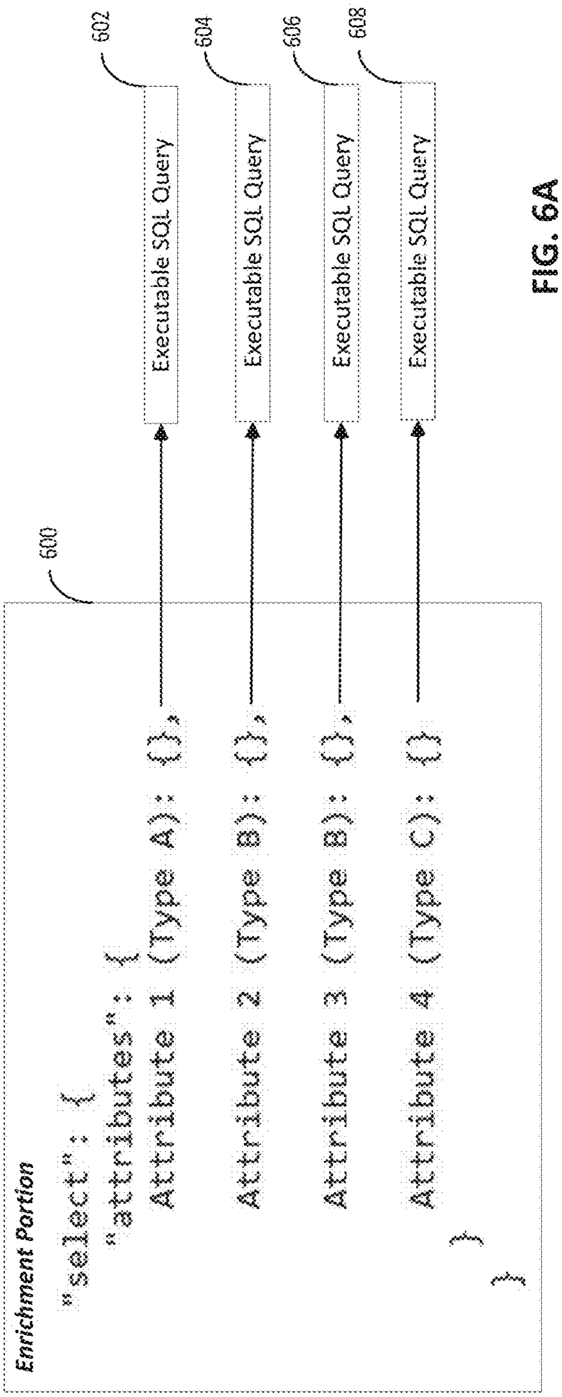
FIG. 6A is a diagram illustrating an enrichment portion of a declarative query and respective executable SQL queries generated for each of the attributes identified in the enrichment portion, in accordance with some embodiments of the technology described herein.
Figure 6B:
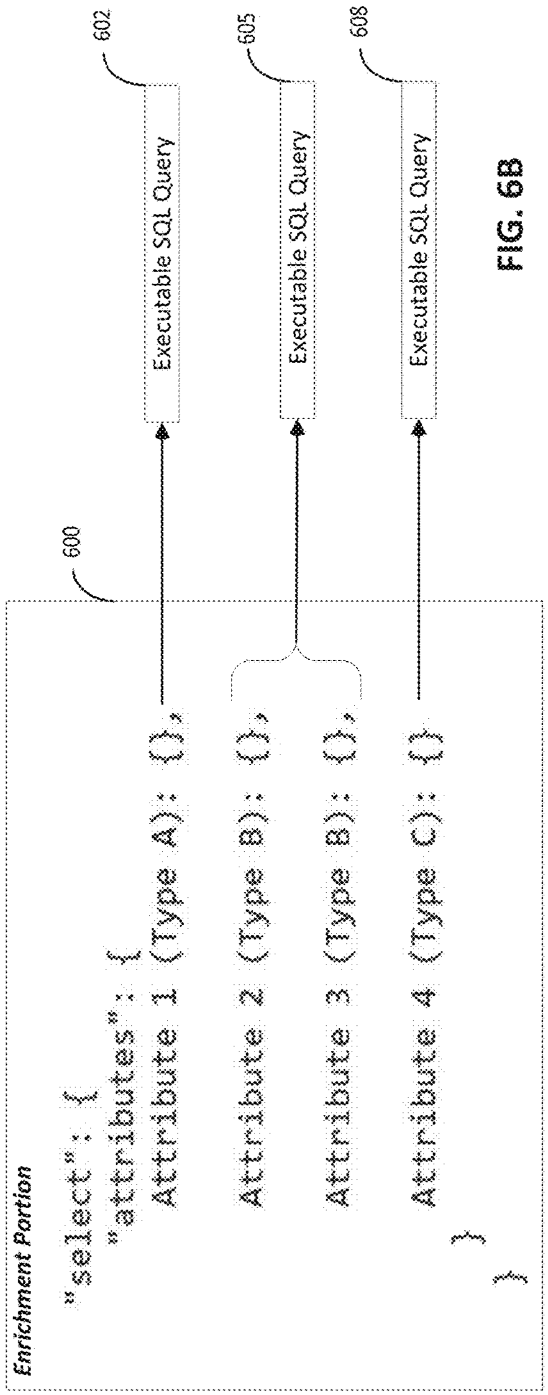
FIG. 6B is a diagram illustrating that one set of executable SQL queries may be generated for dynamic attributes having the same type, in accordance with some embodiments of the technology described herein.

FIGS. 6A and 6B both show an enrichment portion 600 of a declarative query. In this example, the enrichment portion is indicating that information about four attributes (Attributes #1-4) be retrieved. FIG. 6A shows that respective executable SQL queries are generated for each of the four attributes. In particular, executable SQL queries 602, 604, 606, and 608 are generated to obtain values of the attributes 1, 2, 3, and 4, respectively. However, in this example, attributes 2 and 3 are of the same type (Type B), which means that it may be more efficient to access these attributes using a single query rather than multiple queries, for example, because values for these attributes are stored in the same underlying table. For example, the attributes 2 and 3 may be both of type "Extended Attribute" or "Classification". These two attribute types and other attribute types are described herein, including with reference to FIGS. 2A-2B. As shown in FIG. 6B, a single executable SQL query 605 may be generated for obtaining values for the attributes 2 and 3 and used instead of separate executable SQL queries 604 and 606.

Accordingly, in some embodiments, processing an enrichment portion of a declarative query to generate executable SQL queries to obtain information about attributes identified in the enrichment portion comprises: (1) grouping attributes in the enrichment portion into groups; and (2) generating a respective executable query for each of the multiple groups.

In some embodiments, attributes having the same type may be grouped into a common group. For example, in some embodiments, dynamic attributes (identified in an enrichment portion) of type "Extended Attribute" may be grouped and a single executable SQL query may be generated for obtaining information for the attributes in this group. As another example, in some embodiments, dynamic attributes (identified in an enrichment portion) of type "Classifications" may be grouped and a single executable SQL query may be generated for obtaining information for the attributes in this group. As another example, in some embodiments, dynamic attributes (identified in an enrichment portion) of type "Hierarchy" may be grouped and a single executable SQL query may be generated for obtaining information for the attributes in this group. As yet another example, in some embodiments, dynamic attributes (identified in an enrichment portion) of type "Accountable Parties" may be grouped and a single executable SQL query may be generated for obtaining information for the attributes in this group.

Figures 1, 6C:
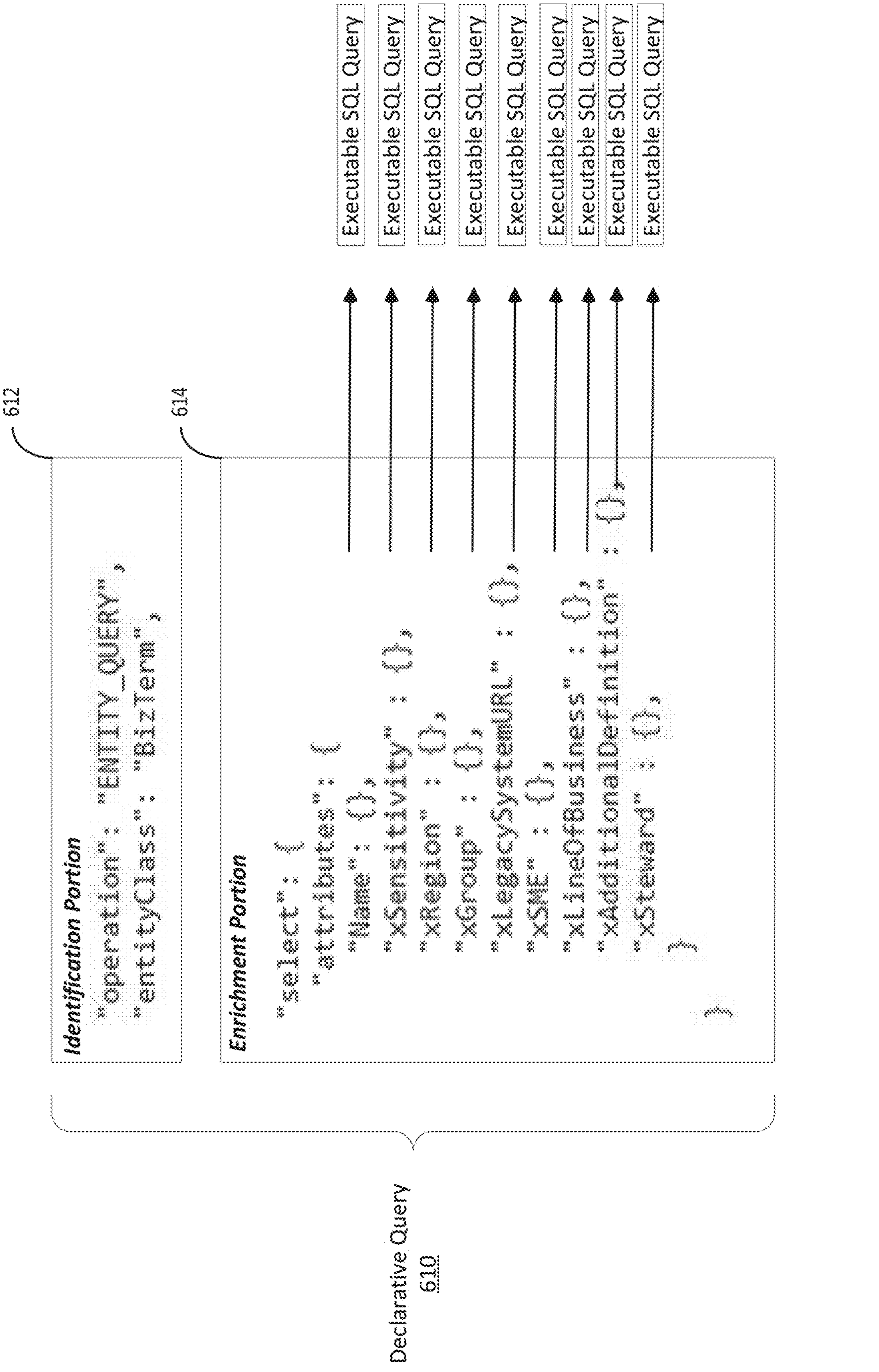

For example, as shown in FIG. 6C-1, the declarative query 610 includes identification portion 612 and enrichment portion 614, which indicates that information about various types of attributes is to be accessed including information about the "Name" static attribute 620 and the dynamic attributes: "xSensitivity", "xGroup", "xRegion", "xLineOfBusiness", "xAdditionalDetinition", "xLegacySystemURL", "xSME" and "xSteward". Although some of these dynamic attributes are of a same type, FIG. 6C-1 shows that a single executable SQL query is generated for each of the dynamic attributes.

Figures 2, 6C:
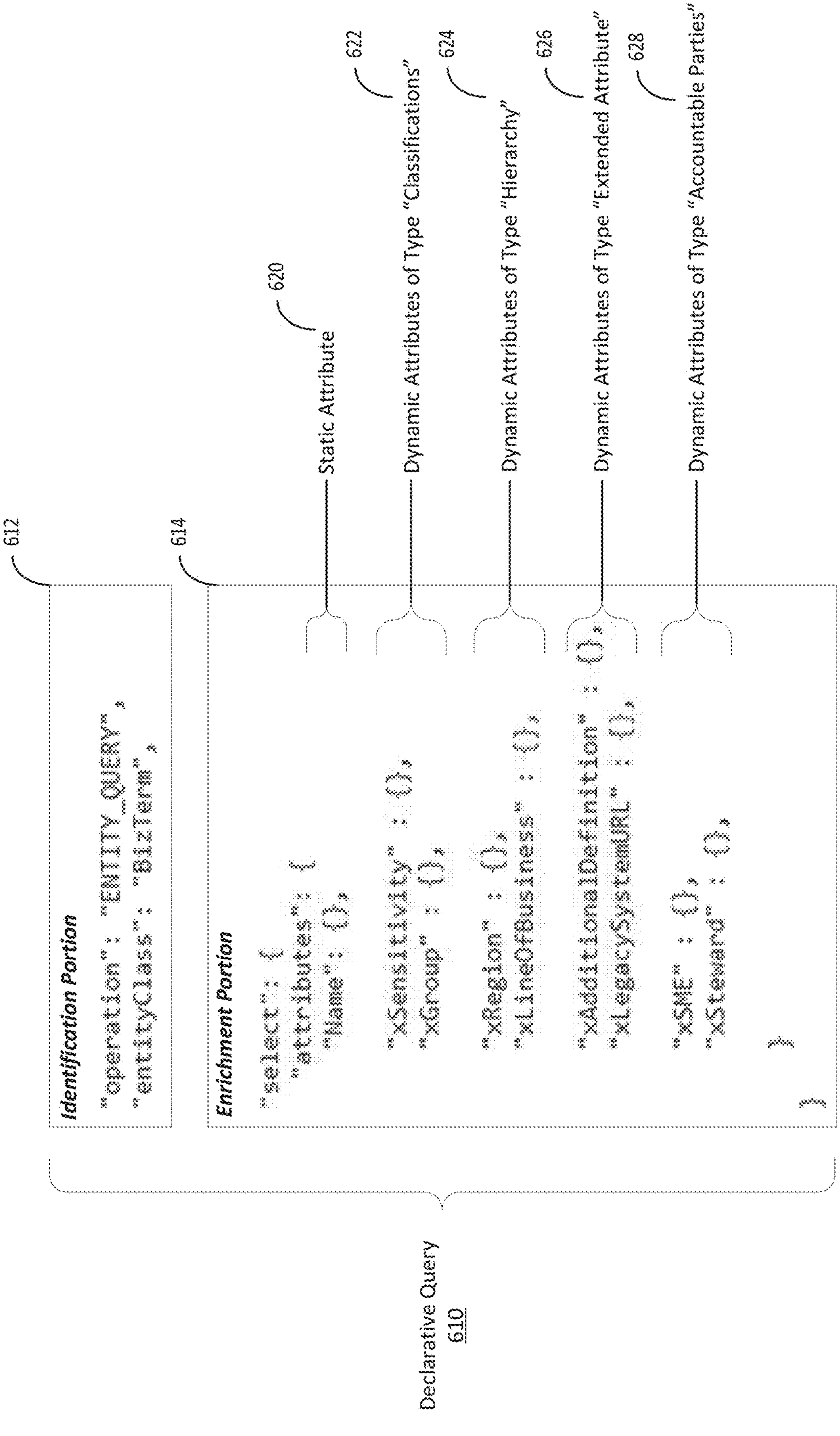
Figures 3, 6C:
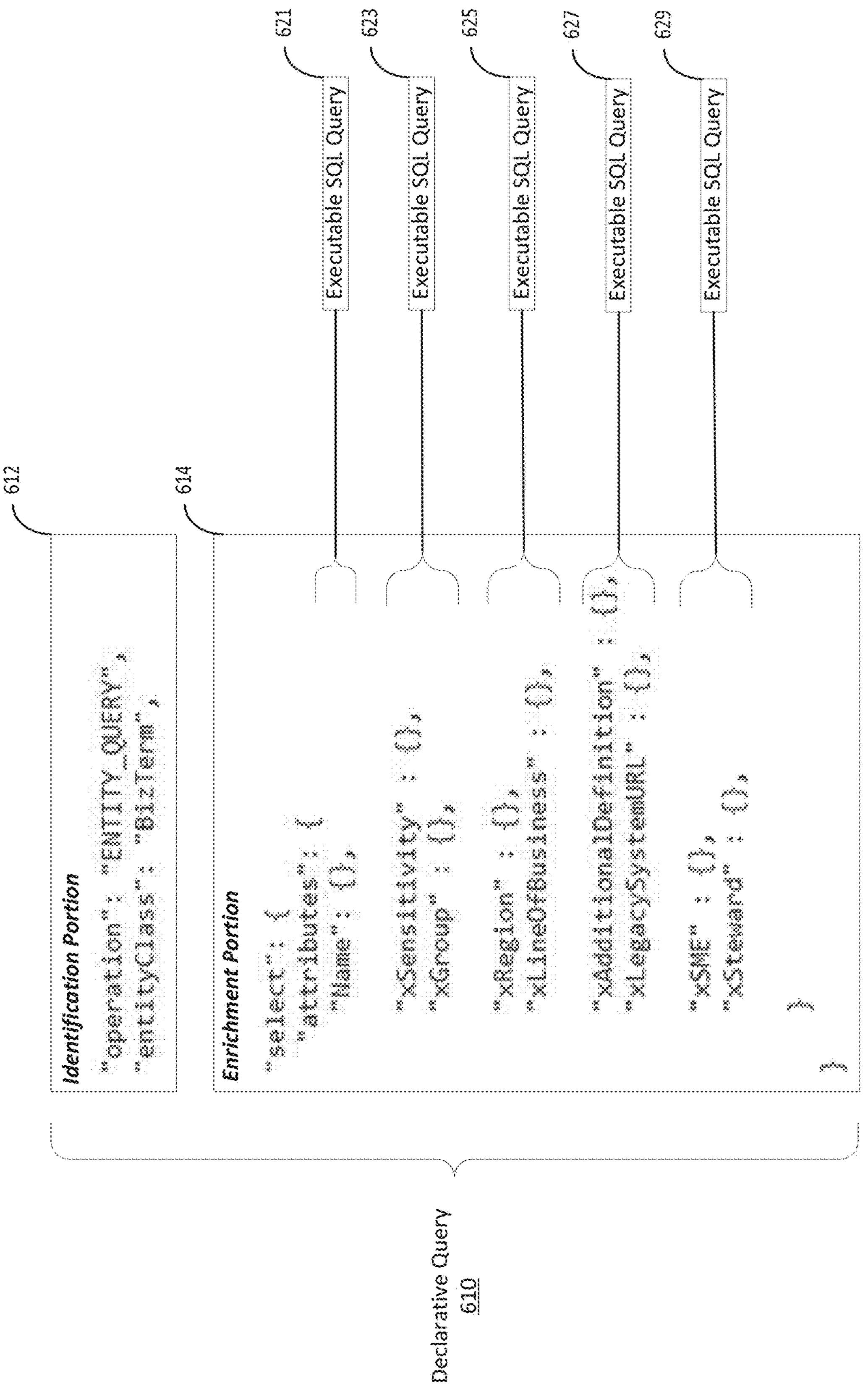

However, in some embodiments, the data processing system may determine that some of these dynamic attributes are of a same type. For example, as shown in FIG. 6C-2, the data processing system may determine that the attributes "xSensitivity" and "xGroup" have the type "Classifications" and may be grouped in group 622, the attributes "xRegion" and "xLineofBusiness" are of type "Hierarchy" and may be grouped in group 624, the attributes "xAdditionalDefinition" and "xLegacySystemURL" are of type "Extended Attribute" and may be grouped in group 626, and the attributes "xSME" and "xSteward" are of type "Accountable Parties" and may be grouped in group 628. In turn, a single executable SQL query may be generated for each group of dynamic attributes having the same type. A single executable SQL query may be generated for all the static attributes (here there is only one static attribute "Name" in the group 620).

Thus, as shown in FIG. 6C-3: (1) a single executable SQL query 623 may be generated for group 622 of attributes of type "Classifications", which group includes the "xSensitivity" and "xGroup" dynamic attributes: (2) a single executable SQL query 625 may be generated for group 624 of attributes of type "Hierarchy", which group includes the "xRegion" and "xLineOfBusiness" dynamic attributes; (3) a single executable SQL query 627 may be generated for group 626 of attributes of type "Extended Attribute", which group includes the "xAdditionalDefinition" and "xLegacySystemURL" dynamic attributes; and (4) a single executable SQL query 629 may be generated for group 628 of attributes of type "Accountable Parties", which group includes the "xSME" and "xSteward" dynamic attributes. In addition, a single executable SQL query 621 is generated for group 621 of static attributes.

By way of example, FIG. 6D shows an illustrative single executable SQL query 630 for obtaining the information about the "xRegion" and "xLineOfBusiness" hierarchies—both hierarchies are represented by respective identifiers 632 and 634 (hierarchy IDs) as shown in FIG. 6D, which demonstrates that information about both of these dynamic attributes are retrieved using the same executable SQL query.

As another example, in some embodiments, attributes whose values are stored in a same table may be grouped into a common group and a single executable SQL query may be generated for obtaining for the attributes in this group. As another example, in some embodiments, attributes whose values are stored on a same device and/or same computer-readable storage medium may be grouped into a common group and a single executable SQL query may be generated for obtaining for the attributes in this group.

As yet another example, in some embodiments, dynamic variables sharing a common inheritance path may be grouped together. This is described in more detail next with reference to FIGS. 6E and 6F.

Figure 6E:
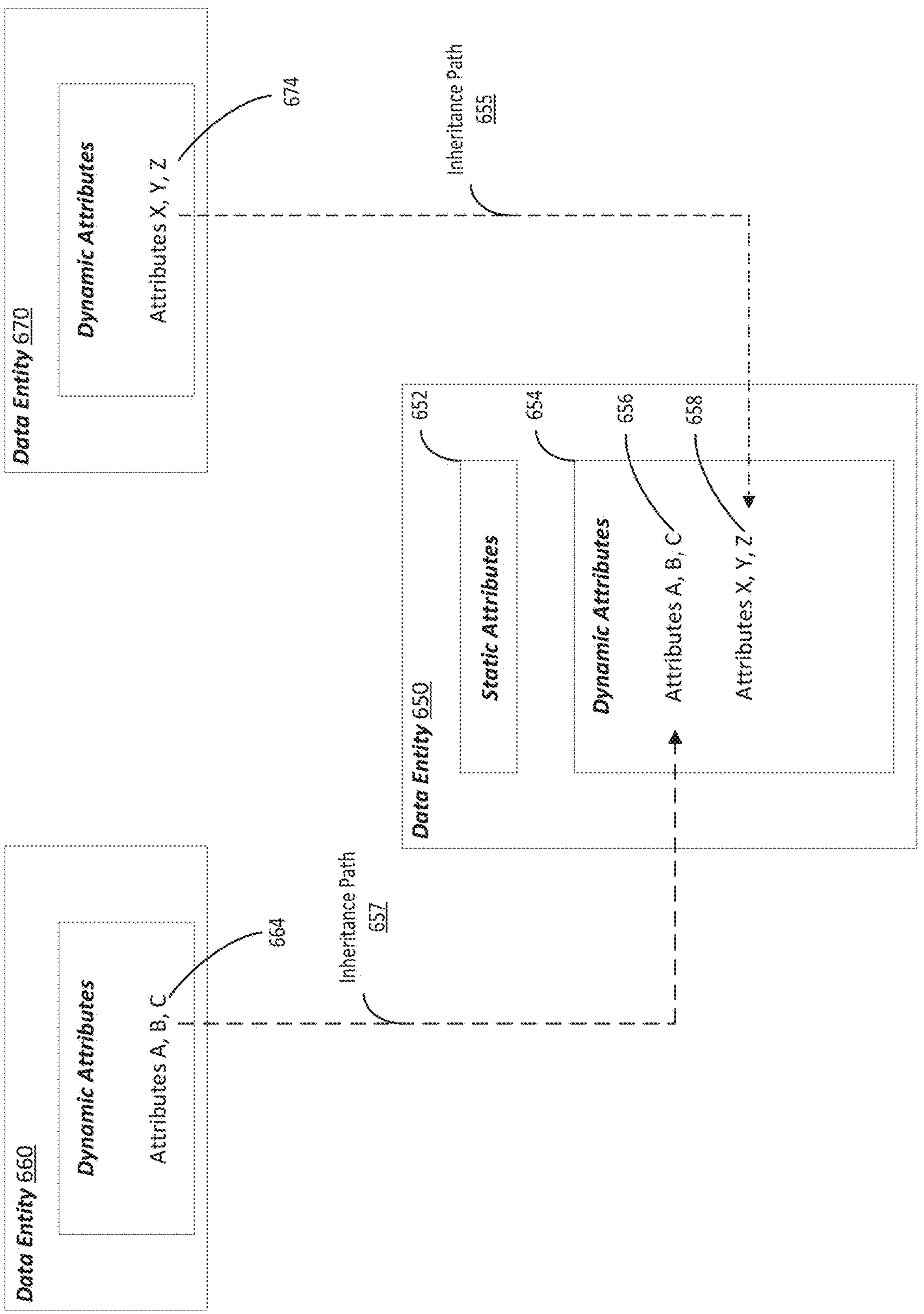
FIG. 6E is a diagram illustrating that different dynamic attributes of a data entity may inherit their values from respective attributes of different data entities, in accordance with some embodiments of the technology described herein.

In some embodiments, a data entity's dynamic attribute may inherit its value from a corresponding attribute of another data entity. For example, as shown in FIG. 6E, Data Entity 650 may include static attributes 652 and dynamic attributes 654. Among the dynamic attributes 654, attributes "A, B, C" 656 are configured to inherit their values from corresponding dynamic attributes 664 of data entity 660, as indicated by a common inheritance path 657. That is, attributes of a data entity or data entity instance share a common inheritance path when the attributes are configured to inherit their values from attributes of the same other data entity or data entity instance. Attributes "X", "Y", "Z" 658 are configured to inherit their values for corresponding dynamic attributes 674 of data entity 670. Thus, in response to a query for the values of the dynamic attributes 654 of data entity 650, the values of attributes 664 and of attributes 674 need to be obtained. Since variables A, B, and C are inherited along a common inheritance path 657 (e.g., from the same data entity 660)), a single executable SQL query may be used to access the inherited values for these variables. Query 682 in FIG. 6F is an example of such a query. Similarly, since variables X, Y, and Z are inherited along a common inheritance path (e.g., from the same data entity 670), a single executable SQL query may be used to access the inherited values for these variables. Query 684 in FIG. 6F is an example of such a query.

Batch and Streaming Query Execution, Limiting Extent of Results Returned

As described herein, the number of data entity instances returned in response to processing a declarative query may be large. For example, the number of data entity instances that may be returned in response to processing a declarative query may be at least 100 entity instances, at least 500 entity instances, at least 1000 entity instances, at least 5,000 entity instances, at least 10,000 entity instances, at least 25,000 entity instances, at least 50,000 entity instances, at least 100,000 entity instances, at least 250,000 entity instances, between 1,000 and 10,000 entity instances, between 5,000 and 1 million entity instance, or any other suitable range within these ranges. Generating and outputting results for such large numbers of data entity instances together with values of their attributes places a significant computational burden on the data processing system—a significant amount of data has to be retrieved from one or multiple data stores and processed prior to being output.

The inventors have recognized that it may be helpful to limit the processing performed by a data processing system when processing a declarative query because, in some situations, without any such limitation, the number of data entity instances returned by the data processing system is large, which results in a computational burden on the data processing system that substantially taxes its processor, memory, and/or network resources. Such functionality may be especially important when the computer program or user inputs a declarative query for processing without realizing that so much data is to be returned and/or without actually needing to use the entirety of the results.

Accordingly, the entity API provides multiple mechanisms for limiting the amount of processing performed by the data processing system when processing a declarative query. One such mechanism is that a declarative query may expressly specify a numeric limit on the number of overall results to be returned. This limit may be set globally, or locally with respect to a particular portion of a declarative query. An example of setting a global limit on the total number of data entity instances returned is shown in FIG. 4C, where in line 414 the total number of data instances to be returned is limited to 5,000).

As another example, in some embodiments, the results may be hierarchical having multiple levels, and the declarative query may specify that the number of data entity instances returned at each level in the hierarchy be limited to a threshold number of results. For example, the declarative query shown in Table 7 below indicates that no more than two data entity instances are to be returned at each level of the query.

TABLE 7

Declarative query specifying limit on number of entity instances returned at each level of hierarchical results.

```
[{
  "operation": "ENTITY_QUERY",
  "entityClass": "BizTerm",
  "globalOptions": {
    "defaultMaxRows": 2
  }
}]
```

Table 8 shows results of processing the declarative query of Table 7. Note the results include only two data entity instances and also indicate that more results are available (because the "exceededMaxRows" indicator is set to "true").

TABLE 8

Results of processing the declarative query shown in Table 7.

```
[{
"entityInstances": [
  {
    "entityInstanceID": {
      "entityClass":
      "BizTerm",
      "identifyingName": "Security/CQR
      Derived", "displayName": "CQR
      Derived", "entityType": "BDE",
      "compositeID": "54.1001"
    }
  },
```

TABLE 8-continued

Results of processing the declarative query shown in Table 7.

```
{
  "entityInstanceID": {
    "entityClass": "BizTerm",
    "identifyingName":
    "Facility ID",
    "displayName": "Facility
    ID", "entityType": "BDE",
    "compositeID": "54.1002"
  }}],
  "exceededMaxRows": true
}]
```

In some embodiments, when the declarative query is hierarchical, different numerical limits may be specified at different levels of the hierarchy in the declarative query, for example, as shown in Table 9 below. The results of processing such a declarative query may indicate whether the data entity instance limit was hit at each level of the hierarchy (e.g., at an attribute level).

TABLE 9

Declarative query specifying numerical limits at different levels within the query.

```
[{
"operation": "ENTITY_QUERY",
"entityClass": "DataSet",
"select": {
  "maxRows": 4,
  "attributes" : {
    "DataElems" : {
      "select" : {
        "maxRows": 3;
}}}}}]
```

The inventors have recognized that processing a declarative query such as the one shown in Table 9 above may result in unbalanced results, because by selecting a collection attribute (e.g., a collection of DataElems entities) and specifying a value for the "maxRows" option at that (child) level, each parent instance (starting with the first) is filled completely with child instances before the next parent instance is processed. Once the value for "maxRows" option for the child level is met, no more child instances are included in the response. For example, suppose that there are three DataSet instances that may identified by processing the declarative query in Table 9, and that the first DataSet instance would include three DataElems, the second DataSet instance would include one DataElem, and the third DataSet instance would also include one DataElem. In this case, the results would include three DataElem instances for the first DataSet instance, which would exhaust the number of allowed rows for the DataElem level (as set by the "maxRows=3" option). As a result, no DataElem instances would be returned for second and third DataSet instances.

To distribute the child instances more evenly across parent instances, the entity API allows for the specifying the number of child rows per instance of a parent. As shown in the example of Table 10, the "collectionMaxRows" option may be used to limit the number of child rows per parent instance, while the overall row limit still applies. Results generated by processing the declarative query shown in Table 10 would include one instance of the DataElem entity for each of the DataSet instance entity.

TABLE 10

Declarative query limiting the number of child rows per parent instance.

```
{
"operation": "ENTITY_QUERY",
"entityClass": "DataSet",
"select": {
  "maxRows" : 3,
  "attributes" : {
    "DataElems" : {
      "select" : {
        "maxRows": 3,
        "collectionMaxRows" : 1
}}}}}
```

Another mechanism for limiting the amount of processing performed by the data processing system when processing a declarative query is that, in some embodiments, the declarative query may be processed in a "streaming" or "staged" approach rather than in the "batch" approach. In the batch approach, all data entity instances identified by processing the identification portion of the declarative query may be enriched with their attribute values and returned, which, as discussed above, may place a significant computational burden on the data processing system when the number of identified data entity instances is large. By contrast, in some embodiments, the declarative query may be processed using a streaming approach whereby the identification portion of the declarative query may be used to identify data entity instances of interest (e.g., 5,000 data entity instances), but these instances may be enriched and output in stages (e.g., in groups of 500) to: (1) reduce data processing system processing requirements at each stage; and (2) provide an opportunity to cancel, after completion of one or more stages, execution of one or more subsequent stages when results from those stages are not requested or not needed. In some embodiments, after returning one set of results in the streaming approach, the next set of results would not be determined and/or returned until after the requester (e.g., user or computer software submitting the declarative query and receiving the results) provides input indicating that additional results are requested.

As one non-limiting example, suppose that processing a declarative query would result in identifying a large number of data entity instances. The processing of such a declarative query may be performed as follows: (1) generating an executable (e.g., SQL) query using the identification portion of the declarative query and executing it to identify the data entity instances of interest (e.g., 5000 data entity instances); (2) generating, for a first subset of the identified data entity instances (e.g., the first 500 data entity instances), one or more executable queries to obtain attribute values for the instances in the subset and executing the generated queries to obtain the attribute values; (3) combining the results of the queries and outputting them (e.g., outputting results for the first 500 of the data entity instances), optionally along with an indication that additional results are available; (4) receiving an indication (e.g., from a user or from computer software that submitted the declarative query) requesting additional results; (5) generating, for a second subset of the identified data entity instances (e.g., the data entity instances 501-1000), one or more executable queries to obtain attribute values for the instances in the second subset and executing the generated queries to obtain the attribute values: (3) combining the results of the queries and outputting them (e.g., outputting results for the data entity instances 501-1000), optionally along with an indication that additional results are available. And so on until either no additional results are requested or no additional results are available.

In some embodiments, the number of results returned at each stage may be set by a configurable parameter, either globally for the entity API as a whole, or locally for (e.g., within) a particular declarative query.

Such a streaming architecture for obtaining and returning results in stages is enabled, in part, by the structure of the declarative queries that the entity API processes. In particular, having an identification portion of the declarative query processed separate and apart from the enrichment portion of the declarative query, enables data entity instances to be identified first by generating and executing one set of one or more "identification" queries and for their values to be retrieved in stages (by generating and executing one or more "enrichment queries) based on whether additional results are requested and/or needed.

Retrieving Data Using Search Index or Indices

In some embodiments, processing of the declarative queries described herein may be expedited through the use of one or more search indices. In particular, in some embodiments, the data processing system configured may be configured to maintain one or more search indices so that users of the data processing system and/or computer programs interfacing with the data processing system may input text search strings to find data of interest (e.g., data entity instances, data entity definitions, etc.).

In some embodiments, such a search index or indices may be maintained by the data processing system (e.g., data processing system 105) external to the database system (e.g., an RDBMS like ORACLE. SQL SERVER, DB2, MONGODB, POSTGRES, etc.) storing the data entity instances. In this way, once the search index or indices are built by querying the database system, the data processing system may use the search index or indices to retrieve the desired data entity instances (and their attribute values) without processing the same queries again, resulting in significant computational savings and faster retrieval of results. Thus, the search index or indices described herein are different from any search indices internal to the database system storing the data entity instances. Moreover, unlike internal search indices, the search index or indices described herein are text search indices that help a user input text search strings to find data of interest.

As one example, a user may provide as input the search string "birthday" and the data processing system may be configured to return, using a search index, data such as: (1) instances of the data entity "BizTerm" with the string "birthday" being at least a part of one of its attribute values (e.g., the "Name" or "Description" attribute); (2) instances of the data entity "DataElem" with the string "birthday" being at least a part of one of its attribute values; and (3) instances of the data entity "DataSet" that refer to birthdays (e.g., in the value of one of its attributes).

In some embodiments, such a search index may be used to facilitate and expedite the processing of a declarative query. For example, in some embodiments, the identification portion of a declarative query may specify a search string (e.g., "birthday") for identifying any data entity instances that refer to "birthday" and the search index may be used to identify any such data entity instances instead of generating an executable (e.g., SQL) query and executing it against one more databases. The data entity instances retrieved using the search index may then be enriched using techniques described herein (e.g., by generating one or multiple executable queries for enrichment). In this way, by using a search index instead of executing a database query, processing of the identification portion of the declarative query may be significantly sped up, decreasing the overall processing time, and reducing the amount of computational resources (e.g., processor, memory, network resources) utilized.

An example of a declarative query having an identification portion that can be processed by using a search index is shown in Table 11. This example declarative query specifies the search string "birthday" using the "entitySearch" option, and the query overall is to identify any data entity instances that contain the search string "birthday", and to enrich the results with values for the "Name" and "Description" attributes. Note that this query is global in the sense that it searches instances of different types of data entities (e.g., "BizTerm", "DataSet", "DataElem", etc.) rather than searching through instances of only one type of data entity. Though if only one type of data entity was of interest (e.g., "BizTerm") the query could be made more specific in this regard by adding the option "entityClass": "BizTerm" as in the other examples described herein.

TABLE 11

Declarative query with identification portion specifying a search string to be processed by using a search index instead of an executable query.

```
[{
"operation": "ENTITY_QUERY",
"entitySearch": "birthday",
"select": {
  "attributes": {
    "Name": { },
    "Description": { }
}}}]
```

The example declarative query shown in Table 11 may be processed by: (1) identifying one or more data entity instances of interest using one or more search indices; (2) storing the results in a temporary table; and (3) enriching the results by generating one or more executable queries to obtain the values of the attributes "Name" and "Description". In some embodiments, the first step may involve taking into account a requested view type and/or user permissions prior to returning the data. The third step may be performed in any of the ways described herein for obtaining values of dynamic attributes.

Of course, the search index used to identify the data entity instances has to be created prior to being used to process such a declarative query. The search index may be created in any suitable way. For example, in some embodiments, the data processing system may be configured to use any suitable search engine software library such as, for example, APACHE LUCENE. The data processing system may be configured to use this library to generate the search index. In some embodiments, the data processing system may be configured to update the search index (e.g., periodically, according to a predefined schedule, etc.). In some embodiments, the data processing system may be configured to generate one or multiple search engine indices and the index or indices may be used to process declarative queries, as aspects of the technology described herein are not limited by the number of search indices utilized.

In some embodiments, in order to create one or more search indices using search software (e.g., APACHE LUCENE), the search software needs to be configured with information indicating which data entities and attributes are to be indexed for search. This allows the processing of a declarative query to be optimized even further by using the search index to retrieve the values of the indexed attributes instead of executing database queries (e.g., SQL queries) in order to retrieve these values. For example, if a data entity has three attributes (e.g., "Name", "Description", "Line of Business") two of which (e.g., "Name" and "Description") are indexed for search, then the search index may be used to retrieve values of these two attributes when processing a declarative query for instances of this data entity instead of generating and executing SQL or other types of executable queries against a database, which would result in a significant speed-up. The values of the third attribute could still be retrieved, for example, by querying a relational database using a SQL query.

As noted with respect to the example declarative query of Table 11, that declarative query searches all different types of data entities within the data processing system. Thus, the results may include instances of different types of data entities (e.g., instances of different entity classes) such as instances of the "BizTerm" data entity and instances of the "DataElem" data entity. Different data entities may have some attributes in common (e.g., "Name"), but generally different data entities have different attributes. To allow for enrichment in this context, a declarative query may allow to explicitly assert the entity classes of data entities in the response (using the "entityClassSelect" notation shown in Table 12 below) and to then enrich it with attributes specific to that entity class. An example of this is shown in the declarative query of Table 12 below, where the identification portion indicates any data entity instances that refer to "birthday" are to be retrieved, but that after these data entity instances are identified to obtain: (1) values of the attributes "Name", "Description" and "BizTermGroup" for any identified instances of the data entity "BizTerm"; (2) values of the attributes "Name", "Description" and "DataSet" for any identified instances of the data entity "DataElem"; and (3) values of the attributes "Name", "Description," and "TechGroup."

TABLE 12

Declarative query with generic weak references

```
[{
  "operation": "ENTITY_QUERY",
  "entitySearch": "birthday",
  "entityClassSelect": {
    "BizTerm" : {
      "attributes": {
        "Name": { },
        "Description": { },
        "BizTermGroup": { }
    },
    "DataElem": {
      "attributes": {
        "Name": { },
        "Description": { },
        "DataSet": { }
      }
    },
    "DataSet": {
      "attributes": {
        "Name": { },
        "Description": { },
        "TechGroup": { }
      }
    }
}}}]
```

Generating Executable Queries

Preferred aspects of generating executable queries from a declarative query are further described in this section and can be combined with each other and with what is described above. As described herein, the identification portion of a declarative query may be used to generate an executable query (e.g., an executable SQL query) to identify data entity instances of interest. Similarly, the enrichment portion of a declarative query may be used to generate one or multiple executable queries (e.g., one or more executable SQL queries) to obtain values of attributes of interest.

Figure 7A:
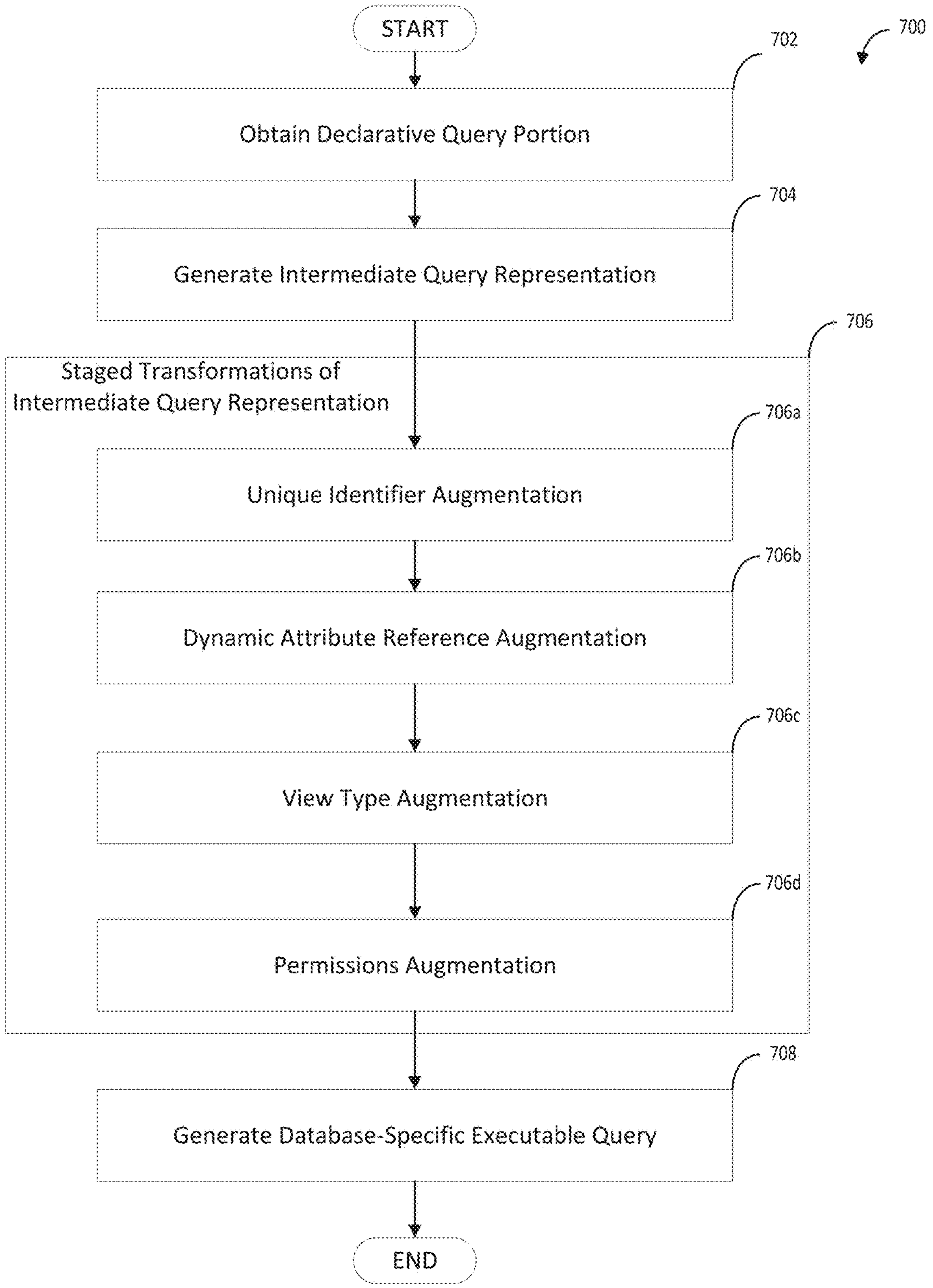
FIG. 7A is a flowchart of an illustrative process 700 for generating one or more database-specific executable SQL queries from at least a portion of a declarative query, in accordance with some embodiments of the technology described herein.

The executable identification and enrichment queries may be generated in accordance with the process 700 shown in FIG. 7A. The process 700 may be used to generate an executable query to identify data entity instances of interest using information specified in the identification portion of a declarative query. For example, the process 700 may be used to generate executable SQL query 510 using the information specified in identification portion 504 of declarative query 502.

The process 700 may be used to generate an executable query to obtain values of attributes of interest using information specified in the enrichment portion of a declarative query. Since an enrichment portion may be used to generate multiple executable queries (e.g., for different attributes or for different groups of attributes, which groups may be obtained using any of the grouping techniques described herein), the process 700 may be applied multiple times, using different parts of the enrichment portion, to generate the multiple executable (e.g., SQL) queries. For example, the process 700 may be used to generate executable queries 512, 514, 516, 518, and/or 530 using the information specified in enrichment portion 506 of declarative query 502.

The process 700 may be performed by any suitable computing device(s). The process 700 may be performed by any suitable software executing on a data processing system (e.g., data processing system 105). For example, with reference to the data processing system 105 shown in FIG. 1D, the process 700 may be performed by using input transformation module 130 (e.g., to perform acts 702, 704, 706, and 708 described below).

In some embodiments, the process 700 may be invoked multiple times by a process for generating multiple executable queries from a declarative query. For example, as described above with reference to FIG. 3, in some embodiments, the process 300 may invoke the process 700 one or multiple times. For example, the process 300 may invoke the process 700 to generate an executable query from the identification portion of a declarative query and multiple executable queries from the enrichment portion of the declarative query.

Process 700 begins at act 702, where a portion of a declarative query may be obtained. This may be any suitable portion of a declarative query. For example, when process 700 is being used to generate an executable identification query (e.g., query 510), the portion may include at least some or all of the identification portion (e.g., identification portion 504) of a declarative query. As another example, when process 700 is being used to generate an executable enrichment query (e.g., query 512, 514, 516, 518, or 530), the portion may include at least some or all of the enrichment portion (e.g., enrichment portion 506) of a declarative query.

As yet another example, the declarative query may include an inline view (e.g., within the enrichment portion of the declarative query) and the portion obtained at act 702 may include some or all of the information specified within the inline view. For example, when the inline view specifies a declarative tabular query, at least some of (e.g., all) the portion of the inline view specifying the tabular query may be obtained at act 702.

Next, process 700 proceeds to act 704, where an intermediate query representation of the declarative query portion obtained at act 702 is generated. Generating the intermediate query representation may be performed by parsing the portion of the declarative query obtained at act 702 and generating the intermediate representation using the parsed information. In some embodiments, the parsing may be performed by using a SQL parser, for example, an ANSI SQL parser. In some embodiments, the intermediate query representation may comprise an abstract syntax tree (AST). Though any other suitable type of intermediate representation may be used in some embodiments, as aspects of the technology described herein are not limited in this respect.

Next, process 700 proceeds to act 706, where the intermediate query representation is transformed, in stages, through a series of one or more transformations each of which augments the intermediate query representation (e.g., AST) with auxiliary information that will be used to generate the database-specific executable query (e.g., database-specific executable query) at act 708. In the example embodiment of FIG. 7A, there are four transformations described below with reference to acts 706*a*, 706*b*, 706*c*, 706*d*, and the examples in FIGS. 7B-7F. However, it should be appreciated that, in some embodiments, one or more of the transformations described in FIG. 7A may be omitted (e.g., when there are no dynamic attributes referenced in the enrichment portion of a declarative query, the dynamic reference attribute augmentation act 706*b* may be omitted). Moreover, in some embodiments, one or more other transformations may be used instead of or in addition to the transformations described herein, as aspects of the technology described herein are not limited in this respect.

In the illustrative embodiment of FIG. 7A, the first transformation of the intermediate query representation obtained at act 704 is performed at act 706*a*, where the intermediate query representation is augmented with unique identifier information associated with any data entity instance being retrieved. In this way, the executable query generated at act 708 will obtain the unique identifiers and return them along with results of the query. Having access to the unique identifiers of each data entity instance may facilitate further access to the data entity instances, for example, to edit or delete one or more of the data entity instances.

For example, consider the identification portion 710 of a declarative query shown in FIG. 7B. The intermediate query representation of identification portion 710 may be augmented with information that would cause the executable query generated at act 708 to obtain unique identifiers for each "BizTerm" data entity instance satisfying the "WHERE" clause of the query. FIG. 7C shows a SQL view 720 of the augmented version of the intermediate query representation after augmentation of act 706*a*. Note that the "SELECT" statement also indicates "BizTermID" in addition to "Name".

It should be appreciated that FIG. 7C and FIGS. 7D-7F show SQL query views of the augmented intermediate query representations (instead of the intermediate representation itself, for example, augmented abstract syntax trees) for clarity. As such, the intermediate SQL query views shown in FIGS. 7C-7F are not generated during execution of process 700, in some embodiments. Rather, the intermediate query representation may go through a series of one or multiple transformations, and an executable (e.g., SQL) query is generated from the intermediate query representation, after all the transformations are performed, at act 708.

The second transformation of the intermediate query representation is performed at act 706*b*, where the intermediate query representation is further augmented with dynamic attribute reference information. The dynamic attribute reference information includes information specifying how the dynamic attribute being referenced is stored in the underlying physical implementation. For example, this information may include information identifying a table or tables in which values of the referenced dynamic attribute are stored in a database. When the value of the dynamic attribute is being inherited from an attribute of another data entity instance, the information indicating where the inherited value comes from may be used to identify the underlying table from which to access the value being inherited. The dynamic attribute reference information may then be used in the executable query to access the appropriate physical table(s) or other structure(s) to obtain the values of the referenced dynamic attributes.

For example, the "xCalculationRules" attribute in the identification portion 710 is a dynamic attribute. However. "xCalculationRules" is not the name of the physical table that stores the values of this attribute. In this example, the actual attribute values are stored in an "ExtendedAttributeValue" table having an ID of "1004". As shown in the SQL view 730 of FIG. 7D (representing the augmented intermediate query representation that would be obtained after performing act 706*b*), the SQL query is now configured to select the dynamic attribute values from the ExtendedAttribute table having the ID 1004.

The third transformation of the intermediate query representation is performed at act 706*c*, where the intermediate query representation is augmented with view type information. In some embodiments, the view type information may be derived from contents of the declarative query itself and/or other configuration information associated with the data processing system performing process 700.

As described herein, in some embodiments, the data entity instances managed by a data processing system may be associated with respective workflow states. Additionally or alternatively, the data entity instances managed by the data processing system may be versioned. In some embodiments, a declarative query may indicate explicitly that a certain "view type" is requested. The view type may indicate that data having a certain version and/or associated workflow state is to be returned. For example, the view type may indicate that only data entity instances associated with a published state are to be returned. As another example, the view type may indicate that data entity instances updated within a certain range of time are to be returned. Other examples are described herein.

In some embodiments, where the declarative query does not specify a desired view type, the view type may be set to a default view type or configured view type by the data processing system performing the process 700. In some embodiments, even if a declarative query specifies a desired view type, the data processing system may override the requested view type with an overriding value.

Regardless of how the requested view type is determined, depending on the view type requested, different data is returned. Since different data may be stored in different tables, the intermediate query representation is augmented at act 706*c* with view type information indicating where the requested data are stored in physical storage (e.g., which table(s)). For example, values of "BizTerm" instances associated with the "published" workflow state and values of the "BizTerm" instances associated with the "pending approval" workflow state may be stored in different tables.

As shown in FIG. 7B, the identification portion 710 does not specify a desired view type and, in this example, the data processing system is configured to default to the view type whereby data associated only with a particular version (e.g., the current version, previous version, an even earlier version, etc.) of data entity instances is returned. In this example, data for the particular version of the entity instances are stored in physical tables whose names begin with the prefix "Vb". As shown in the SQL view 740 of FIG. 7E (representing the augmented intermediate query representation that would be obtained after performing act 706*c*), the SQL query is now configured to select the dynamic attribute values from the tables having the prefix "Vb".

The fourth transformation of the intermediate query representation is performed at act 706*d*, where the intermediate query representation is augmented with permissions information. In some embodiments, the data processing system is configured to allow access to data only to a user or a group of users that have permission to access these data. Accordingly, at act 706*d*, the intermediate query representation may be augmented with permissions information that indicates one or more user groups to which the user submitting the declarative query (e.g., the logged in user) belongs. In turn, this information may be used to determine whether the user is permitted to access the requested data and, when the executable query generated at act 708 is executed, only that data which the user is permitted to access will be returned.

After the intermediate query representation, initially generated at act 704, is augmented at act 706 using a series of one or multiple transformations, the augmented intermediate query representation is transformed into an executable query at act 708.

In some embodiments, the executable query is for accessing data from a particular type of database system and the augmented intermediate query representation may be transformed into an executable query that is customized to that type of database system. For example, the database system may be a database system (e.g., a relational database system) configured to process SQL queries and the executable query generated at act 708 may be an executable SQL query. As another example, the database system may be a NoSQL system and the executable query generated at act 708 may be an executable query that the NoSQL system is configured to process.

In some embodiments, the executable query generated at act 708 may be customized in a vendor-specific manner. For example, different vendors (e.g., MICROSOFT, ORACLE, IBM, POSTGRESQL, etc.) may implement different dialects of SQL and/or provide extensions to the SQL standard. In such situations, the executable query may be generated for a target database system (e.g., ORACLE) using the syntax and/or commands implemented by the target database system (e.g., using any special syntax and/or commands implemented by ORACLE). Additionally or alternatively, the executable query generated at act 708 may include optimizations to the query that may be supported using the target database system.

Accordingly, in some embodiments, an executable query for one type of database generated at act 708 (e.g., an executable SQL query for MICROSOFT SQL SERVER database) may be different from an executable query generated at act 708 for another type of database (e.g., an executable SQL query for IBM DB2) even where both queries would be generated from the same underlying intermediate representation obtained upon performance of act 706 of process 700.

After an executable query is generated at act 708, the process 700 completes.

Retrieving Hierarchical Data

Declarative Queries with Recursion

As described herein, data entities may be related to one another and, in some embodiments, a single declarative query may be used to retrieve information about multiple related data entities. For example, as described with reference to FIGS. 4D-F, a single declarative query may specify a hierarchy of attributes (some of the attributes being attributes of different data entities) and the values of attributes in the hierarchy may be retrieved by processing the single declarative query. Moreover, the retrieved attribute values may be output in a hierarchical format that corresponds to the hierarchical structure of the hierarchy of attributes specified in the declarative query. Indeed, in that example, the hierarchical format has a nesting structure that is the same as the nesting structure of the attributes in the hierarchy of attributes specified in the declarative query.

In the example described with reference to FIGS. 4D-F, the hierarchy of attributes for which values are to be retrieved was specified expressly as part of the declarative query. Specifically, the enrichment portion of the declarative query in that example had attributes organized in a nested manner as shown in FIG. 4D. Other examples of using nesting to specify a hierarchical query are shown in FIGS. 9C, 9F-1 and 9F-2.

However, in some embodiments, recursion provides an alternative to using an explicit nested structure of attributes in the enrichment portion to indicate that values of a hierarchy of attributes are desired. In particular, some of the data entities supported by the data processing system may be recursive. A data entity may be recursive when it has a parent of the same entity class (e.g., a same class parent). For example, when a data entity has an attribute referencing a parent data entity and the parent data entity has the same entity class, then the data entity may be said to be recursive. For example, the entity class "BizTerm" has a same-class parent through the property "ParentBizTerm". As another example, the entity class "DataElem" has a parent of entity class "DataElem". Such a recursive structure provides an alternative to using nesting for retrieving values for a hierarchy of data entities, and, in some embodiments, a single declarative query may be used to retrieve information about multiple related data entities using recursion.

Figure 8A:
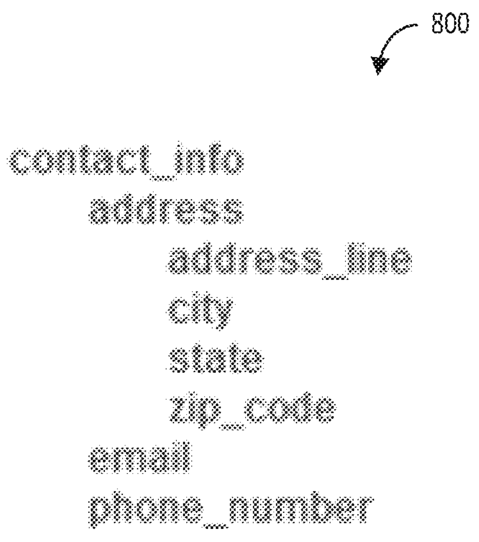
FIG. 8A shows an illustrative instance of a data entity having a hierarchical structure, in accordance with some embodiments of the technology described herein.
Figure 8B:
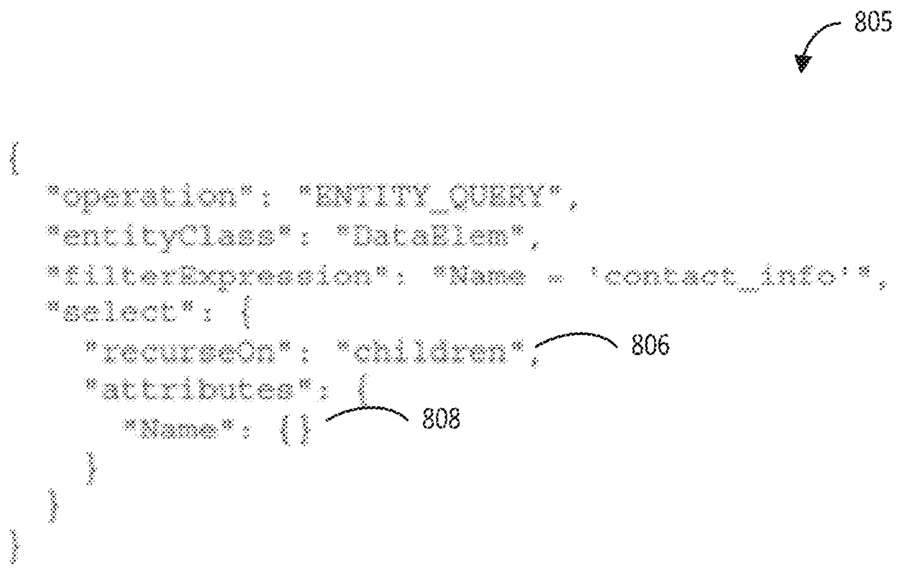
FIG. 8B shows an example declarative query 805 for retrieving hierarchical data using recursion, in accordance with some embodiments of the technology described herein.

One example of using recursion in a single declarative query to retrieve information about multiple related data entities is shown in FIGS. 8A-C. FIG. 8A shows an illustrative data entity instance 800 of the "DataElem" data entity, which has a same class parent. The data entity instance 800 is named "contact_info" and has the hierarchical structure shown in FIG. 8A, and may be used for storing information about the contact information of a user. The data entity instance "contact_info" has three attributes: "address," "e-mail," and "phone_number" which reference respective "DataElem" instances that store address, e-mail, and phone number information, respectively. Moreover, the "address" entity instance itself has four attributes called "address_line", "city", "state" and "zip_code," which reference respective "DataElem" instances that store street, city, state, and zip code information, respectively.

FIG. 8B shows a single illustrative declarative query 805 for retrieving hierarchical data using recursion, in accordance with some embodiments of the technology described herein. As shown in FIG. 8B, the hierarchy of data elements that are children of the data element "contact_info" may be retrieved using the recurseOn field 806 with a value "children", which indicates that the recursion should be downward. The enrichment portion indicates, at 808, that for each recursively retrieved attribute the name of the attribute should be obtained.

FIGS. 8C-1, 8C-2, and 8C-3 show illustrative results obtained by a data processing system by processing the example declarative query 805 shown in FIG. 8B. As is clear from FIGS. 8C-1, 8C-2, and 8C-3, the structure of the results is hierarchical with the structure of the hierarchy matching the nested structure of data elements shown in FIG. 8A. At the same time, that nested structure did not need to be expressly stated in the declarative query 805, which simplifies writing queries for retrieval of hierarchical data in instances where recursion may be used.

Although the example declarative query of FIG. 8B indicates that the recursion is to be downward, a declarative query may use recursion in the upward direction to retrieve values. An example is shown in FIG. 8D, which illustrates a single declarative query 810 for retrieving attributes of any parent entities of the "phone_number" data entity instance. In this example, the recurseOn field is set to the value "ParentDataElem" to indicate that the recursion is to be upward. Illustrative results 820 obtained by a data processing system by processing the example declarative query 810 are shown in FIG. 8E.

In some embodiments, a declarative query may specify a numeric limit to the number of levels of recursion to be performed by the data processing system when processing the declarative query. This may be helpful in keeping the size of the results manageable.

Additional Examples of Declarative Queries to Retrieve Hierarchical Data

Additional examples of declarative queries to retrieve hierarchical data are described next with reference to FIGS. 9A-9G.

Figures 9A, 9B:
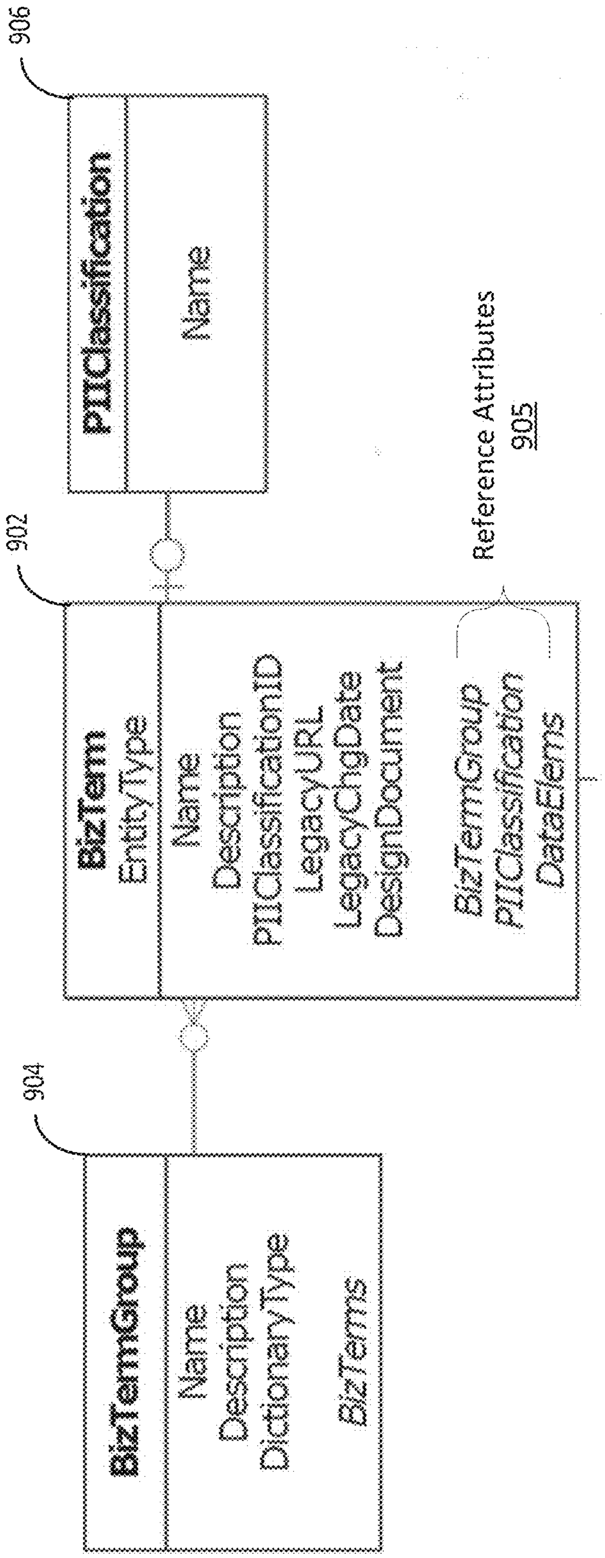
FIG. 9A shows a portion of an entity relationship diagram, in accordance with some embodiments of the technology described herein.
FIG. 9B shows a pseudo-code specification of a declarative query for retrieving hierarchical data, in accordance with some embodiments of the technology described herein.

FIG. 9A shows a portion of the entity relationship diagram shown in FIG. 2G to help illustrate the examples in FIG. 9B-9G. In the example of FIG. 9A, the "BizTerm" data entity 902 has the attributes "Name", "Description", "PIIClassificationID", "LegacyURL", "LegacyChgDate", "DesignDocument," which take on various values. One or more of these attributes may be static. One or more of these attributes may be dynamic. The "BizTerm" data entity also has the reference attributes 905 "BizTermGroup", "PIIClassification", and "DataElems", which refer to other data entities—the BizTermGroup data entity 904, the PIIClassification data entity 906 and a list of one or more DataElem data entities, respectively. In turn, the BizTermGroup data entity 904 has the attributes "Name", "Description", "DictionaryType" and a reference attribute "BizTerms". The PIIClassification data entity 906 has a name attribute.

FIG. 9B shows a pseudo-code specification of a declarative query for retrieving hierarchical data, in accordance with some embodiments of the technology described herein. In particular, the specification indicates that the results are to include information about all instances of the "BizTerm" data entity that have their PIIClassification attribute set to reference some specific instance of the PIIClassification data entity. For each such identified "BizTerm" instance, the results are to include its values for the "Name" and "LegacyURL" attributes. In addition, for each particular identified "BizTerm" instance, the results are to include values of the "Name" and "DictionaryType" attributes of the "BizTermGroup" data entity instance to which the BizTermGroup attribute (of the particular "BizTerm" instance) refers.

FIG. 9C shows a declarative query 910, which is a JSON implementation of the pseudo-code declarative query specification shown in FIG. 9B, in accordance with some embodiments of the technology described herein. The query 910 includes an identification portion 912 that indicates that the results are to include published instances of the "BizTerm" data entity that have their PIIClassification attribute set to reference some instance of the PIIClassification data entity rather than being NULL. The query 912 includes an enrichment portion 914 that indicates the results are to include attribute values for "Name", "LegacyURL" and, for the referenced BizTermGroup data entity instance, the values of its "Name" and "DictionaryType" attributes.

FIG. 9D shows an illustrative view of results that may be obtained by processing the JSON declarative query of FIG. 9C, in accordance with some embodiments of the technology described herein. In this example, the results are shown using nested tables, but this is not a limitation of embodiments of the technology described herein. In other embodiments, the results may have a hierarchical format as specified by nesting or in any other suitable way.

Note that the enrichment portion 914 in FIG. 9C uses nesting to specify the desired hierarchy of attributes, and that the results are presented in a hierarchical format whose structure matches the nesting structure of the enrichment portion 914. Also, it should be noted that, like many of the example declarative queries described herein, there is no distinction made in the declarative query between which attributes are static and which attributes are dynamic. As a result, the author of the query need not know how the attributes are stored in memory. The declarative query 910 is not only agnostic to whether the attributes are static or dynamic, but also to the type of database(s) actually storing the values—database-specific details are hidden.

FIG. 9E shows a pseudo-code specification of another, more complex, declarative query for retrieving hierarchical data, in accordance with some embodiments of the technology described herein. As shown in FIG. 9E, the specification indicates that the results are to include information about all instances of the "BizTerm" data entity that refer to a "BizTermGroup" entity instance having its "DictionaryType" attribute set to "Enterprise". For each such entity instance, the results are to include the name of the entity instance, the name of the referenced BizTermGroup, the name of the referenced DataElem instance, the name of the DataSet referenced by the referenced DataElem instance, the count of all related DataElems, the count of related DataElems that are not part of an Application, and the counts of related DataElems grouped by Application.

FIGS. 9F-1 and 9F-2 show a declarative query 920, which is a JSON implementation of the pseudo-code declarative query specification shown in FIG. 9B, in accordance with some embodiments of the technology described herein. The declarative query includes an identification portion that indicates that the results are to include published instances of the BizTerm data entity that refer to a BizTermGroup instance having its "DictionaryType" attribute set to "Enterprise". The declarative query also includes an enrichment portion with nesting to pull attribute values from two different hierarchies—the BizTermGroup hierarchy and the DataElems hierarchy.

In addition, the declarative query includes nested SQL queries to enrich the response with nested results. The nested SQL query within inline view 922 is a declarative tabular query. The nested SQL query within inline view 924 is a declarative tabular query to enrich the response with nested tabular results.

FIG. 9G shows an illustrative view of results that may be obtained by processing the JSON declarative query of FIGS.

9F-1 and 9F-2, in accordance with some embodiments of the technology described herein. In this example, the results are shown using nested tables, but this is not a limitation of embodiments of the technology described herein. In other embodiments, the results may have a hierarchical format as specified by nesting or in any other suitable way.

Similar to the example of FIGS. 9A-9D, the declarative query 920 in FIGS. 9F-1 and 9F-2 uses nesting to specify the desired hierarchy of attributes and the results, shown in FIG. 9G, are presented in a hierarchical format whose structure matches the nesting structure of the declarative query. The declarative query 920 is agnostic to whether attributes are static or dynamic and to the details concerning what databases store these attribute values and how this is done.

Additional Aspects of Entity API

As described herein, a data processing system (e.g., data processing system 105) may be configured to allow different types of access to the data entities it manages through the entity API. For example, in addition to enabling querying for data entity instances, a data processing system may be configured to allow creating, updating, and deleting data entity instances. As another example, as described herein, a data processing system may be configured to manage workflow actions using a workflow management system, and the entity API may be used as interface to allow performance of workflow actions (e.g., submitting changes to one or more data entity instances for approval, approving or rejecting, submitted changes to the data entity instance(s), etc.).

Accordingly, in some embodiments, a declarative statement (e.g., specified using JSON or any other suitable format) may be used to specify a desired create, update, delete, or workflow operation (similar to how a declarative query may be used to specify a desired query). In turn, the declarative statement may be converted into one or more executable statements (e.g., SQL statements), and the executable statement(s) may be executed by the data processing system to implement the desired operation.

Examples of declarative statements for implementing create, update, or delete operations are described below with reference to Tables 13-16. In these examples, such declarative statements may be indicated using "operation":="ENTITY_SAVE" "in JSON notation (whereas a declarative query may be indicated using "ENTITY_QUERY" or "TABULAR_QUERY" as described below). In some embodiments, the "ENTITY_SAVE" declarative statement further includes a parameter indicating the type of edit being made (e.g., using the "editType" command). For example, the value of the parameter may indicate that a data entity instance is being created, updated, deleted, added to a reference collection, or removed from a reference collection.

An illustrative example of a declarative statement for creating a data entity instance is shown below in Table 13, which is for creating an instance of the "BizTermGroup" data entity with the "Name" and "Description" attributes set to "New Business Term Group" and "My first dictionary," respectively.

Table 14 shows the illustrative result returned in response to executing the declarative statement of Table 13 for creating a new instance of the data entity "BizTermGroup". In this example, the result contains an identifier ("compositeID" in this example) of the newly created data entity instance. This identifier may be used to identify the data entity instance for subsequent operations (e.g., updating or deleting). The result also indicates whether the newly created data entity instance may be updated and/or deleted by the user.

TABLE 13

Illustrative declarative statement for creating instance of the data entity "BizTermGroup" .

```
"operation": "ENTITY_SAVE",
"entityInstances": [
  { "entityInstanceID": {
      "entityClass": "BizTermGroup"
    },
    "editType": "CREATE",
    "attributes": {
      "Name": { "stringValue": "New Business Term Group" },
      "Description": { "stringValue": "My first dictionary" }
    }}]
```

TABLE 14

Illustrative result returned in response to executing the declarative statement of Table 13 for creating a new instance of the data entity "BizTermGroup".

```
"entityInstances": [
  {
    "entityInstanceID": { "entityClass":
      "BizTermGroup",
      "identifyingName": "New Business Term Group", "displayName":
      "New Business Term Group", "compositeID": "58.1004"
    },
    "changeType": "CREATED",
    "attributes": {
      "Description": { "canUpdate": true,
        "editContext": "I1D01NVConjF0/6xTgDAAAU64f9/I5SBs/AeiY8rYQY=",
        "stringValue": "My first dictionary"
      },
      "Name": { "canUpdate": true,
        "editContext": "I1D01NVConjF0/6xTgDAAAU64f9/I5SBs/AeiY8rYQY=",
        "stringValue": "New Business Term Group"
      }
    },
    "canDelete": true, "attributesUpdateStatus": "ALL",
    "editContext": "I1D01NVConjF0/6xTgDAAD/cVEdDpAXIaAL2t5c/39A="
  }
]
```

An illustrative example of a declarative statement for updating a data entity instance is shown below in Table 15a, which is for updating an instance of the "BizTermGroup"

data entity to change the value of its "Description" attribute to be: "My VERY first Dictionary." In this example, the editType parameter is set to "update". Table 15b shows the illustrative result returned in response to executing the declarative statement of Table 15a for updating the instance of the data entity "BizTermGroup".

TABLE 15a

Illustrative declarative statement for updating attribute values of an instance of the data entity "BizTermGroup".

```
"operation" : "ENTITY_SAVE",
"entityInstances": [
  {
    "entityInstanceID": { "entityClass": "BizTermGroup",
      "compositeID": "58.1004"
    },
    "editType" : "UPDATE", "attributes":
    {
        "Description": {
        "editContext": "HD01NVConjF0/6xTgDAAAU64f9/I5SBs/AeiY8rYQY=",
        "stringValue": "My VERY first dictionary"
      }
    },
    "editContext": "I1D01NVConjF0/6xTgDAANMY33V1JaeAmoQiDIRaSfk="
  }
]
```

TABLE 15b

Illustrative result returned in response to executing the declarative statement of Table 9 for updating attribute values of an instance of the data entity "BizTermGroup"

```
"entityInstances": [
  {
    "entityInstanceID": { "entityClass":
      "BizTermGroup",
      "identifyingName": "New Business Term Group", "displayName":
      "New Business Term Group", "compositeID": "58.1004"
    },
    "changeType": "UPDATED",
    "attributes": {
      "Description": { "canUpdate": true,
        "editContext": "wMKkJ/8jCdrZ3kT4WCMwvEhsCd+VGV8CKB89WUrLveM=",
        "stringValue": "My VERY first dictionary",
        "baseline": {
          "stringValue": "My first dictionary"
        }
      }
    },
    "canDelete": false,
  "reasonCannotDelete": {
  "reasonCode": "WORKFLOW_PREVENTS_EDIT"
  },
  "attributesUpdateStatus": "ALL", "editContext": "wMKkJ/8jCdrZ3kT4WCMwvIitj/
1xCoMLAEOUGadGQSI0LvFMfEzozH2pilpLH2+v"
    }]
```

The example declarative statement of Table 15a includes a unique identifier for the data entity instance to be updated. In this example, the unique identifier may be obtained from the result shown in FIG. 14 or by executing a declarative query to obtain the identifier. In some embodiments, a declarative query may be executed prior to performing an update or delete operation in order to obtain the identifier(s) for the declarative entity instance(s) to updated or deleted. An example of such a declarative query is shown below in Table 16a, with the results shown in Table 16b.

The example declarative query of Table 16a specifies the option "retrieveForEdit", which causes additional information relevant to editing of data entity instances to be returned. As shown in Table 16b, that additional information may indicate whether particular attributes may be updated (e.g., the value of the "Description" attribute may be updated because the additional information includes the string "canUpdate": true"). Also, that additional information may include the editContext, which is information indicating the version of an item that is to be edited. In some embodiments, this editContext may be provided in the declarative statement to make the edit so as to guarantee that the latest version of the attribute is being edited. This prevents a conflict if someone else makes a change after the time that a query for the current attribute values is made, but before the new value is submitted. As shown in Table 15a, the declarative statement includes the edit contexts returned in the results shown in Table 16b.

TABLE 16a

Declarative entity API query with "retrieveForEdit" option set.

```
{
"operation": "ENTITY_QUERY",
"entityClass": "BizTermGroup",
"filterExpression": "Name = 'New Business Term Group'",
```

TABLE 16a-continued

Declarative entity API query with "retrieveForEdit" option set.

```
    "select": {
      "options": {
        "retrieveForEdit": true
      },
      "attributes": {
        "Description": { }
      }
    }
  }
```

TABLE 16b

Results of processing the declarative entity API query shown in Table 16a.

```
{
"entityModelRevision": "44",
"entityInstances": [{
  "entityInstanceID": {
    "entityClass": "BizTermGroup",
    "identifyingName": "New Business Term Group",
    "displayName": "New Business Term Group",
    "compositeID": "58.1004" },
    "attributes": {
      "Description": {
        "canUpdate": true,
        "editContext": "I1D01NVConjF0/6xTgDAAAU64f9/I5SBs/AeiY8rYQY=",
        "stringValue": "My first dictionary" }
      },
    "canDelete": true,
    "attributesUpdateStatus": "ALL",
    "editContext": "I1D01NVConjF0/6xTgDAANMY33V1JaeAmoQiDIRaSfk="
}]}
```

As described herein, the entity API may be used to perform workflow actions with respect to one or more data entity instances managed by the data processing system. To this end, in some embodiments, a data entity instance may have an attribute (e.g., called "Work Flow Task") whose value indicating a workflow task (e.g., approval, rejection, etc.) that may be performed with respect to the data entity instance. This attribute value may be used to identify data entity instances on which the workflow task may be performed and a declarative statement (e.g., with the "WORKFLOW_ACTION" operation) may be used to cause the data processing system to perform the workflow action.

In some embodiments, a declarative statement for creating, updating, deleting, or performing a workflow action with respect to one or more data entity instance(s) may have a hierarchical structure. For example, the declarative statement may include a hierarchy of attributes (e.g., specified using nesting or recursively) similar to how a declarative query may be used to obtain values for a hierarchy of attributes, examples of which are provided herein.

As described herein, values of data entity instance attributes may be stored in different tables by the data processing system. For example, values of static and dynamic attributes may be stored in different tables. As another example, values of different dynamic attributes (e.g., different types of dynamic attributes) may be stored in different tables. Since a single declarative query may be used to access values for multiple different attributes of data entity instances, a single declarative query may be used to access values stored across multiple different tables stored in the data processing system. Similarly, a single declarative statement may be used to create, update, or delete values stored in multiple tables because that statement may be used to create, update, or delete values of multiple different attributes of data entity instances.

In some embodiments, a declarative statement to create, update or delete one or more data entity instances(s) may be processed in accordance with the process 700 described with reference to FIG. 7. For example, in some embodiments, the declarative statement may be first transformed into an intermediate representation (e.g., an abstract syntax tree), for example, by using a SQL parser.

Next, the intermediate representation is transformed using a series of one or multiple transformations (e.g., the dynamic attribute reference augmentation **706*b*, view type augmentation 706*c*, and permissions augmentation 706*d* described with respect to FIG. 7** and/or any other suitable transformations) to obtain a transformed intermediate representation. Since a declarative statement for updating or deleting data entity instances already includes one or more data entity instance identifiers, in some embodiments, the unique identifier augmentation step may not be needed when transforming the declarative statement into an executable statement. On the other hand, dynamic attribute reference augmentation and view type augmentation may be performed to identify the table(s) where the attribute values to be updated or deleted are stored, and permissions augmentation may be performed to ensure that the logged in user is allowed to make the requested changes.

After the intermediate representation (e.g., an abstract syntax tree) is transformed through the series of one or multiple transformations, an executable statement (e.g., an executable SQL statement) is generated from the transformed intermediate representation. The executable statement may be customized to a particular database system, in some embodiments. The executable statement may then be executed in order to process the declarative statement.

Declarative Tabular Queries

As described herein, a declarative query may be a declarative entity query, having an identification and an enrichment portion, and the results of processing the declarative entity query include data entity instances enriched by their attribute values. Each data entity instance part of the results may be associated with a respective entity instance ID, which uniquely identifies the data entity instance. In the examples described herein such queries may be indicated using ""operation":="ENTITY_QUERY"" in JSON notation.

However, the inventors have recognized that using a SQL query directly (instead of a declarative entity query) it is possible to join data entity instances such that a single row in the result set no longer belongs to a single data entity instance, and one or more (e.g., all) of the columns may be associated with different entity instances.

Accordingly, in some embodiments, a data processing system implementing the entity API may be configured to also process declarative tabular queries whose results may mix data from different data entity instances with the results being organized in rows and columns where one or more of the columns may optionally be tied to a respective data entity instance ID. In the examples described herein declarative tabular queries may be indicated using "“operation”:=“TABULAR_QUERY”" in JSON notation.

FIG. 10A shows an illustrative example of a tabular query that combines information obtained from multiple data entity instances. In this example, the tabular query is for retrieving the names of all “BizTerm” data entity instances that have a parent “BizTerm”. As shown in FIG. 10B, the results of processing this tabular query include two columns: the name of the BizTerm and the name of the parent “BizTerm.” Note that aliases are used to rename the columns.

In some embodiments, tabular queries may be used to perform aggregate functions. Non-limiting examples of aggregate functions include: identifying a minimum or maximum of a set of numbers (e.g., a column), identifying an average, standard deviation, or other statistic of a set of values (e.g., a column), counting the number of values in a set of values (e.g., a column), counting the number of values in a set of values (e.g., a column) meeting one or more conditions, etc.

FIG. 10C shows an illustrative example of a tabular query for performing an aggregate function (a count operation in this example). The results of processing the declarative tabular query of FIG. 10C are shown in FIG. 10D. Note that, in this example, the declarative tabular query requests that the results include a structural definition of the results by adding the “retrieveDefinition” global portion. The structural definition is returned in the first part of the results shown in FIG. 10D. Another example of a declarative tabular query to perform an aggregate function is shown in inline view 924 of FIG. 9F-2, with illustrative results shown in FIG. 9G.

As can be seen from the foregoing examples, a declarative tabular may include a SQL statement for selecting the desired rows and columns. Optionally, a declarative tabular query may have an enrichment portion for enriching individual columns when entity instance ids are available. For example, for reference attributes, entity instance values in a column may be enriched by sub-selecting further attributes of the top level entity, including nested attributes. This results in an enriched column value that is a reference at the top level, but has additional attribute values from the sub-select in an attributes section, like a reference value in an entity query.

Consider, for example, the tabular query shown in FIG. 10A for retrieving the names of all “BizTerm” data entity instances that have a parent “BizTerm”. Suppose that now we wish to enrich each row with a reference to the BizTermGroup of the child business term (alias “b”) and the values of the “Name” and “Description” attributes of each BizTermGroup instance. This can be achieved with the query shown below in Table 17. The “fromAlias” keyword is used to identify which of the business terms are to be used for enrichment. The result, shown in Table 17, includes the “BizTermGroup” reference.

TABLE 17

Tabular query with enrichment.

```
[{
"operation": "TABULAR_QUERY",
"entitySQL": "SELECT b.Name as BizTermName, p.Name as ParentBizTermName FROM BizTerm b
INNER JOIN BizTerm p ON b.ParentBizTermID = p.BizTermID",
"select": {
  "attributes": {
    "BizTermGroup": {
      "fromAlias": "b",
        "select" : {
          "attributes": {
            "Name": { },
            "Description": { }
}}}}}}]
```

TABLE 18

Results of processing the tabular query shown in Table 17.

```
[{
"entityModelRevision": 74,
"rows": [
{
  "columns": {
    "BizTermName": {"stringValue": "Mean"},
    "ParentBizTermName": {"stringValue": "EconomicIndicators"},
      "BizTermGroup": {
        "entityInstanceValue": {
          "entityInstanceID": {
            "entityClass": "BizTermGroup",
            "identifyingName": "FIBO",
            "displayName": "FIBO",
            "compositeID": "57.1002"
          },
```

TABLE 18-continued

Results of processing the tabular query shown in Table 17.

```
            "attributes": {
              "Name": {"stringValue": "FIBO"},
              "Description": {"stringValue": "Financial Industry Business Ontology maintained by the
EDM Council. <a href=\"https://spec.edmcouncil.org/fibo/\">https://spec.edmcouncil.org/fibo/</a>"}
}}}}},
{
"columns": {
  "BizTermName": {"stringValue": "Mean",},
  "ParentBizTermName": {"stringValue": "EconomicIndicators",
    "entityInstanceID": {
      "entityType": "SubDomain",
      "compositeID": "54.1847"
    }
  },
  "BizTermGroup": {
      "entityInstanceValue": {
        "entityInstanceID": {
          "entityClass": "BizTermGroup",
          "identifyingName": "FIBO",
          "displayName": "FIBO",
          "compositeID": "57.1002"
        },
        "attributes": {
          "Name": {"stringValue": "FIBO"},
        "Description": {"stringValue": "Financial Industry Business Ontology maintained by the EDM
Council. <a href=\"https://spec.edmcouncil.org/fibo/\">https://spec.edmcouncil.org/fibo/</a>"
}}}}}
},...
]}]
```

In some embodiments, a declarative tabular query may be processed using the process 700 of FIG. 7. In some such embodiments, the declarative tabular query is first transformed into an intermediate query representation (e.g., an abstract syntax tree), for example, by using a SQL parser. Next, the intermediate query representation is transformed using a series of one or multiple transformations (e.g., the transformations described herein with respect to FIG. 7 and/or any other suitable transformations) to obtain a transformed intermediate query representation. In turn, the intermediate query representation is transformed into an executable query (e.g., an executable SQL query). The executable query may be customized to a particular database system, in some embodiments.

Inline Views

As described herein, in some embodiments, an enrichment portion of a declarative query may include an inline view containing another declarative query. Inline views allow for the nesting of declarative queries. In this way, a declarative tabular or entity query may be nested in another declarative query. For example, as already seen with respect to FIGS. 9F-1 and 9F-2, the enrichment portion of declarative query 920 includes two inline views: an inline view 922 including an entity query and an inline view 924 including a tabular query.

In some embodiments, an inline view may include four components: (1) information specifying the type of declarative query to be performed (e.g., information specifying whether the query is a declarative entity query or a declarative tabular query); (2) a SQL query to create the inline view, which query selects the inner join keys; (3) a list of column names used as outer join keys to join from the outside (denoted by "outerJoinKeys" in the examples of FIGS. 9F-1, 9F-2, 10E and 10F); and (4) a list of column names used as inner join keys to join to the inside (denoted by "innerJoinKeys" in the examples of FIGS. 9F-1, 9F-2, 10E and 10F).

FIGS. 10E and 10F show additional examples of declarative query containing inline views, in accordance with some embodiments of the technology described herein.

In particular, FIG. 10E shows a declarative entity query containing an inline view having another declarative entity query within. In this example, the overall declarative query is for selecting all instances of the "BizTerm" data entity that have at least one data element. Furthermore, for each such data entity instance, the goal is to obtain the collection of "Applications" that are associated with the instance by traversing the entity model path "DataElems.DataSet.Application" in accordance with the entity relationship diagram shown in FIG. 2G. Without an inline view, the result would have to contain all the intermediate elements (i.e., the DataElems connected to DataSets connected to Application). However, by using an inline view, as shown in FIG. 10E, these intermediate results need not be returned.

In this example, the inline query starts with "Application" and joins down to the entity that has the join attribute—in this case DataElem—because the inner and outer join attributes are set to "BizTermID". FIGS. 10G-1 and 10G-2 show illustrative results of executing the declarative entity query shown in FIG. 10E.

FIG. 10F shows that a declarative table query may be nested in an enrichment tabular query using an inline view. In this example, the inline view helps to retrieve, for each instance of the "TechSystem" data entity, a count of DataSets per TechGroup. The inner and outer join attributes are set to "TechSystemID". FIGS. 10H-1, 10H-2, and 10H-3 show illustrative results of executing the declarative entity query shown in FIG. 10F.

Additional Implementation Detail

Figure 11:
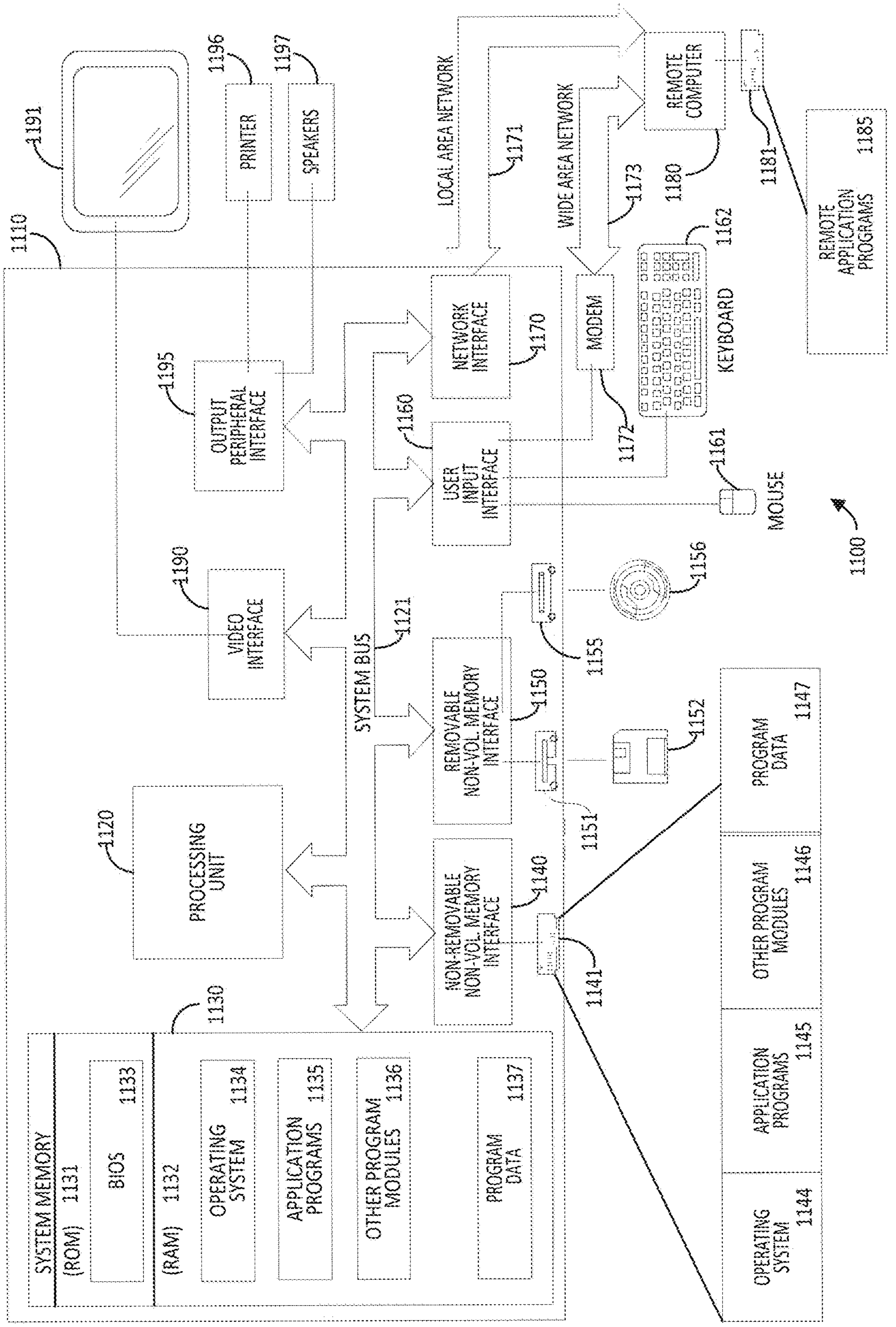
FIG. 11 is a block diagram of an illustrative computing system environment that may be used in implementing some embodiments of the technology described herein.

FIG. 11 illustrates an example of a suitable computing system environment 1100 on which the technology described herein may be implemented. The computing system environment 1100 is only one example of a suitable computing environment and is not intended to suggest any limitation as to the scope of use or functionality of the technology described herein. Neither should the computing environment 1100 be interpreted as having any dependency or requirement relating to any one or combination of components illustrated in the exemplary operating environment 1100.

The technology described herein is operational with numerous other general purpose or special purpose computing system environments or configurations. Examples of well-known computing systems, environments, and/or configurations that may be suitable for use with the technology described herein include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The technology described herein may also be practiced in distributed computing environments where tasks are performed by remote processing devices that are linked through a communications network. In a distributed computing environment, program modules may be located in both local and remote computer storage media including memory storage devices.

With reference to FIG. 11, an exemplary system for implementing the technology described herein includes a general purpose computing device in the form of a computer 1100. Components of computer 1110 may include, but are not limited to, a processing unit 1120, a system memory 1130, and a system bus 1021 that couples various system components including the system memory to the processing unit 1120. The system bus 1121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1110 typically includes a variety of computer readable media. Computer readable media can be any available media that can be accessed by computer 1110 and includes both volatile and nonvolatile media, removable and non-removable media. By way of example, and not limitation, computer readable media may comprise computer storage media and communication media. Computer storage media includes volatile and nonvolatile, removable, and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1130 includes computer storage media in the form of volatile and/or nonvolatile memory such as read only memory (ROM) 1131 and random access memory (RAM) 1132. A basic input/output system 1133 (BIOS), containing the basic routines that help to transfer information between elements within computer 1110, such as during start-up, is typically stored in ROM 1131. RAM 1132 typically contains data and/or program modules that are immediately accessible to and/or presently being operated on by processing unit 1120. By way of example, and not limitation, FIG. 11 illustrates operating system 1134, application programs 1135, other program modules 1136, and program data 1137.

The computer 1110 may also include other removable/non-removable, volatile/nonvolatile computer storage media. By way of example only, FIG. 11 illustrates a hard disk drive 1141 that reads from or writes to non-removable, nonvolatile magnetic media, a flash drive 1151 that reads from or writes to a removable, nonvolatile memory 1152 such as flash memory, and an optical disk drive 1155 that reads from or writes to a removable, nonvolatile optical disk 1156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1141 is typically connected to the system bus 1121 through a non-removable memory interface such as interface 1140, and magnetic disk drive 1151 and optical disk drive 1155 are typically connected to the system bus 1121 by a removable memory interface, such as interface 1150.

The drives and their associated computer storage media described above and illustrated in FIG. 11, provide storage of computer readable instructions, data structures, program modules and other data for the computer 1110. In FIG. 11, for example, hard disk drive 1141 is illustrated as storing operating system 1144, application programs 1145, other program modules 1146, and program data 1147. Note that these components can either be the same as or different from operating system 1134, application programs 1135, other program modules 1136, and program data 1137. Operating system 1144, application programs 1145, other program modules 1146, and program data 1147 are given different numbers here to illustrate that, at a minimum, they are different copies. An actor may enter commands and information into the computer 1110 through input devices such as a keyboard 1162 and pointing device 1161, commonly referred to as a mouse, trackball, or touch pad. Other input devices (not shown) may include a microphone, joystick, game pad, satellite dish, scanner, or the like. These and other input devices are often connected to the processing unit 1120 through a user input interface 1160 that is coupled to the system bus, but may be connected by other interface and bus structures, such as a parallel port, game port or a universal serial bus (USB). A monitor 1191 or other type of display device is also connected to the system bus 1121 via an interface, such as a video interface 1190. In addition to the monitor, computers may also include other peripheral output devices such as speakers 1197 and printer 1196, which may be connected through an output peripheral interface 1195.

The computer 1110 may operate in a networked environment using logical connections to one or more remote computers, such as a remote computer 1180. The remote computer 1180 may be a personal computer, a server, a router, a network PC, a peer device, or other common network node, and typically includes many or all of the elements described above relative to the computer 1110, although only a memory storage device 1181 has been illustrated in FIG. 11. The logical connections depicted in FIG. 11 include a local area network (LAN) 1171 and a wide area network (WAN) 1173, but may also include other networks. Such networking environments are commonplace in offices, enterprise-wide computer networks, intranets, and the Internet.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. The modem 1172, which may be internal or external, may be connected to the system bus 1121 via the actor input interface 1160, or other appropriate mechanism. In a networked environment, program modules depicted relative to the computer 1110, or portions thereof, may be stored in the remote memory storage device. By way of example, and not limitation. FIG. 11 illustrates remote application programs 1185 as residing on memory device 1181. It will be appreciated that the network connections shown are exemplary and other means of establishing a communications link between the computers may be used.

Having thus described several aspects of at least one embodiment of the technology described herein, it is to be appreciated that various alterations, modifications, and improvements will readily occur to those skilled in the art.

Such alterations, modifications, and improvements are intended to be part of this disclosure, and are intended to be within the spirit and scope of disclosure. Further, though advantages of the technology described herein are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

The above-described embodiments of the technology described herein can be implemented in any of numerous ways. For example, the embodiments may be implemented using hardware, software, or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. However, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, aspects of the technology described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments described above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the technology as described above. As used herein, the term "computer-readable storage medium" encompasses only a non-transitory computer-readable medium that can be considered to be a manufacture (i.e., article of manufacture) or a machine. Alternatively or additionally, aspects of the technology described herein may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the technology as described above. Additionally, it should be appreciated that according to one aspect of this embodiment, one or more computer programs that when executed perform methods of the technology described herein need not reside on a single computer or processor, but may be distributed in a modular fashion amongst a number of different computers or processors to implement various aspects of the technology described herein.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the technology described herein may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the technology described herein may be embodied as a method, of which examples are provided herein including with reference to FIGS. 3 and 7. The acts performed as part of any of the methods may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by an "actor" or a "user". It should be appreciated that an "actor" or a "user" need not be a single individual, and that in some embodiments, actions attributable to an "actor" or a "user" may be performed by a team of individuals and/or an individual in combination with computer-assisted tools or other mechanisms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, performed by a data processing system, for accessing data in at least one data store of the data processing system by using executable queries, the method comprising:

using at least one computer hardware processor to perform:

(A) obtaining, through an application programming interface (API) of the data processing system, a query for accessing data, the query indicating multiple dynamic attributes of a data entity whose values are to be accessed;

(B) generating a plurality of executable queries from the query, the generating comprising:

grouping the multiple dynamic attributes into groups of dynamic attributes; and generating a respective executable query for each of the multiple groups of dynamic attributes to be used for obtaining values of attributes in the group for one or more instances of the data entity, wherein each respective executable query is generated with syntax customized to a target database system of the at least one data store against which the respective executable query is to be executed;

(C) executing the plurality of executable queries to obtain results for the query, the results including values of the multiple dynamic attributes of at least one instance of the data entity; and (D) outputting at least some of the results including the values of the multiple dynamic attributes of the at least one instance of the data entity.

2. The method of claim 1, wherein grouping the multiple dynamic attributes is performed based on whether dynamic attributes are stored in a same table in the at least one data store.

3. The method of claim 1, wherein the query comprises:

a first portion comprising information for identifying at least a first instance of the data entity stored in the at least one data store; and a second portion indicating at least one attribute of the data entity for which to obtain a value.

4. The method of claim 3, wherein generating the plurality of executable queries from the query comprises:

generating, using the first portion of the query, a first set of executable queries for identifying at least the first instance of the data entity stored in the at least one data store; and generating, using the second portion of the query, the second set of executable queries for obtaining attribute values for at least the first instance of the data entity identified using the first set of executable queries, the attribute values including the first attribute value, wherein generating the second set of executable queries comprises:

the grouping the multiple dynamic attributes into the groups of dynamic attributes; and generating the respective executable query for each of the multiple groups of dynamic attributes to be used for obtaining the values of attributes in the group for the one or more instances of the data entity.

5. The method of claim 4, wherein the first and second sets of executable queries comprise executable structured query language (SQL) queries.

6. The method of claim 4, wherein executing the plurality of executable queries comprises:

executing the first set of executable queries to obtain information identifying at least the first instance of the data entity; and after executing the first set of executable queries, executing, using the information identifying at least the first instance of the data entity, the second set of executable queries.

7. The method of claim 1, wherein the query indicates a hierarchy of attributes, and wherein outputting at least some of the results comprises:

formatting the at least some of the results in a hierarchical format corresponding to the hierarchy of attributes; and outputting the at least some of the results in the hierarchical format.

8. A data processing system, comprising:

at least one computer hardware processor; and at least one non-transitory computer-readable storage medium storing processor-executable instructions that, when executed by the at least one computer hardware processor, cause the at least one computer hardware processor to perform a method for accessing data in at least one data store of the data processing system by using executable queries, the method comprising:

(A) obtaining, through an application programming interface (API) of the data processing system, a query for accessing data, the query indicating multiple dynamic attributes of a data entity whose values are to be accessed;

(B) generating a plurality of executable queries from the query, the generating comprising:

grouping the multiple dynamic attributes into groups of dynamic attributes; and generating a respective executable query for each of the multiple groups of dynamic attributes to be used for obtaining values of attributes in the group for one or more instances of the data entity, wherein each respective executable query is generated with syntax customized to a target database system of the at least one data store against which the respective executable query is to be executed;

(C) executing the plurality of executable queries to obtain results for the query, the results including values of the multiple dynamic attributes of at least one instance of the data entity; and (D) outputting at least some of the results including the values of the multiple dynamic attributes of the at least one instance of the data entity.

9. The data processing system of claim 8, wherein grouping the multiple dynamic attributes is performed based on whether dynamic attributes are stored in a same table in the at least one data store.

10. The data processing system of claim 8, wherein the query comprises:

a first portion comprising information for identifying at least a first instance of the data entity stored in the at least one data store; and a second portion indicating at least one attribute of the data entity for which to obtain a value.

11. The data processing system of claim 10, wherein generating the plurality of executable queries from the query comprises:

generating, using the first portion of the query, a first set of executable queries for identifying at least the first instance of the data entity stored in the at least one data store; and generating, using the second portion of the query, the second set of executable queries for obtaining attribute values for at least the first instance of the data entity identified using the first set of executable queries, the attribute values including the first attribute value, wherein generating the second set of executable queries comprises:

the grouping the multiple dynamic attributes into the groups of dynamic attributes; and generating the respective executable query for each of the multiple groups of dynamic attributes to be used for obtaining values of attributes in the group for the one or more instances of the data entity.

12. The data processing system of claim 11, wherein the first and second sets of executable queries comprise executable structured query language (SQL) queries.

13. The data processing system of claim 11, wherein executing the plurality of executable queries comprises:

executing the first set of executable queries to obtain information identifying at least the first instance of the data entity; and after executing the first set of executable queries, executing, using the information identifying at least the first instance of the data entity, the second set of executable queries.

14. The data processing system of claim 8, wherein the query indicates a hierarchy of attributes, and wherein outputting at least some of the results comprises:

formatting the at least some of the results in a hierarchical format corresponding to the hierarchy of attributes; and outputting the at least some of the results in the hierarchical format.

15. At least one non-transitory computer-readable storage medium storing processor-executable instructions that, when executed by at least one computer hardware processor, cause the at least one computer hardware processor to perform a method for accessing data in at least one data store of a data processing system by using executable queries, the method comprising:

(A) obtaining, through an application programming interface (API) of the data processing system, a query for accessing data, the query indicating multiple dynamic attributes of a data entity whose values are to be accessed;

(B) generating a plurality of executable queries from the query, the generating comprising:

grouping the multiple dynamic attributes into groups of dynamic attributes; and generating a respective executable query for each of the multiple groups of dynamic attributes to be used for obtaining values of attributes in the group for one or more instances of the data entity, wherein each respective executable query is generated with syntax customized to a target database system of the at least one data store against which the respective executable query is to be executed;

(C) executing the plurality of executable queries to obtain results for the query, the results including values of the multiple dynamic attributes of at least one instance of the data entity; and (D) outputting at least some of the results including the values of the multiple dynamic attributes of at least one instance of the data entity.

16. The at least one non-transitory computer-readable storage medium of claim 15, wherein grouping the multiple dynamic attributes is performed based on whether dynamic attributes are stored in a same table in the at least one data store.

17. The at least one non-transitory computer-readable storage medium of claim 15, wherein the query comprises:

a first portion comprising information for identifying at least a first instance of the data entity stored in at least one data store; and a second portion indicating at least one attribute of the data entity for which to obtain a value.

18. The at least one non-transitory computer-readable storage medium of claim 17, wherein generating the plurality of executable queries from the query comprises:

generating, using the first portion of the query, a first set of executable queries for identifying at least the first instance of the data entity stored in the at least one data store; and generating, using the second portion of the query, the second set of executable queries for obtaining attribute values for at least the first instance of the data entity identified using the first set of executable queries, the attribute values including the first attribute value, wherein generating the second set of executable queries comprises:

the grouping the multiple dynamic attributes into groups of dynamic attributes; and generating respective executable query for each of the multiple groups of dynamic attributes to be used for obtaining values of attributes in the group for the one or more instances of the data entity.

19. The at least one non-transitory computer-readable storage medium of claim 18, wherein the first and second sets of executable queries comprise executable structured query language (SQL) queries.

20. The at least one non-transitory computer-readable storage medium of claim 18, wherein executing the plurality of executable queries comprises:

executing the first set of executable queries to obtain information identifying at least the first instance of the data entity; and after executing the first set of executable queries, executing, using the information identifying at least the first instance of the data entity, the second set of executable queries.

* * * * *